United States Patent [19]

Simmonds

[11] Patent Number: 5,541,496

[45] Date of Patent: Jul. 30, 1996

[54] APPARATUS AND METHOD OF RAPIDLY CHARGING NICKEL-CADMIUM BATTERIES

[75] Inventor: Stewart N. Simmonds, Port Coquitlam, Canada

[73] Assignees: 4C Technologies Inc., Port Coquitlam, Canada; Datalink Corporation, Tokyo, Japan

[21] Appl. No.: 150,102

[22] PCT Filed: Jul. 28, 1992

[86] PCT No.: PCT/JP92/00955

§ 371 Date: Feb. 14, 1994

§ 102(e) Date: Feb. 14, 1994

[87] PCT Pub. No.: WO93/19496

PCT Pub. Date: Sep. 30, 1993

[30] Foreign Application Priority Data

Mar. 16, 1992 [WO] WIPO ............... PCT/CA92/00113

[51] Int. Cl.⁶ ............................................................ H02J 7/04
[52] U.S. Cl. ............................... 320/36; 320/35; 320/20
[58] Field of Search ................................ 320/20, 30, 35, 320/36

[56] References Cited

U.S. PATENT DOCUMENTS

| 4,503,378 | 3/1985 | Jones et al. | |
| 4,755,735 | 7/1988 | Inakagata | 320/35 |
| 5,140,252 | 8/1992 | Kizu et al. | 320/20 |
| 5,248,927 | 9/1993 | Takei et al. | 320/2 |
| 5,352,969 | 10/1994 | Gilmore et al. | 320/39 |
| 5,391,974 | 2/1995 | Shiojima et al. | 320/35 |
| 5,403,093 | 4/1995 | Flynn, Jr. et al. | 374/45 |

FOREIGN PATENT DOCUMENTS

| 0444617A2 | 9/1991 | European Pat. Off. . |
| 0473514A2 | 3/1992 | European Pat. Off. . |
| 3705222A1 | 8/1987 | Germany . |
| 3728645A1 | 3/1989 | Germany . |
| 57-134868 | 8/1982 | Japan . |
| 57-163679 | 10/1982 | Japan . |
| 58-22931 | 5/1983 | Japan . |
| 59-24505 | 6/1984 | Japan . |

*Primary Examiner*—Robert Nappi
*Attorney, Agent, or Firm*—Wallenstein & Wagner, Ltd.

[57] ABSTRACT

A method and apparatus for charging nickel-cadmium batteries with a current greater than 2C rate. The cell temperature or both the temperature and voltage thereof are monitored, and the charging operation is halted upon detection of a moment when the rate of temperature increase of the cell became at least twice as great as the rate of temperature increase that was measured just before, or of a moment at which the above phenomenon took place and a moment at which the rate of voltage increase has declined immediately following a period during which the rate of voltage increase has continually risen.

12 Claims, 40 Drawing Sheets

CHARGING RATE 3C

Fig. 17 CHARGING RATE 1.5C

CHARGING RATE 1.5C

CHARGING RATE 1.5C

CHARGING RATE 3C

| Fig.29(a) |
| Fig.29(b) |

5,541,496

APPARATUS AND METHOD OF RAPIDLY CHARGING NICKEL-CADMIUM BATTERIES

TECHNICAL FIELD

This application pertains to rapid recharging of secondary cells. More specifically, this application pertains to an apparatus for rapidly charging nickel-cadmium batteries and to a method of rapidly charging nickel-cadmium batteries.

According to this invention, in particular, the temperature and voltage of nickel-cadmium batteries are monitored during the recharging operation. This recharging operation is terminated when the temperature or the temperature and voltage being monitored exhibit unusual behavior.

BACKGROUND ART

Secondary cells such as nickel-cadmium batteries may be recharged many times throughout their useful life. The recharging operation must be carefully controlled to minimize detrimental effects on the battery which are well known to those skilled in the art (see for example "Battery Charging: Extending Life Capacity", Bob Williams, Cellular Business, April, 1989, pp. 44–49). In the early days of secondary cell recharging technology, the recharging operation took several hours. With the increasing popularity of consumer devices powered by secondary cells, a demand has arisen for systems capable of recharging secondary cells in minutes instead of hours. Although it is possible to "fast charge" a secondary cell, this requires even more careful monitoring and control of the battery recharging process in order to prevent irreversible damage to the battery (see for example "Nickel-Cadmium Battery Update 90", Report on September, 1990 Brussels Seminar by Cadmium Association, London, England, November, 1990).

The prior art has evolved a wide variety of secondary cell recharging systems capable of rapidly recharging secondary cells. These typically involve electrical circuits which monitor the voltage and/or temperature of the battery being recharged and discontinue and/or vary the application of charging current to the battery once its temperature or voltage reaches a predetermined level. U.S. Pat. No. 4,006,397 Catotti et. al. is typical of the prior art.

Japanese Examined Patent Publication (Kokoku) Nos. 62-23528 and 62-23529 disclose methods of recharging secondary batteries such as nickel-cadmium batteries, wherein attention is given to a change in the voltage waveform of a cell during the recharging operation, a plurality of inflection points appearing in the voltage waveform are stored in advance, and the charging operation is discontinued when the stored plurality of inflection points develop according to a predetermined order. According to the above methods, however, it is necessary to record in advance a change in the voltage waveform during the charging operation for each of the batteries of various kinds and to rewrite the stored content to the one that corresponds to the battery that is to be recharged depending upon the kinds of batteries that need recharging, involving a cumbersome operation. Depending upon the environment in which the charging operation is carried out and the hystevesis of the battery, furthermore, the waveform of voltage output of the battery does not necessarily exhibit the order or the magnitude that are stored making it difficult to correctly carry out the charging operation or the recharging operation. It is therefore difficult to execute a rapid charging operation without deteriorating performance of the batteries.

That is, secondary batteries and, particularly, nickel-cadmium batteries have heretofore been recharged usually requiring a time of from 6 hours to 16 hours in the longest case. Even in the case of a so-called rapid recharging in which the recharging is carried out within a relatively short period of time, a time of one to two hours is required.

When the so-called rechargeable cells, storage batteries and cells are used for their respective purposes by being recharged, it is desired that they are recharged in as short a time as possible. However, a bottleneck exists in that the temperature rises and the internal pressure rises due to a chemical reaction inside the secondary batteries. Recharging by flowing a heavy current within a short period of time results not only in damage to the cells but also in deterioration of cell characteristics such as output characteristics and charging characteristics, and thus has not been employed.

In recent years, however, a damand for secondary batteries is increasing in a variety of industrial fields. Depletion of a power source during operation must be avoided as much as possible, and recharging of secondary cells rapidly or, more desirably, instantaneously, has been desired more than ever before particularly where machine tools are used, in hospitals where medical equipment is used and in communications businesses inclusive of portable telephones.

The object of the present invention therefore is to improve on defects inherent in the above-mentioned prior art and to facilitate the recharging of secondary batteries and, particularly, nickel-cadmium batteries within such short periods of time as about several minutes to less than 20 minutes. Recharging at this very high rate increases the significance of certain parameters which are not as significant in slower, prior art recharging systems. However, it has been found that these parameters can be effectively managed to yield a safe, rapid recharging system without subjecting the battery to detrimental side effects.

DISCLOSURE OF THE INVENTION

In order to achieve the above-mentioned object, the present invention employs a technical constitution that is described below. That is, an apparatus for rapidly charging nickel-cadmium batteries comprising:

a current feeding means which feeds a charging current to a cell that needs be charged;

a temperature measuring means which measures the temperature of the cell;

a sampling means which measures the temperature of the cell and stores the data thereof or outputs the data thereof to an arithmetic means;

an arithmetic means which calculates the temperature data of the cell obtained by the sampling means and outputs a control signal that represents a period for discontinuing the charging operation;

a switching means which discontinues the supply of current to the cell from the current feeding means in response to an output from the arithmetic means; and a control means for controlling each of the above means;

wherein the current feeding means in the charging apparatus feeds a current of at least 2 C to the cell during the charging operation; and the arithmetic means has a first arithmetic function that calculates the rate of temperature increase of the cell from the temperature data of the cell obtained by the sampling means through the temperature measuring means; a second arithmetic function which calculates a rate of change by comparing the rate of temperature increase of the cell in a first period with the rate of temperature increase of the cell in a second period; and a third function which compares the rate of temperature increase of the cell in the second period with the rate of temperature increase of the cell in the first period in order to judge whether the rate of temperature increase of the cell in the second period is more than two times greater than the rate of temperature increase of the cell in the first period, and outputs a signal for discontinuing the supply of a charging current to the cell based on the result of the judgement.

According to another embodiment of the present invention, there is also provided an apparatus for rapidly charging nickel-cadmium batteries which further comprises:

a voltage measuring means for measuring the output voltage of the cell;

a sampling means which measures the voltage of the cell and stores the data thereof or outputs the data thereof to an arithmetic means; and an arithmetic means which calculates the voltage data of the cell obtained by the sampling means;

wherein the arithmetic means has a fourth arithmetic function that calculates the rate of voltage increase of the cell from the voltage data of the cell obtained by the sampling means through the voltage measuring means, and a fifth function which detects a first decline in the rate of voltage increase following a period during which the rate of voltage increase has continually risen, and the arithmetic means further outputs a signal for discontinuing the supply of charging current to the cell based upon the information of the third function in that the rate of temperature increase of the cell in the second period became more than twice as great as the rate of temperature increase of the cell in the first period and upon the information of the fifth function in that a first decline is detected in the rate of voltage increase.

In accordance with the preferred embodiment, the present invention provides a method of recharging a secondary cell such as a nickel-cadmium battery in which a charging current is applied to the cell while the cell's temperature is monitored.

At least the rate of temperature increase of the secondary cell, i.e., nickel-cadmium battery in at least one period, i.e., in a first period, is compared with the rate of temperature increase of the secondary cell in another period, i.e., in a second period that follows the first period, and the application of the charging current is discontinued at a moment when the rate of temperature increase of the cell in the second period becomes more than twice as great as the rate of temperature increase of the cell in the first period.

According to the present invention, the temperature of the secondary cell that is charged as described above is detected, and the charging operation is discontinued by utilizing the fact that the rate of temperature increase suddenly increases as the cell is charged nearly 100%. Thus, it is allowed to rapidly recharge the cell with a large current. In order to more efficiently and correctly carry out the object of the present invention, furthermore, the output voltage is detected during the charging operation of the secondary cell in addition to discriminating the temperature characteristics that is accomplished by detecting the temperature of the cell. That is, the fact is utilized in that the rate of voltage increase that has continually risen is inverted into a negative increase, i.e., the rate of increase declines as the cell is electrically charged nearly 100%, and the supply of recharging current to the cell is discontinued at a moment when the above-mentioned two characteristics have developed simultaneously.

In other words, according to the present invention, the recharging operation is carried out with a current of greater than 2 C which means a large current and is expressed by a C-rate which is a widely accepted standard for representing the magnitude of current in relation to the secondary cells, wherein the temperature of the cell is correctly checked while the cell is being rapidly charged with a large current and the recharging operation is discontinued at a moment when predetermined temperature characteristics are exhibited in order to completely avoid the problems that existed so far such as rise in the temperature and rise in the internal pressure, and to carry out rapid electric charging.

According to the present invention, furthermore, the output voltage of the cell is measured at the same time as measuring the temperature in order to more correctly determine the moment for discontinuing the charging operation for the cell, and to carry out a safe and proper recharging operation enabling the life of the secondary cell to be lengthened without deteriorating output characteristics and charging characteristics of the secondary cell.

That is, the invention provides a method of recharging a secondary cell in which a charging current is applied to the cell while monitoring the temperature of the cell as well as the output voltage of the cell. Application of the charging current is discontinued upon detection of a decline in the battery's rate of voltage increase immediately following a period during which the rate of voltage increase has continually risen.

Application of the charging current is discontinued upon simultaneous detection of at least a doubling of the rate of increase of battery temperature; and, a decline in the battery's rate of voltage increase immediately following a period during which the rate of voltage increase has continually risen.

The invention further provides an apparatus for recharging a secondary cell. The apparatus incorporates a power supply for applying a charging current to the cell, a temperature sensor for sensing the cell's temperature and producing an output signal representative thereof, a signal processor for monitoring the output signal and producing a cutoff signal upon detection of a predefined rate of increase thereof, and a switch responsive to the cutoff signal for disconnecting the cell from the power supply. The temperature sensor may be a thermistor voltage divider connected in parallel across the cell.

The invention alternatively provides a secondary cell recharging apparatus having a power supply for applying a charging current to the cell, a voltage sensor for sensing the cell's output voltage and producing an output signal representative thereof, a signal processor for monitoring the output signal and producing a cutoff signal upon detection of a predefined rate of increase thereof, and a switch responsive to the cutoff signal for disconnecting the cell from the power supply.

The invention additionally provides a secondary cell recharging apparatus having a power supply for applying a charging current to the cell, a temperature sensor for sensing the cell's temperature and producing a temperature output signal representative thereof, a voltage sensor for sensing the cell's output voltage and producing a voltage output signal representative thereof, a signal processor for monitoring the output signals and producing a cutoff signal upon detection of a predefined relationship therebetween, and a switch responsive to the cutoff signal for disconnecting the cell from the power supply.

BEST MODE(S) FOR CARRYING OUT THE INVENTION

Figure 1:
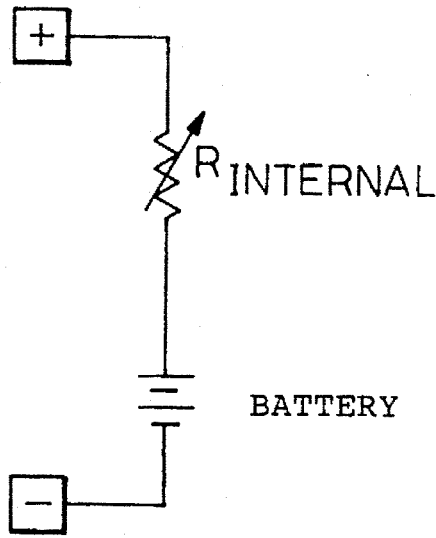
FIG. 1 is an equivalent electrical circuit for a battery charging and discharging at the 0.1 C rate.

Described below are the fundamental characteristics of a nickel-cadmium battery of the present invention, the apparatus for rapidly charging the nickel-cadmium battery of the invention, and the principle of the method of rapid charging.

The Nickel-Cadmium battery has a positive electrode made of nickel hydroxide and a negative electrode made of a cadmium compound. Potassium hydroxide is used as the electrolyte. During charging, the following reaction takes place:

$$2Ni(OH)_2 + Cd(OH)_2 \rightarrow 2NiOOH + Cd + 2H_2O \quad (1)$$

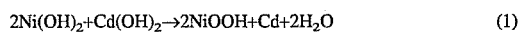

On the positive electrode, nickel hydroxide is converted to nickel oxyhydroxide. On the negative electrode, cadmium hydroxide is converted to cadmium. This yields an overall potential difference (electromotive force) of:

(+0.52 volts)−(−0.80 volts)=+1.32 volts

During discharging, the following reaction takes place:

$$2NiOOH + Cd + 2H_2O \rightarrow 2Ni(OH)_2 + Cd(OH)_2 \quad (2)$$

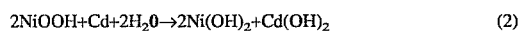

Thus, during discharging, the chemical reactions are opposite to those which occur during charging. The electromotive force which occurs during discharging is also opposite to that which occurs during charging.

It is well known that, as a battery attains full charge, water contained in the electrolyte undergoes electrolysis, with oxygen gas being generated at the positive electrode, and hydrogen gas being generated at the negative electrode. This results in a decrease of water in the electrolyte. Moreover, the generated gases build up internal pressure within the battery casing. To avoid a potential explosion, the casing is provided with a pressure relief vent which allows the generated gases to escape if they accumulate beyond a safe level. Current battery manufacturing techniques also attempt to minimize the generation of gases within the battery by providing more active material at the battery's negative electrode than at the positive electrode. This allows the positive electrode to become fully charged well before the negative electrode becomes fully charged. Oxygen gas only is then generated and in the following manner:

$$4OH \rightarrow 2H_2O + O_2 + 4e \quad (3)$$

Oxygen migrates to the negative electrode, where it recombines with the cadmium to produce cadmium hydroxide (i.e. without the generation of oxygen gas). Cadmium hydroxide is originally a discharge product of the negative electrode. If the rate of the charging reaction at the negative electrode increases to the point that it matches the oxygen recombination reaction rate, a balance is achieved. Thus, the negative electrode is always less than fully charged, but hydrogen gas is not produced. The battery is considered to be fully charged upon attainment of the aforesaid match. Further charging is termed "overcharge".

The above is true only if the overcharge current is limited to approximately the 0.3C rate (that is, a charging current equivalent to 300 milliamperes ("mA") applied to a 1000 milliampere-hour ("mAh") battery). At this rate of charge, the battery's internal pressure will be maintained at one atmosphere. But, if the overcharge current is increased to the 1 C rate (that is, a charging current equivalent to 1000 mA applied to a 1000 mAh battery), then the battery's internal pressure would rise to ten atmospheres. At charging rates in excess of a 1 C overcharge rate, the battery's internal pressure becomes even greater. It is accordingly important to prevent overcharging the battery while charging at elevated charging rates.

Although not wishing to be bound by any theory, the inventor presents the following theoretical discussion to assist those skilled in the art in comprehending the invention.

A battery is an electro-chemical device whose purpose is to store electrical energy. Equivalent electrical circuits can be used to demonstrate the various conditions occurring within the battery. It should be noted that whenever the chemical reaction within a battery changes, a different equivalent circuit must be used.

FIG. 1 is an equivalent electrical circuit for a battery when charging and discharging at the 0.1 C rate, and is the electrical model most commonly used. The battery's internal resistance, $R_{internal}$, is represented as a variable resistor having a resistance value inversely proportional to the level of energy in the battery. As the battery charges, $R_{internal}$ is initially high, but decreases as the battery becomes charged. Application of Kirchhoff's voltage law reveals that, when $R_{internal}$ is high, the majority of the applied charging voltage is dropped across $R_{internal}$, with very little voltage being dropped across the battery. As $R_{internal}$ decreases, the majority of the applied charging voltage is dropped across the battery, with very little voltage being dropped across $R_{internal}$. As the battery discharges, $R_{internal}$ is initially low, but increases as the battery's energy level is depleted. Thus, there is little initial voltage drop across $R_{internal}$, but this voltage drop increases as the battery's energy level decreases.

The effects of power dissipation within the battery can be analyzed. $R_{internal}$ dissipates power during both charging and discharging of the battery. The expected result of power dissipation is heat but, the endothermic chemical reactions counterbalance the heating effect of power dissipation in $R_{internal}$, so little if any net heat is produced. Even during overcharge, the battery can accommodate excess energy up to a 0.3C rate, without detrimental effects. However, when the charge/overcharge rate exceeds 0.3C, other factors which affect the inherent balance of the chemical reactions in the battery must be considered.

Figure 2:
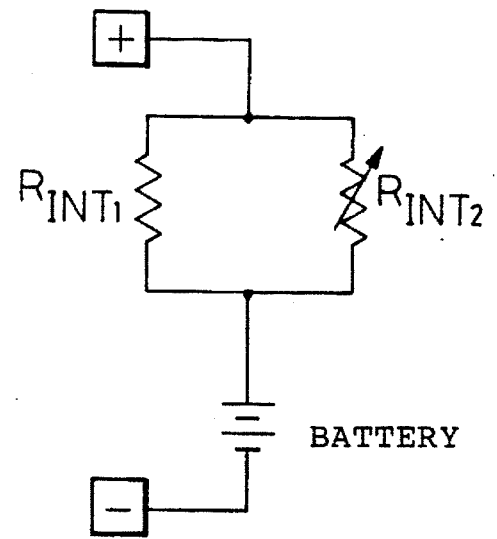
FIG. 2 is an equivalent electrical circuit for a battery charging at the 4 C rate.

FIG. 2 is an equivalent electrical circuit for a battery charging at the 4 C rate. The figure shows two internal resistors in parallel: fixed resistor $R_{int1}$ and variable resistor $R_{int2}$. $R_{int2}$ corresponds to $R_{internal}$ of FIG. 1, in that the resistance value of $R_{int2}$ is inversely proportional to the battery's energy level. Similarly, the heating caused by power dissipation in $R_{int2}$ is counterbalanced by the endothermic effect of the chemical reactions. $R_{int1}$ represents a residual resistance component separate from $R_{int2}$, in that the resistance value of $R_{int1}$ is fixed and independent of any of the chemical reactions occurring in the battery. The resistance value of $R_{int1}$ is relatively small, such that any effect it has during charging increases the battery's overall temperature minimally, if at all. As the battery becomes fully charged, the resistance of $R_{int2}$ decreases to a value below that of $R_{int1}$, and the effect of $R_{int1}$ becomes dominant. At this point, large amounts of heat are generated by $R_{int1}$, causing the battery's overall temperature to increase substantially.

Figure 3:
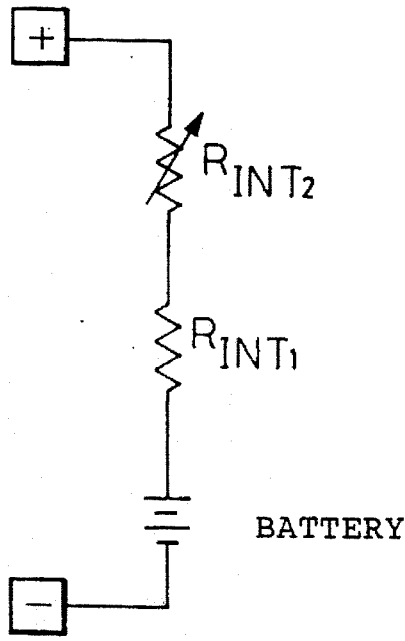
FIG. 3 is an equivalent electrical circuit for a discharging battery.

FIG. 3 illustrates the relationship between $R_{int1}$ and $R_{int2}$ during battery discharge. The resistance value of $R_{int1}$ is initially dominant (i.e. greatly exceeds the resistance value of $R_{int2}$), such that any internal heating or terminal voltage reduction is caused primarily by $R_{int1}$. As the battery's energy level decreases, $R_{int2}$ increases. Eventually, the resistance value of $R_{int2}$ becomes so high that all of the battery's voltage is dropped across $R_{int1}$ and $R_{int2}$, with none being dropped across the battery (i.e. zero output voltage appears across the battery terminals).

Figure 4:
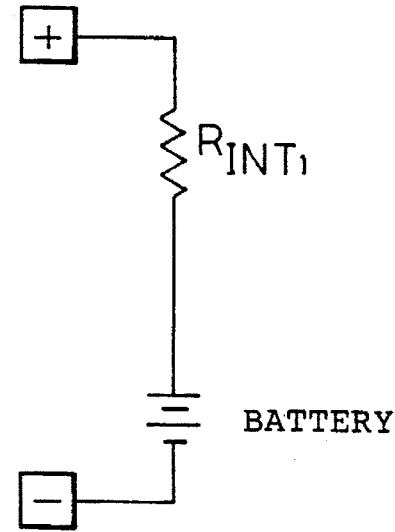
FIG. 4 is an equivalent electrical circuit for a battery undergoing overcharge.

FIG. 4 is an electrical equivalent circuit of a battery undergoing overcharge. When the battery is fully charged, the resistance value of $R_{int2}$ is effectively zero ohms. Therefore, the only resistance remaining in the battery is that represented by $R_{int1}$. It has been found that heating caused by $R_{int1}$ is minimal at charging rates up to the 0.3C charging rate. Above the 0.3C charging rate, heat generated by power dissipation within $R_{int1}$ increases in proportion to the increase in the charging rate. Additionally, excessive amounts of oxygen are generated at elevated charging rates. The oxygen recombines with cadmium at the negative electrode, reducing the cell voltage. This, in turn, increases the power dissipated by $R_{int1}$, which further increases heat, leading to a thermal runaway condition. Accordingly, as indicated above, it is important to prevent overcharging the battery while charging at elevated charging rates.

Figure 5:
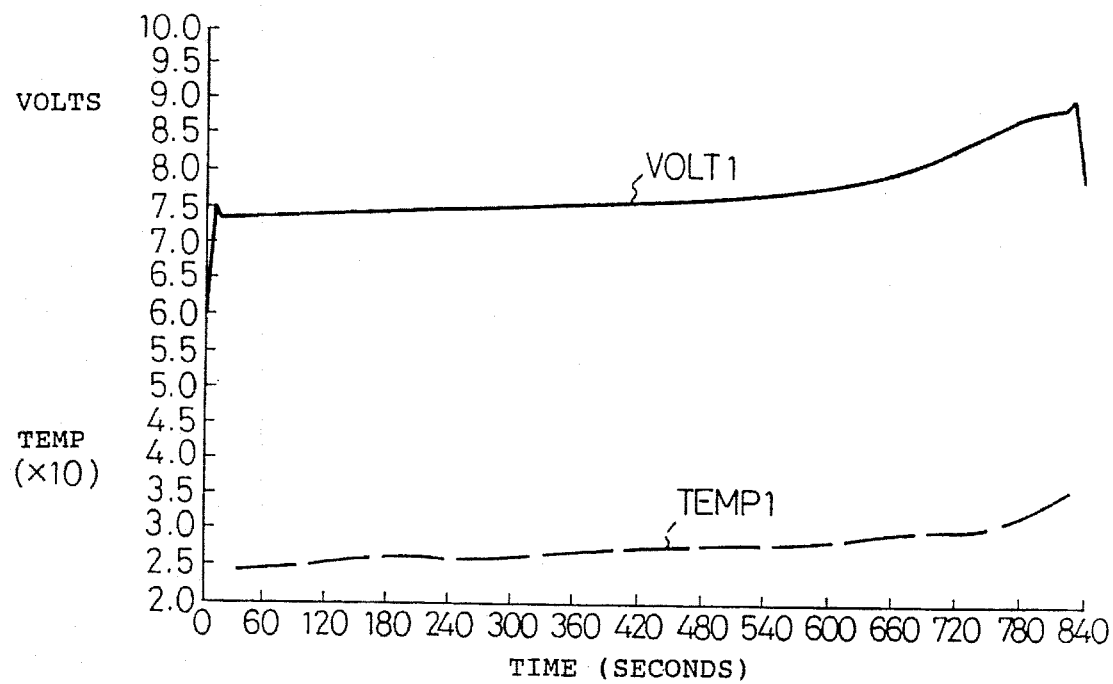
FIG. 5 is a graph on which battery temperature in degrees Centigrade (lower curve) and voltage (upper curve) are plotted versus time in seconds for the battery charging equivalent circuit of FIG. 2.
Figure 6:
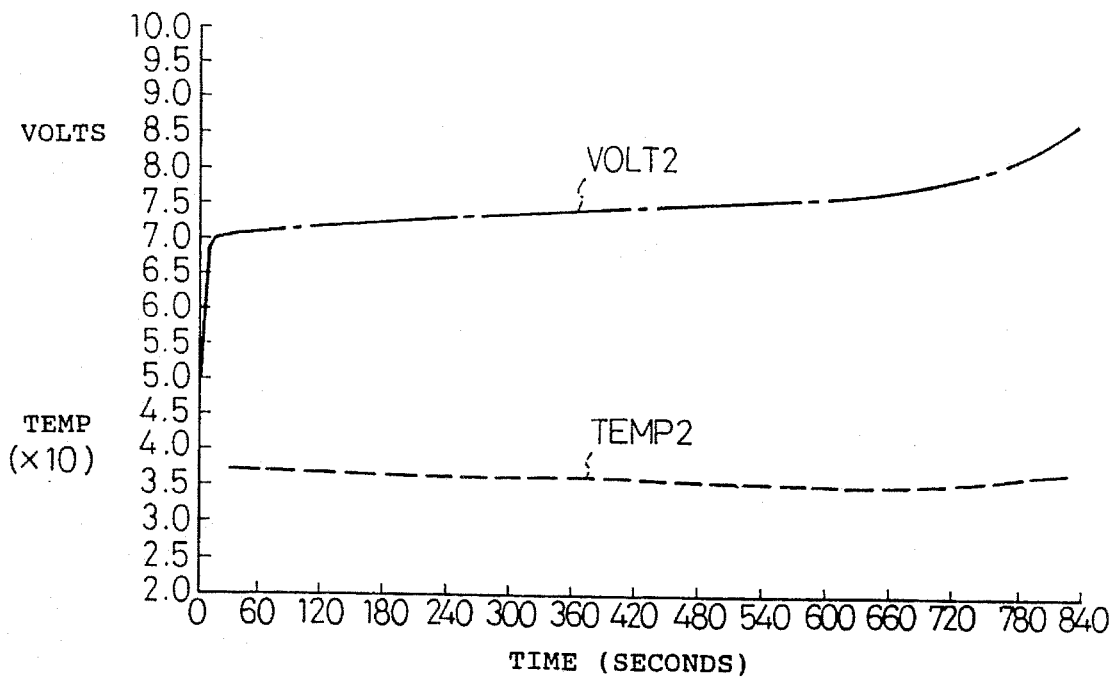
FIG. 6 is similar to FIG. 5, but illustrates a case in which the initial battery temperature, prior to recharging, is higher than the initial temperature of the battery utilized in the case illustrated in FIG. 5.
Figure 7:
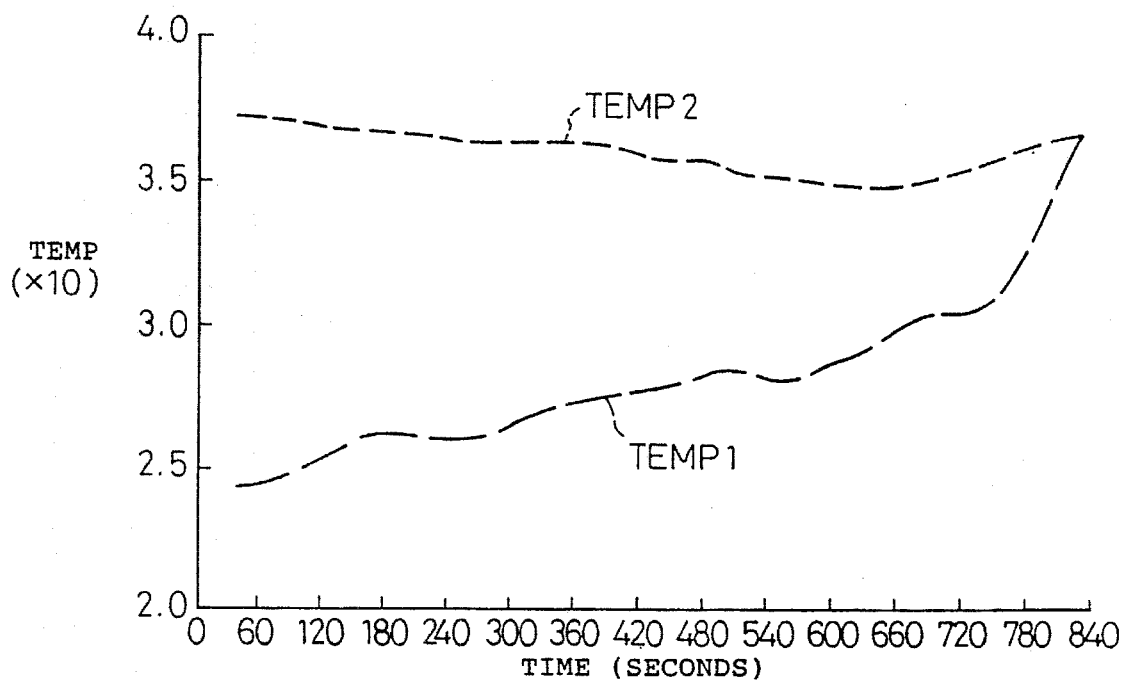
FIG. 7 provides a magnified illustration of the temperature curves of FIGS. 5 and 6.
Figure 8:
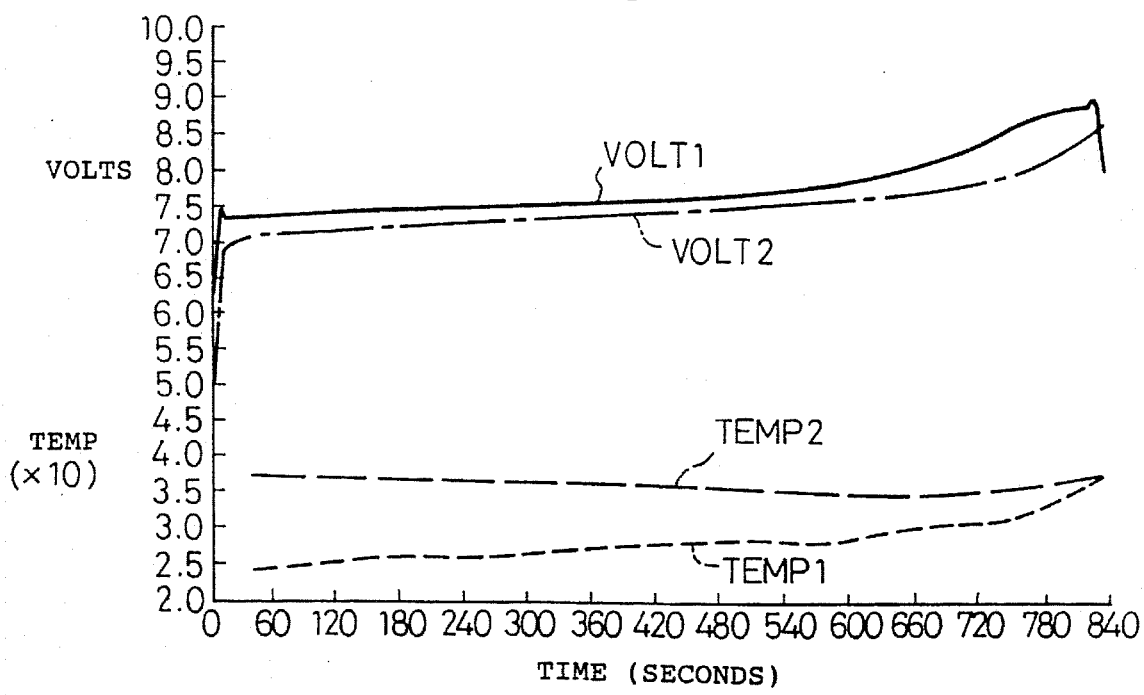
FIG. 8 superimposes the data of FIGS. 5 and 6.

FIGS. 5 to 8 depict the temperature and voltage effects on a nickel-cadmium battery being charged at the 4 C rate. FIGS. 5 and 6 depict the relationship between the battery's terminal voltage and its skin temperature, for different initial battery temperatures. More particularly, FIG. 5 plots battery temperature in degrees Centigrade (lower curve marked "TEMP 1") and voltage (upper curve marked "VOLT 1") versus time in seconds for a battery charging at the 4 C rate and having an initial temperature of 38.8 degrees Centigrade. FIG. 6 is similar, except that the respective battery temperature and voltage curves are marked "TEMP 2" and "VOLT 2"; and, the battery's initial temperature is 23.3 degrees Centigrade. FIG. 7 provides a magnified illustration of the temperature curves of FIGS. 5 and 6.

Analysis of the battery voltage during charging reveals a dramatic increase and subsequent decrease in the rate of increase of voltage towards the completion of the charging cycle. Referring to FIGS. 5 and 6, it can be seen that the battery's rate of voltage increase rises from about 1 millivolts per second for the first 9 minutes (0 seconds to 540 seconds); to about 4 millivolts per second for the next 90 seconds (600 seconds to 690 seconds); and, to about 8 millivolts per second for the next 90 seconds (690 seconds to 780 seconds). Thereafter, the battery's voltage continues to increase, but the rate at which it increases decreases eventually to about 2 millivolts per second at the 830 second point. After approximately 830 seconds of charge applied at the 4 C rate, the battery can no longer accept energy and can be considered fully charged.

Analysis of the battery temperature curves of FIGS. 5, 6 & 7 reveals no similarity between the curves except at the conclusion of the charging cycle. From 0 seconds to 660 seconds, the "TEMP 1" curve shows an increase in temperature of 0.0097 degrees Centigrade per second, while the "TEMP 2" curve actually shows a decrease in temperature of 0.0057 degrees Centigrade per second. From 660 seconds to 830 seconds, the rate of temperature increase rises to 0.038 degrees Centigrade per second (TEMP 1 curve) and 0.01 degrees Centigrade per second (TEMP 2 curve) respectively. This demonstrates at least a two-fold increase (i.e. doubling) in the rate of temperature increase at the point where the battery is almost fully charged.

Rapid, high rate charging, which is one of the objects of the invention, requires precise control of the amount of charge to avoid detrimental conditions which can occur very quickly and cause irreversible damage to the battery. Prior art charging techniques capable of charging batteries at rates up to the 1 C rate have drawbacks when they are employed at charging rates greater than 1 C. In particular, overcharging occurs which in turn causes excessive heat generation within the battery, as described above. This can lead to reduced capacity, reduced cycle life and possible cell venting. The required precise control at charging rates in excess of the 1 C rate can be accomplished by carefully monitoring the battery voltage, the battery temperature or both.

The battery voltage exhibits a unique characteristic which occurs only at the point when the battery is 95% to 100% charged. This characteristic is a decline in the battery's rate of voltage increase immediately following a period during which the battery's rate of voltage increase has continually risen. The high rate of charging should be discontinued when this decline is detected to prevent the battery from becoming overcharged.

The battery temperature also exhibits a unique characteristic which occurs only at a point when the battery is 95% to 100% charged. This characteristic is a dramatic increase of at least two-fold in the battery's rate of temperature increase. This rapid increase signifies that the battery is almost fully charged and that the high rate of charge should be discontinued.

Instead of discontinuing high rate charging upon detection of either one of the aforementioned voltage or temperature conditions, one may alternatively discontinue high rate charging upon simultaneous detection of both conditions.

By precisely controlling high rate battery charging as aforesaid one may rapidly charge a battery to within about 95% to 100% of its capacity without exposing the battery to the undesirable effects of overcharging.

Concrete examples of the apparatus for rapidly charging nickel-cadmium batteries according to the present invention will now be described in detail with reference to the accompanying drawings.

Figure 9:
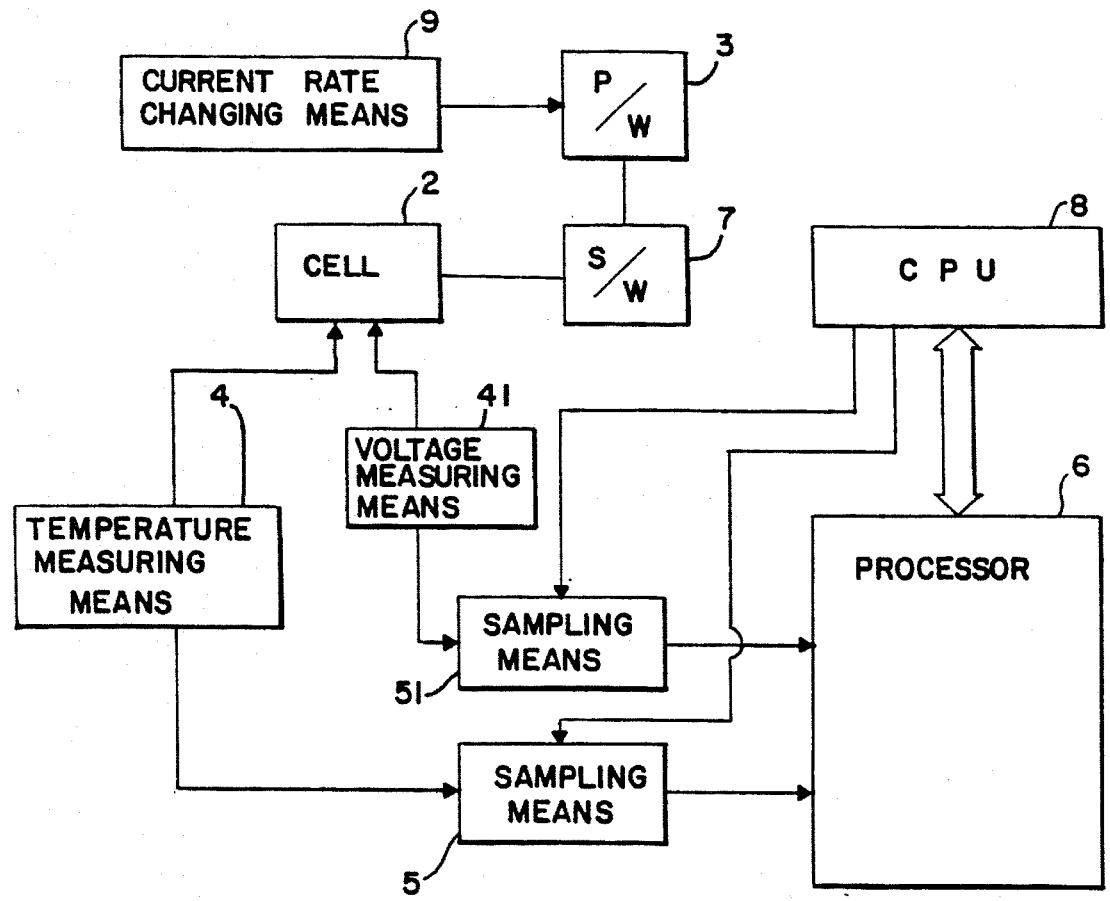
FIG. 9 is an electronic circuit schematic diagram of a battery charger capable of rapidly recharging a secondary cell in accordance with the invention.

FIG. 9 is a block diagram explaining the concrete constitution of an apparatus 1 for rapidly charging nickel-cadmium batteries according to a first embodiment of the present invention, which comprises:

a current feeding means 3 which feeds a charging current to a cell 2 that needs to be charged;

a temperature measuring means 4 which measures the temperature of the cell 2;

a sampling means 5 which measures the temperature of the cell and stores the data thereof or outputs the data thereof to an arithmetic means;

an arithmetic means 6 which calculates the temperature data of the cell obtained by the sampling means 5 and outputs a control signal that represents a timing for discontinuing the charging operation;

a switching means 7 which discontinues the supply of current to the cell 2 from the current feeding means 3 in response to an output from the arithmetic means 6; and a control means 8 for controlling each of the means;

wherein the current feeding means 3 in said charging apparatus 1 feeds a current of at least 2 C to the cell during the charging operation; and the arithmetic means 6 has a first arithmetic function that calculates the rate of temperature increase of the cell from the temperature data of the cell obtained by the sampling means 5 through the temperature measuring means 4, a second arithmetic function which calculates a rate of change by comparing the rate of temperature increase of the cell in a first period with the rate of temperature increase of the cell in a second period, and a third function which compares the rate of temperature increase of the cell in the second period with the rate of temperature increase of the cell in the first period in order to judge whether the rate of temperature increase of the cell in the second period is more than two times as great as the rate of temperature increase of the cell in the first period, and outputs a signal for discontinuing the supply of a charging current to the cell based on the result of the judgement.

In addition to the fundamental constitution shown in FIG. 9, the apparatus 1 for rapidly charging nickel-cadmium batteries according to the present invention further comprises:

a voltage measuring means 41 for measuring the output voltage of the cell 2;

a sampling means 51 which measures the voltage of the cell and stores the data thereof or outputs the data thereof to an arithmetic means; and arithmetic means which calculates the voltage data of the cell 2 obtained by the sampling means 51 and is provided in common to the arithmetic means 6;

wherein the arithmetic means 6 has a fourth arithmetic function that calculates the rate of voltage increase of the cell from the voltage data of the cell obtained by the sampling means 51 through the voltage measuring means 41, and a fifth function which detects a first decline in the rate of voltage increase following a period during which the rate of voltage increase has continually risen, and the arithmetic means 6 further outputs a signal for discontinuing the supply of charging current to the cell based upon the information of the third function in that the rate of temperature increase of the cell during the second period became more than twice as great as the rate of temperature increase of the cell in the first period and upon the information of the fifth function in that a first decline is detected in the rate of voltage increase.

According to the apparatus for rapidly charging nickel-cadmium batteries of the present invention, a predetermined secondary cell, i.e., a nickel-cadmium cell is charged by feeding a large current to it, and it is desired to feed a large current of at least greater than 2 C rate to the nickel-cadmium cell, quite unlike the conditions related to the current in a conventional charging operation.

Concretely, a current of 2 C or greater, i.e., a current of 3 C, 4 C or 5 C is fed for the rated currents of the nickel-cadmium batteries.

According to the present invention, therefore, it is necessary to optimally adjust the amount of current fed to the cell during the charging operation depending upon the rated values of the cell inclusive of the constitution, output voltage and output current of the nickel-cadmium battery for which the charging operation is required, and upon various characteristics, residual capacity, charge-discharge hysteresis, and the like. For this purpose, it is desired that the apparatus for rapidly charging the nickel-cadmium batteries of the present invention is provided with a current rate changing means 9 which changes the rate (C rate) of current.

According to the present invention, furthermore, the cell temperature of the nickel-cadmium battery is measured by using a temperature measuring means 4 which is constituted by a suitable temperature sensor while feeding a large current. Here, the temperature being measured may be any one of the surface temperature (skin temperature of the cell), the internal temperature of the temperature at the cell terminal. A suitable embodiment is selected depending upon the need and the temperature to be measured.

Figure 10:
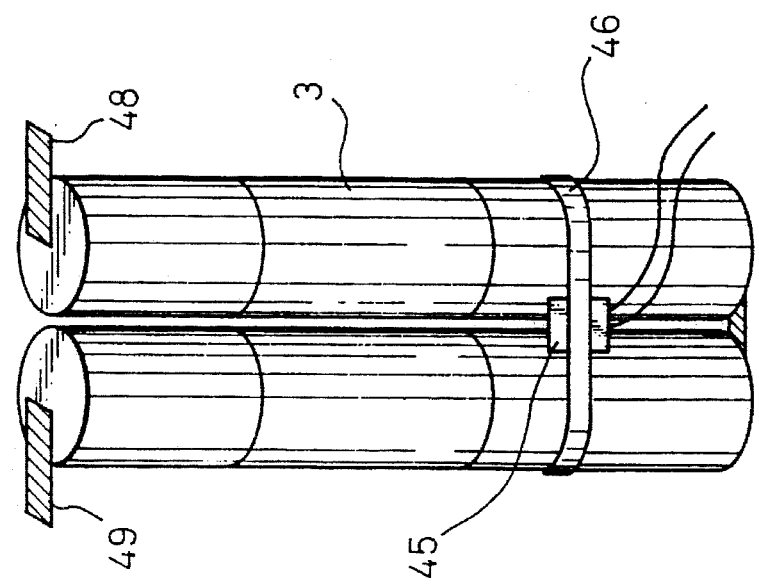
FIG. 10 is a schematic diagram of a measuring device used in the invention for measuring the skin temperature of the cell.

Though there is no particular limitation in the constitution of the temperature sensor of the temperature measuring means 4 used for measuring the temperature of the cell, a temperature sensor 45 constituted by, for example, an NPN transistor or a thermistor may be brought into contact with the surface of the body of the cell 2 using an adhesive tape 46 or the like as shown in FIG. 10.

When the charging operation is carried out by inserting the cell in the charging apparatus of the present invention, the positive electrode is connected to one terminal of the cell and the negative electrode is connected to the other terminal thereof as shown in FIG. 10.

Figure 11:
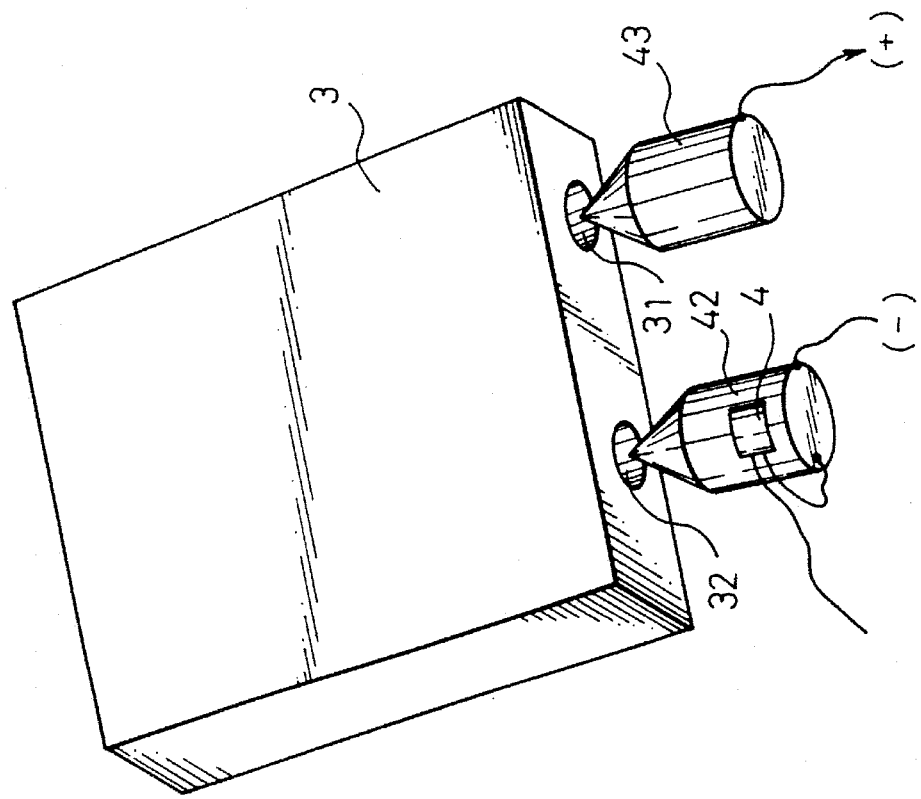
FIG. 11 is a schematic diagram of a measuring device used in the invention for measuring the cell's temperature by measuring the output terminal voltage of the cell.

FIG. 11 is a diagram illustrating another example of the cell temperature measuring means used in the apparatus for rapidly charging nickel-cadmium batteries of the present invention. In this embodiment, the temperature is measured at the output terminal of the cell 2 that is charged. In FIG. 11, a connection terminal 43 for charging containing, for example, a spring, is connected to a plus-side terminal 31 of the cell 2, so that the charging current is fed during the charging operation, and a charging terminal 42 made of a metal containing a spring is connected to a minus-side terminal 32, so that the current flows from the minus-side terminal 32 to ground. A temperature sensor 4 having the same function as the aforementioned one is mounted on a portion of the charging terminal 42 to measure the temperature at the output terminal of the cell.

The measured temperature data is converted into a suitable voltage value and is fed to a suitable arithmetic processing means that will be described later.

It is desired that the charging current discontinuation signal based on the fifth function of the arithmetic means 6 of the invention is output only when the decline in the rate of voltage increase of the cell 2 is continually detected at least a plurality of times after the first decline is detected in the rate of voltage increase of the cell by the fifth function.

That is, in the present invention as shown in FIGS. 5 and 6, the rate of voltage increase of the cell 2 continually rises from when the charging operation is started for the cell 2 until the charging operation is nearly completed. Therefore, the degree of change obtained by differentiating the change in the voltage level of the cell assumes a positive value, and a rate of change which is obtained by further differentiating the above value assumes zero or a positive value. As the cell is further charged to nearly 100% charging rate, however, the voltage is suddenly inverted toward a decline. Therefore, the rate of voltage increase suddenly assumes a negative value.

That is, according to the present invention which measures the cell voltage that continually rises for a predetermined period of time, a first decline in the rate of voltage increase following a period during which said rate of voltage increase has continually risen is detected to render the judgement that the cell is 100% charged or nearly 100% charged, a control signal for discontinuing the charging operation is sent to the control means 8, and the switching means 7 is actuated so that the charging current will not flow into the cell from the current feeding means 3.

Here, a change in the voltage level is in a delicate condition particularly when the charging rate of the cell has approached 100%. By taking safety into consideration, therefore, it is desired not to readily generate a control signal for discontinuing the charging operation immediately after the rate of voltage increase has changed first to negative but to generate the control signal for discontinuing the charging operation after having executed the sampling one to two times and after having confirmed the rate of voltage increase.

For instance, it is desired to generate the control signal for discontinuing the charging operation when the voltage drop is detected three times continually after the rate of voltage increase has changed to negative.

Constitution of the arithmetic means used in the present invention will now be described with reference to the drawings.

Figure 12:
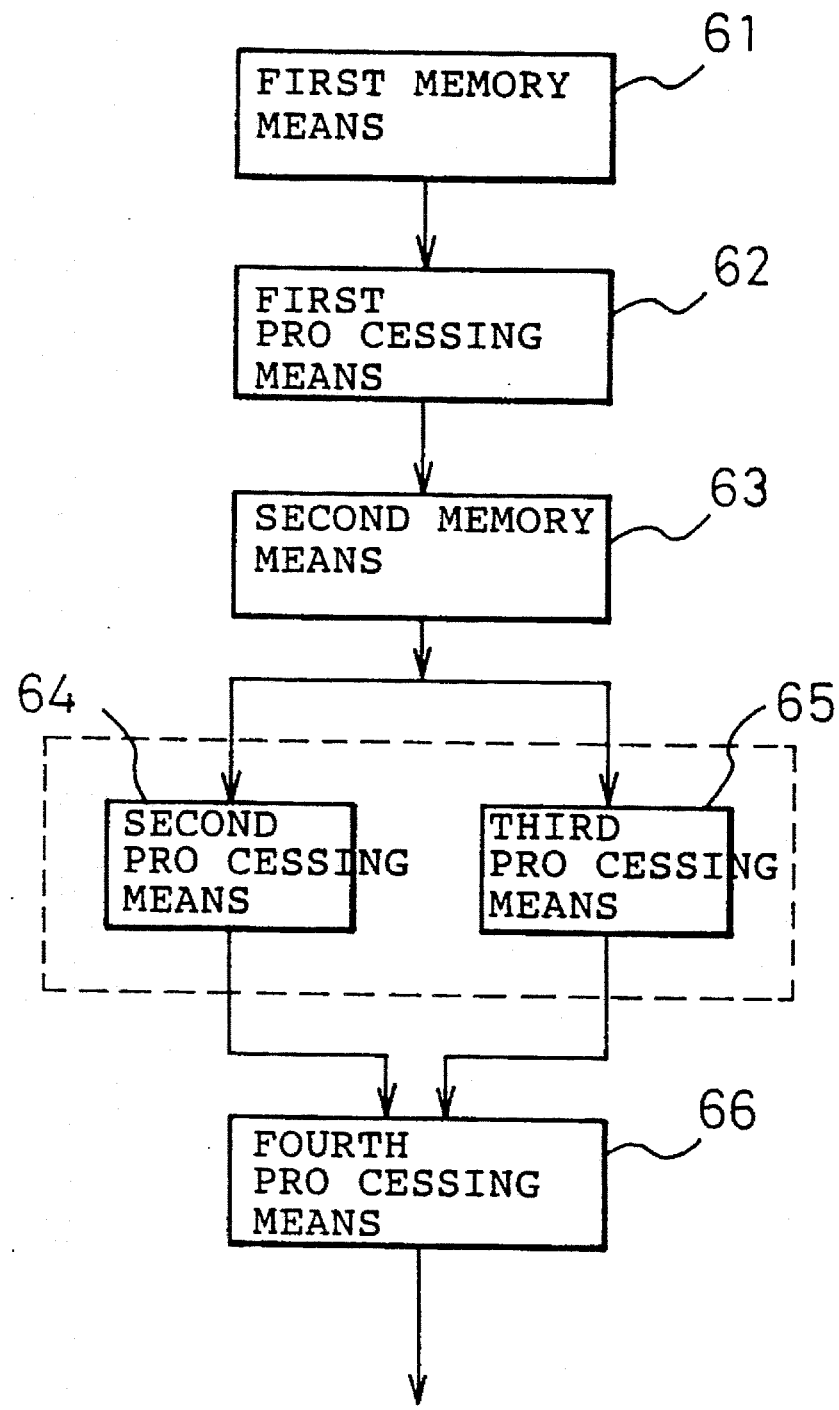
FIG. 12 is a block diagram illustrating the constitution of an arithmetic means 6 in the charging apparatus of the invention.

FIG. 12 is a diagram explaining a memory circuit in the sampling means 4 or 41 of the invention, as well as functions and circuit constitution of the arithmetic means 6, and is a block diagram explaining an apparatus which measures the cell temperature and calculates the result thereof. That is, an apparatus for rapidly charging nickel-cadmium batteries comprising a first memory means 61 for storing temperature data of the cell sampled maintaining a predetermined time interval by a temperature measuring means 4 that measures the temperature of the cell 2, a first arithmetic means 62 which calculates an average value of the cell temperature in a predetermined period of time from at least two pieces of temperature data maintaining a predetermined time interval stored in said first memory means 61, a second memory means 63 for storing the average value of the cell temperature calculated by the first arithmetic means 62, a second arithmetic means 64 which calculates the rate of temperature increase of the cell in a first period (for example, 5 seconds) which is a suitable period during the charging operation from the data stored in said second memory means 63 in order to calculate the degree of change related to the increase or decrease of the cell temperature in a neighboring predetermined period of time or to calculate the rate of change in, for example, five seconds based on the data of average value of the cell temperature stored in the second memory means 63, a third arithmetic means 65 which calculates the rate of temperature increase of the cell in a second period (for example, 5 seconds) following said first period, and a fourth arithmetic means 66 which judges whether the rate of temperature increase of the cell in the second period obtained by the third arithmetic means 65 is at least twice as great as the rate of temperature increase of the cell in the first period obtained by said second arithmetic means 64.

In the charging apparatus of the present invention, the second and third arithmetic means 64 and 65 may be provided in common.

Next, concretely described below is the procedure for calculating the measured data according to the present invention.

In the present invention, first, the temperature of the cell is measured and the charging operation is controlled as described below.

In response to clock signals from a central control means 8 and maintaining a predetermined interval, the temperature measuring means 4 measures, for example, the skin temperature of the cell and initially stores the data in the first memory means 61.

By using a suitable sensor such as the one mentioned earlier, the temperature of the cell is converted to a voltage.

In the present invention, the data of temperature measurement is obtained for every clock signal and, hence, a plurality of temperature data are stored within a predetermined period of time in said first memory means 61.

The period of the clock signal in the present invention corresponds to a sampling period. Therefore, though there is no particular limitation in the period, the data may be sampled in a quantity of, for example, 10 to 50 per second.

The first memory means 61 has a predetermined memory capacity and should desirably be so constituted as to store at least 250 pieces of data for a 5 second period.

Next, in the present invention, an average value of the temperature data maintaining the predetermined time interval is calculated by the first arithmetic means 62 based upon a plurality of temperature data stored in the first memory means 61.

Such an average value may be obtained by calculating average values ($T_{AV1}, T_{AV2}, \ldots, T_{Vn}$) of cell temperatures based on at least two pieces of temperature data which are the sampling values continually obtained or may be obtained by calculating those data among 10 to 50 pieces of data within a predetermined period of time, for example, within 5 seconds.

The memory means may, for example, be of the FIFO (first-in-first-out) type.

The average values ($T_{AV1}, T_{AV2}, \ldots, T_{Vn}$) of cell temperatures calculated by the first arithmetic means 62 are initially stored in the second memory means 63.

Next, calculated below is the degree or rate of change related to the increase or decrease of the cell temperature within a neighboring predetermined period of time, for example, within 5 seconds based upon the average value data ($T_{AV1}, T_{AV2}, \ldots, T_{Vn}$) of cell temperatures stored in the second memory means 63.

That is, rates of change ($V_{T1}, V_{T2}$) in the average values of temperatures are calculated as follows by the second arithmetic circuit 64 and the third arithmetic circuit 65 for the average value $T_{AV1}$ in a first period, i.e., in the first 5 seconds in a selected period, for the average value $T_{AV2}$ in a second period, i.e., in 5 seconds following the first period, and for the average value $T_{AV3}$ in a third period, i.e., in 5 seconds following the second period, $$T_{AV2} - T_{AV1} = V_{T1}$$

$$T_{AV3} - T_{AV2} = V_{T2}$$

Similarly, hereinafter, the amounts ($V_{T1}, V_{T2}$) of change in the average values of temperature are calculated for every predetermined period during the charging operation.

Here, the above values represent rates of change in temperature in 5 seconds and can be directly used as the change. This, however, can be expressed as a rate of change per a unit time, e.g., as a rate of change per second as follows:

$$V_{T1}/5 = RV_{T1}$$

$$V_{T2}/5 = RV_{T2}$$

Then, in the present invention, the fourth arithmetic means 66 calculates and judges the relationship between the rate of temperature increase $RV_{T2}$ of the cell in the second period obtained by the third arithmetic means 65 and the rate of temperature increase $V_{T1}$ or $RV_{T1}$ of the cell in the first period obtained by the second arithmetic means 64.

That is, in the present invention as described above, it has been experimentally confirmed that the temperature of the nickel-cadmium battery during the charging operation suddenly rises as the charging rate approaches 100%. That is, the cell is destroyed or the cell performance is deteriorated unless the charging operation is discontinued by detecting such a state as early as possible. According to the present invention, therefore, the rate of temperature increase of the cell is monitored as mentioned above, and it is so judged that the charging rate of the cell has reached 100% or nearly 100% when the rate of temperature increase of the cell measured this time is greater than twice the rate of temperature increase of the cell measured in the previous time, and a control signal is produced to discontinue the charging operation.

Concretely, therefore, the fourth arithmetic means 66 judges whether the rate of temperature increase $V_{T2}$ or $RV_{T2}$ of the cell in the second period is at least greater than twice the rate of temperature increase $V_{T1}$ or $RV_{T1}$ of the cell in the first period, i.e., whether $2V_{T1} < V_{T2}$.

According to the second embodiment of the present invention, furthermore, the cell voltage is measured during the rapid charging operation in addition to the abovementioned arithmetic processing, and the charging operation is discontinued in combination with the rate of temperature increase. Described below are the constitution of an arithmetic means 6 related to measuring the voltage of the cell and the procedure therefor.

According to the present invention as described above, the arithmetic processing means which measures the cell voltage and calculates the voltage data is mostly common to the aforementioned arithmetic means 6. Therefore, this common processing means is not concretely described but only those portions particularly related to voltage data are described.

A suitable voltage measuring sensor which is an output voltage measuring means is mounted on the terminal of the nickel-cadmium cell 2. As in the case of measuring the temperature, the voltage measuring means 41 measures the voltage of the cell in response to clock signals from the central control means 8 maintaining a predetermined interval, and the data are initially stored in a first memory means 61.

Hereinafter, the procedure for processing the data up to a third arithmetic means 65 is the same as the aforementioned procedure for processing the temperature data.

That is, average values ($V_{AV1}, V_{AV2}, \ldots, V_{Vn}$) of cell voltage are calculated from the voltage data, and the amounts ($V_{V1}, V_{V2}$) of change in the average values of voltage in the first period and the second period are calculated as follows:

$$V_{AV2} - V_{AV1} = V_{V1}$$

$$V_{AV3} - V_{AV2} = V_{V2}$$

Then, as required, rates of temperature change per a second are calculated as follows:

$$V_{V1}/5 = RV_{V1}$$

$$V_{V2}/5 = RV_{V2}$$

Then, in the present invention, the fourth arithmetic means 66 judges a relationship possessed by the rate of voltage increase $V_{V2}$ or $RV_{V2}$ of the cell in the second period obtained by the third arithmetic means 65 with respect to the rate of voltage increase $V_{V1}$ or $RV_{V1}$ of the cell in the first period obtained by the second arithmetic means 64.

That is, in the present invention as described above, the voltage of the nickel-cadmium battery during the initial stage of charging operation mildly increases with an increase in the charging time, and it has been experimentally confirmed that the voltage suddenly rises as the charging rate approaches 100% and the voltage then suddenly drops as the charging rate arrives at 100% or arrives very close at 100%.

The charging operation therefore must be discontinued by detecting such a state as early as possible.

For this purpose according to the present invention as described above, a change in the rate of voltage increase of the cell is monitored and it is so judged that the charging rate of the cell has reached 100% or nearly 100% at a moment when the voltage has first dropped, i.e., at a moment when the rate of voltage increase has indicated a negative condition following the condition during which the rate of the voltage increase has continually risen over a predetermined period of charging operation, and a control signal is generated to discontinue the charging operation.

Concretely, therefore, it is judged whether the rate of voltage increase $V_{V2}$ or $R_{V2}$ of the cell in the second period maintains the following relationship with respect to the rate of voltage increase $V_{V1}$ or $RV_{V1}$ of the cell in the first period, $$V_{V2} - V_{V1} < 0$$

According to the present invention, furthermore, the control signal for discontinuing the charging operation may be output based readily upon the result of the above arithmetic processing. However, the control signal for discontinuing the charging operation is better output by monitoring the voltage data a plurality of times through continual arithmetic processings and confirming that the drop in voltage is continuing.

FIGS. 13 to 18 illustrate changes in the temperature and voltage of a nickel-cadmium battery when it is charged according to the present invention in comparison with changes thereof when the nickel-cadmium battery is charged according to a prior art.

Figure 13:
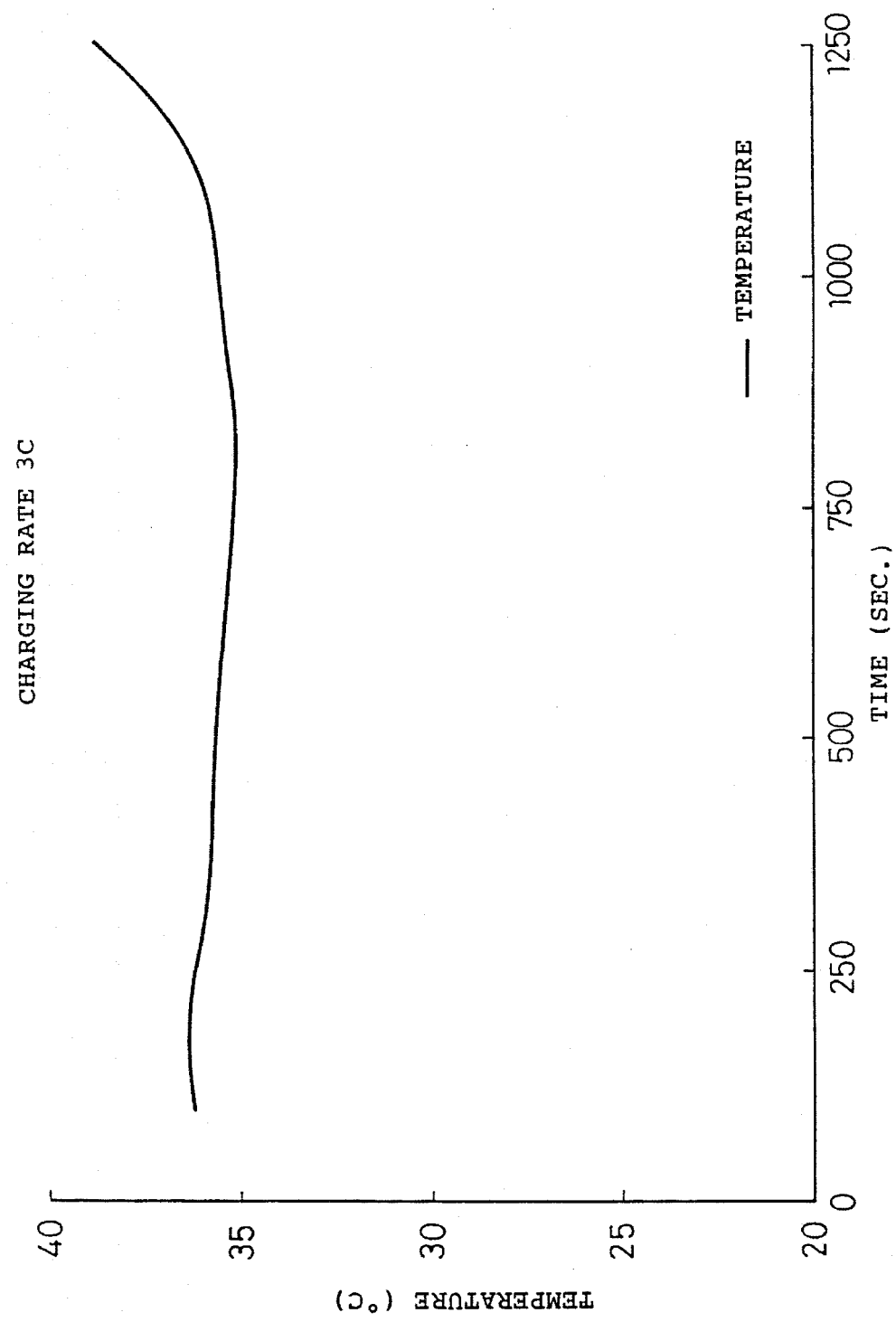
FIG. 13 to 16 are graphs showing measurements of the temperature and voltage of a nickel-cadmium cell while it is being charged using the charging apparatus of the invention.
Figure 14:
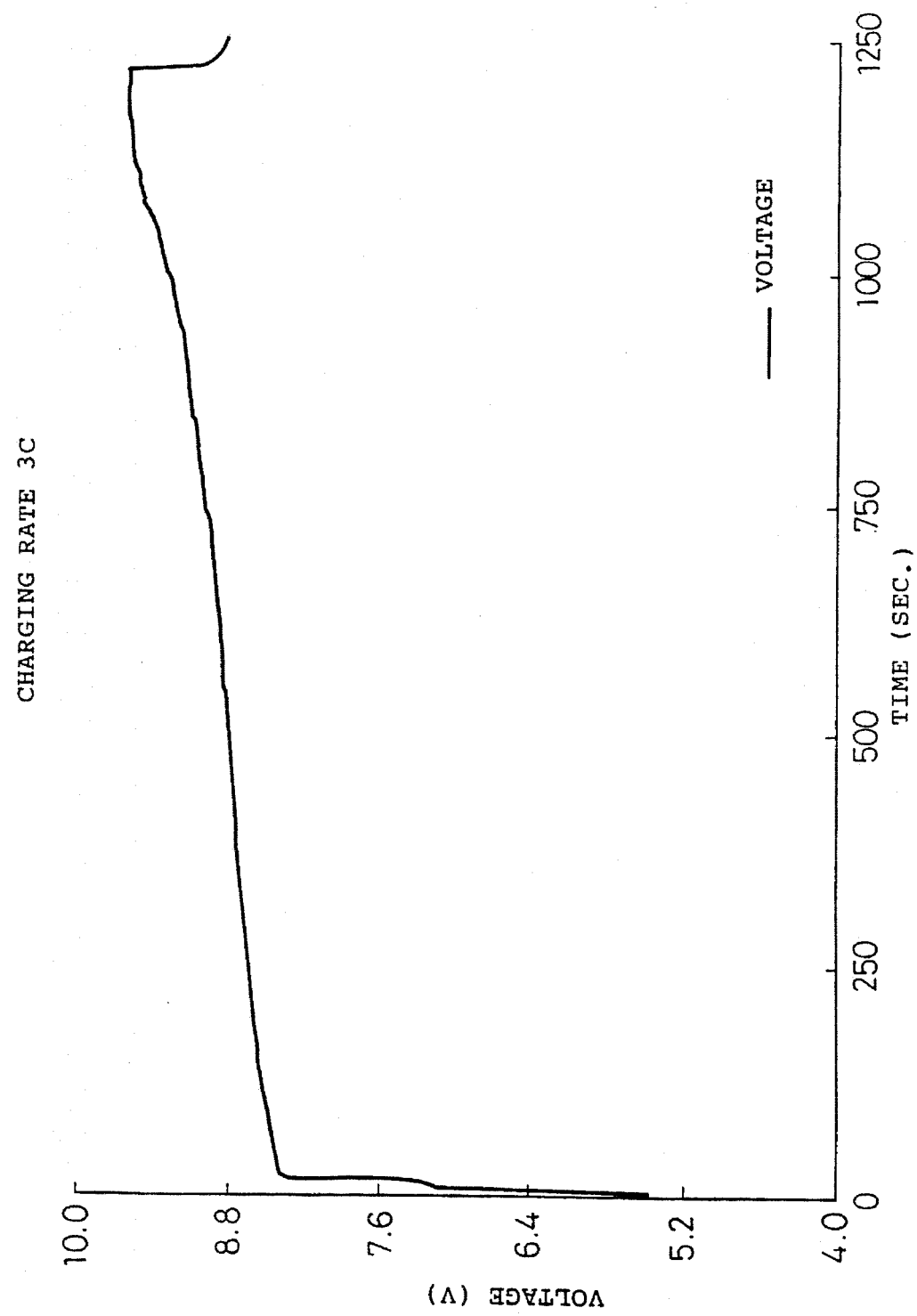

FIG. 13 is a diagram of waveforms showing a change in the cell temperature of the nickel-cadmium battery when it is rapidly charged with a large current of 3 C rate according to the present invention, and FIG. 14 is a diagram of waveforms showing a change in the voltage.

Figure 15:
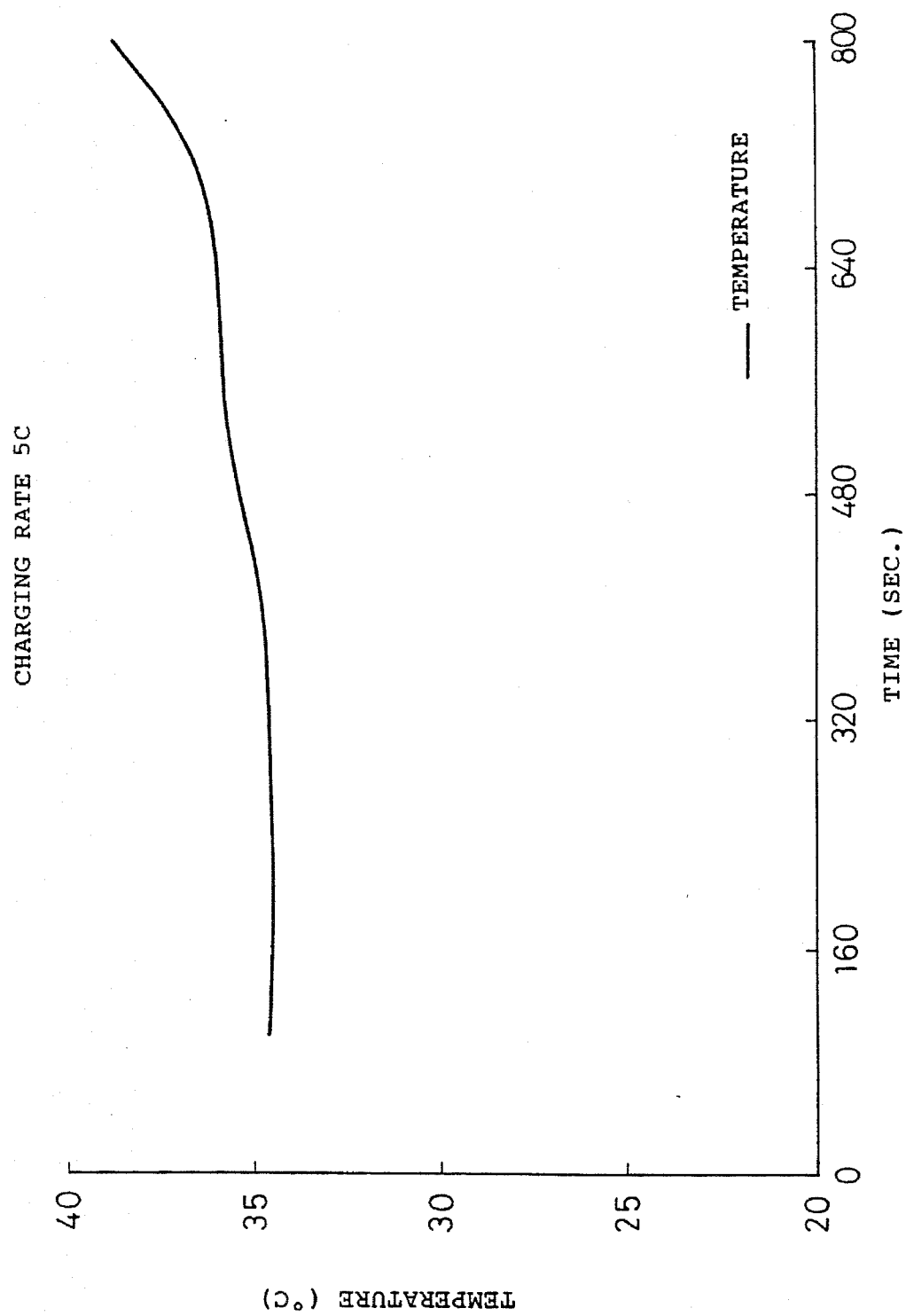
Figure 16:
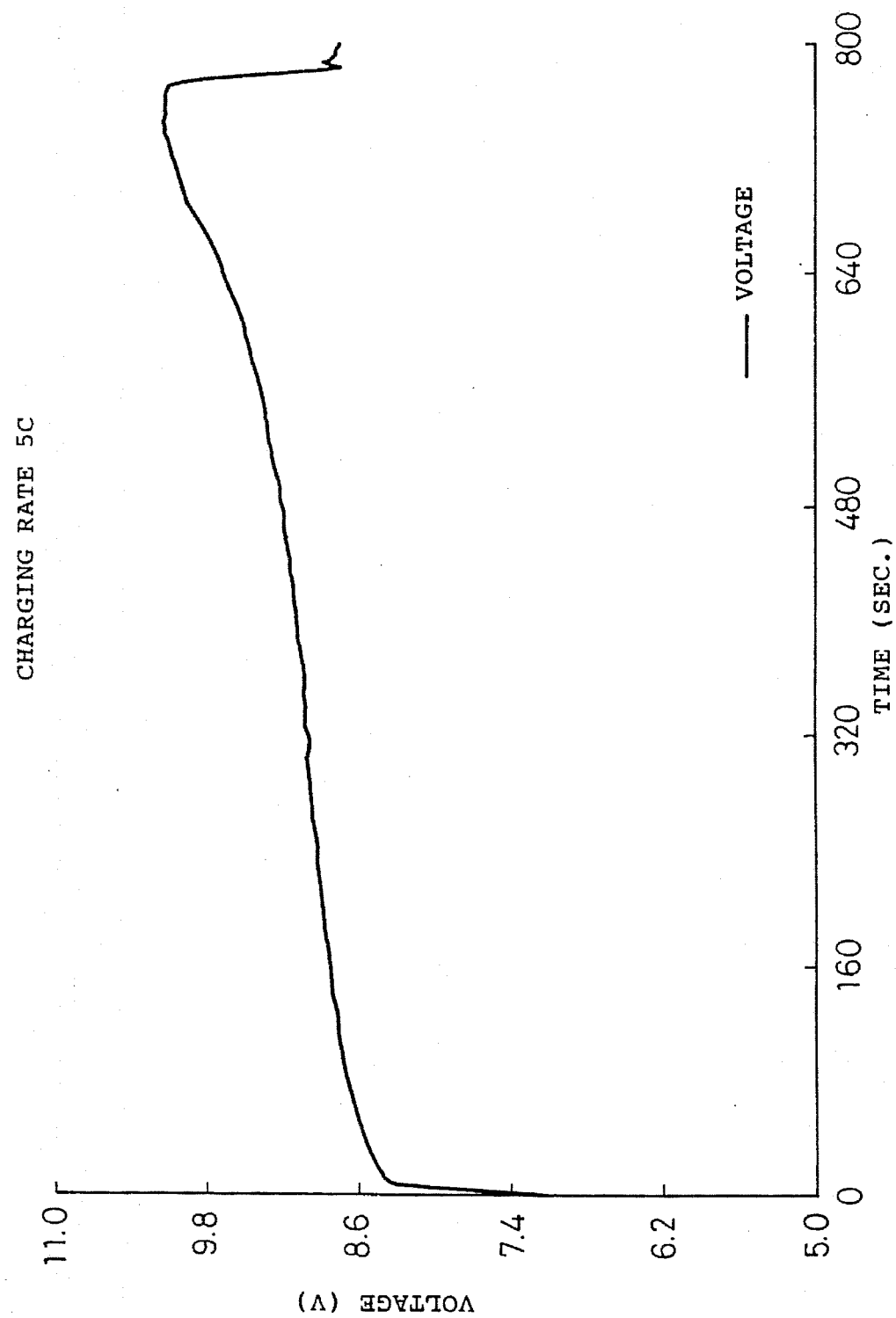
Figure 17:
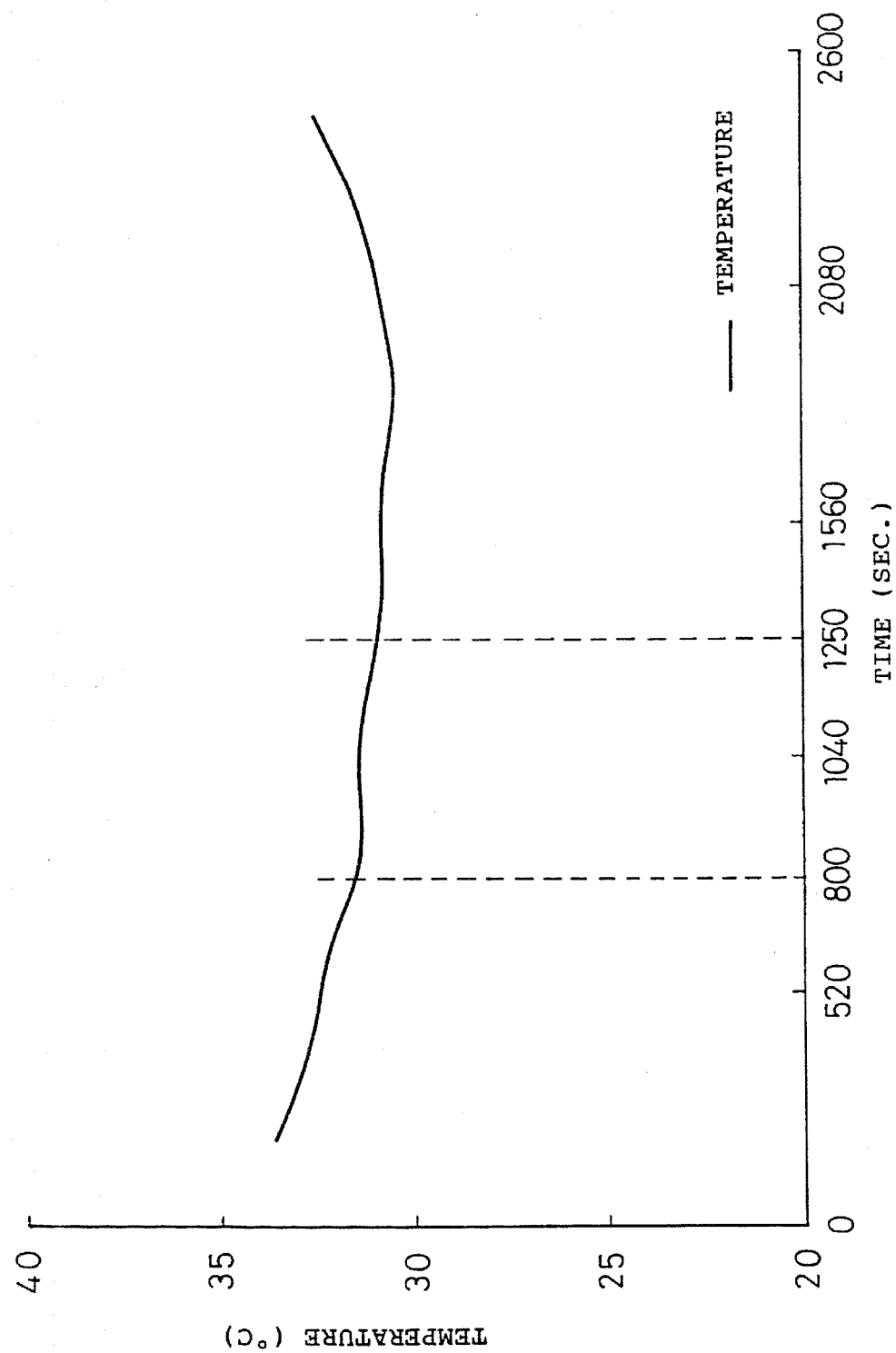
FIGS. 17 and 18 are graphs showing changes in the temperature and voltage when the nickel-cadmium cell is charged by a conventional charging method.
Figure 18:
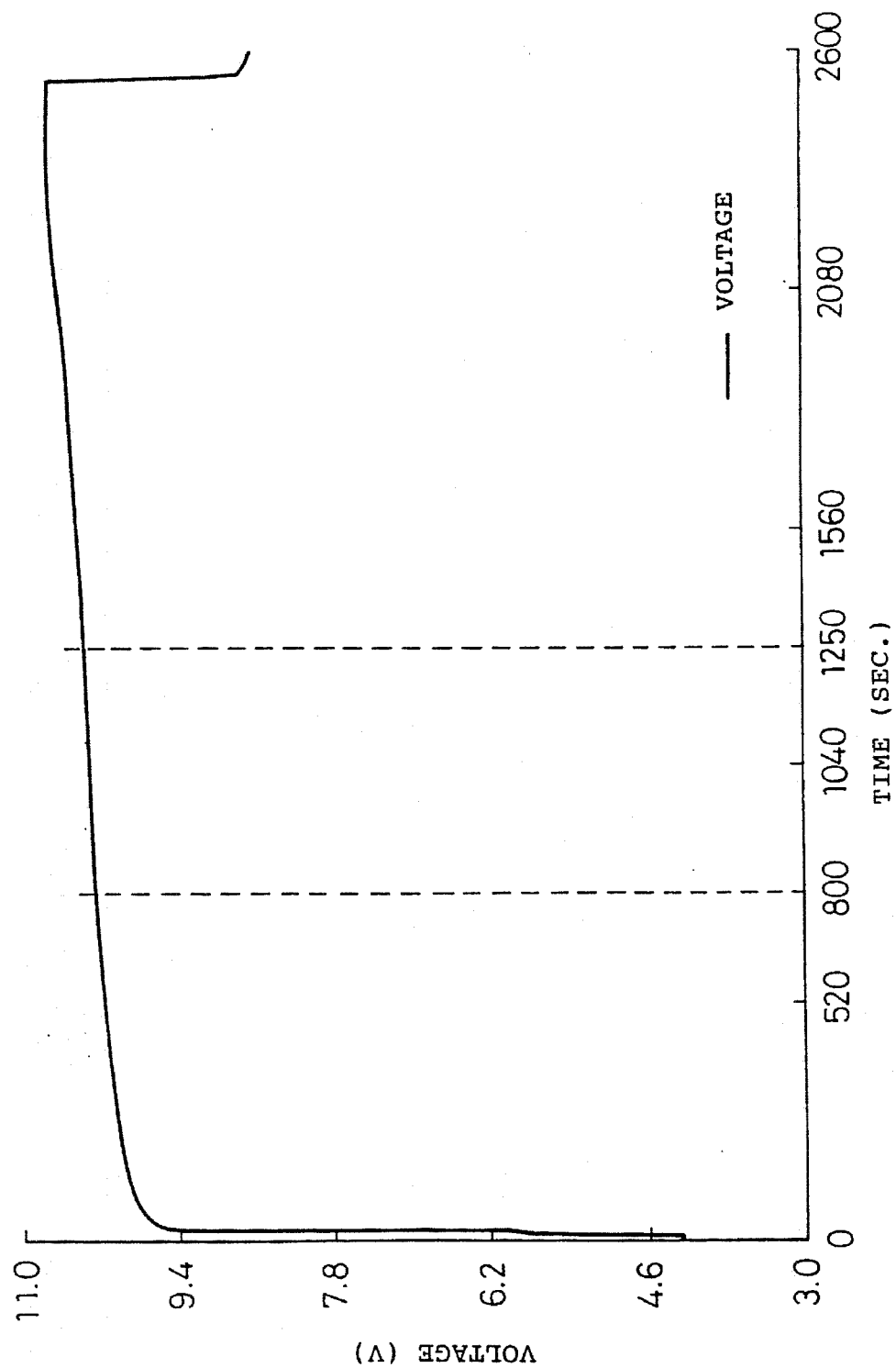

FIG. 15 is a diagram of when the nickel-cadmium battery is rapidly charged with a 5 C rate current according to the present invention. According to the conventional charging operation as will be understood from these drawings, at least 40 minutes are required for the cell to return to the completely charged state. Moreover, even when the charging rate of the nickel-cadmium battery has approached 100%, the rate of change in the temperature and voltage of the cell is relatively small and it is not possible to correctly and quickly judge the moment for discontinuing the charging operation.

According to the conventional charging operation, furthermore, it has been stated that the time for accomplishing 100% of charging rate of the cell that is the object of the invention by less than 20 minutes and, preferably, less than 10 minutes. At that period, however, no distinguishable change is recognized in the waveform, and there is no reason for judging that the charging operation should be continued or discontinued.

According to the present invention, on the other hand, it is possible to accomplish 100% charging rate within 20 minutes and, particularly, within 14 minutes with 4 C or 5 C rate.

Tables 1 to 3 show temperatures and voltages measured during a practical charging operation according to the invention of the cell that is charged, which serve as base data for the waveforms shown in FIGS. 13 to 18.

In Table 1, a nickel-cadmium battery, Model KR-1200AE, manufactured by Sanyo Denki Co. was charged with 1.5C rate which is a conventional rapid charging method, the temperature and voltage were measured at a rate of 50 samplings a second, and the sampled data obtained for every five seconds were shown as average values.

Tables 2 and 3 are the same measured data as those of Table 1, but where the battery, Model P60AARM manufactured by Matsushita Denko Co. was charged at a 3 C rate and 5 C rate, respectively.

Figure 19:
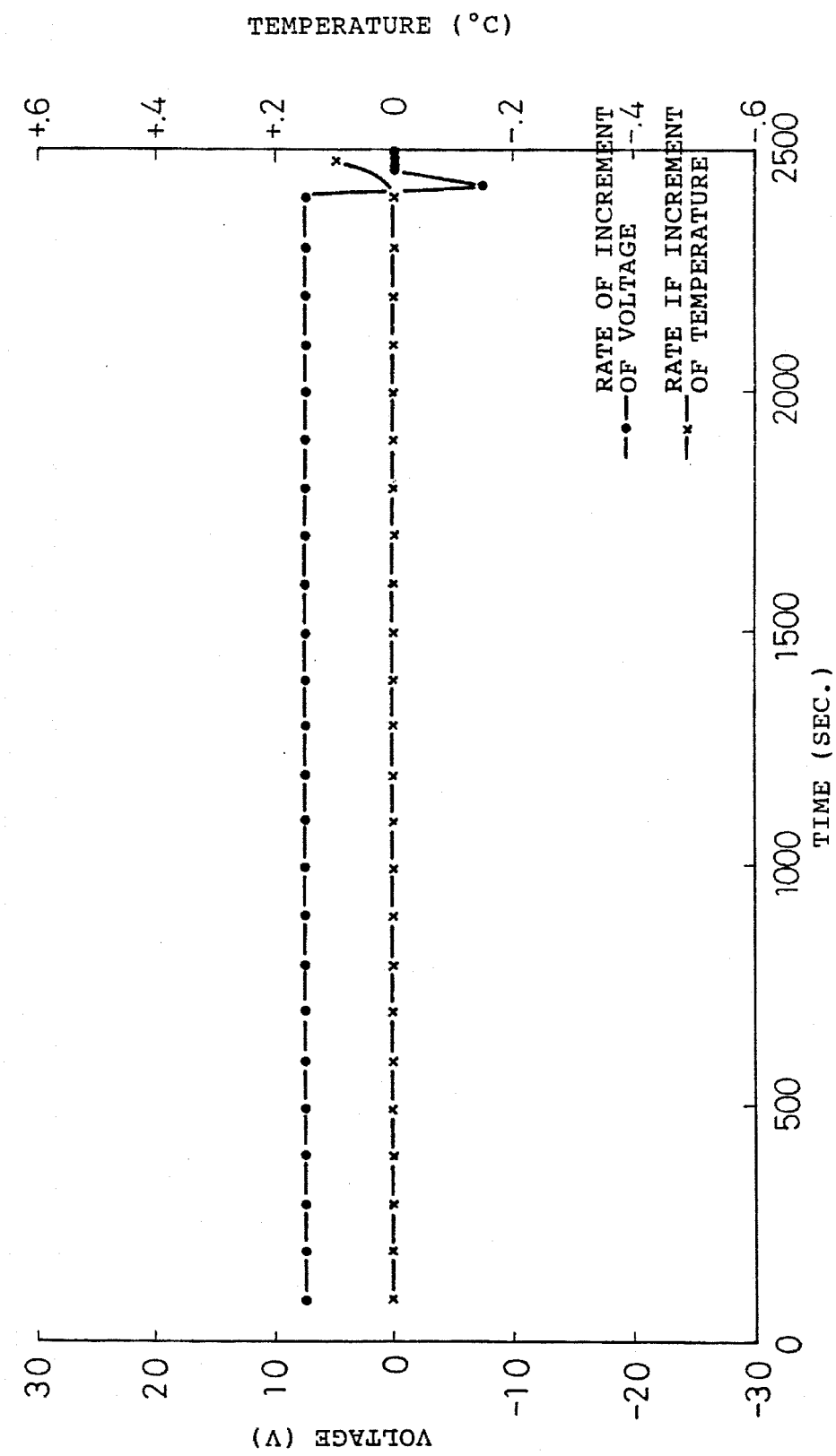
FIG. 19 is a graph showing the result of arithmetic processing of the rate of temperature increase and the rate of voltage increase based on the measured data shown in FIGS. 17 and 18.
Figure 20:
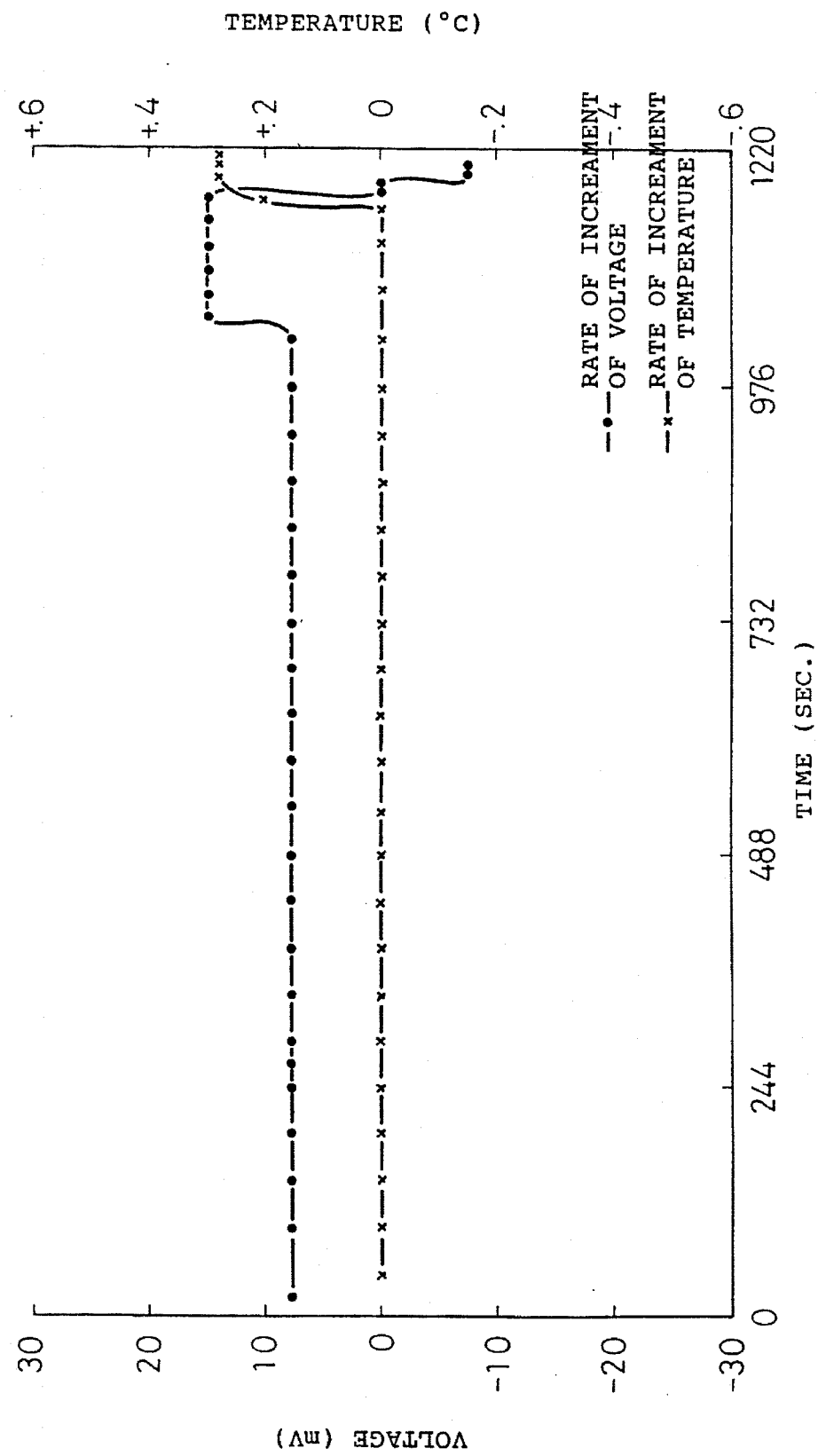
FIGS. 20 and 21 are graphs showing the results of arithmetic processing of the rate of temperature increase and the rate of voltage increase based on the measured data shown in FIGS. 13 to 16.
Figure 21:
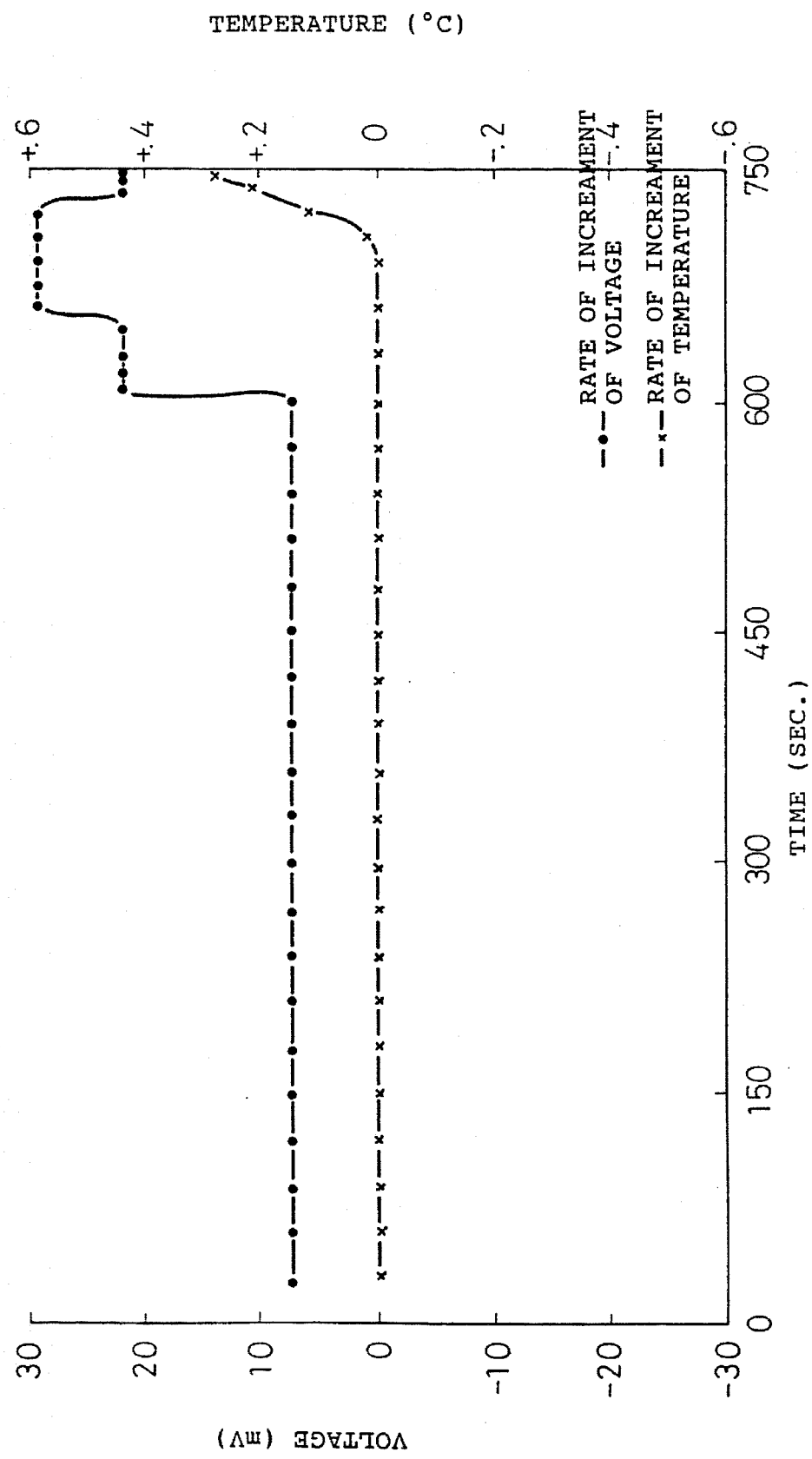

FIGS. 19 to 21 are graphs generated by calculating the rates of temperature and voltage increases concerning the data of Tables 1 to 3 relying upon the aforementioned definition.

FIG. 19 is a graph depicted by calculating the rates of temperature and voltage increases based on the data of Table 1 from which it will be understood that the rate of temperature and voltage increases almost do not change but continue to rise at the same rates until the charging time approaches 40 minutes, and the rate of temperature rise slightly increases as the charging time approaches 40 minutes. As for the voltage, the rate of voltage increase almost does not change but continues to rise nearly at the same rate before the charging time exceeds 40 minutes, but the rate of voltage increase suddenly drops as the charging time approaches 40 minutes.

On the other hand, FIG. 20 is a graph according to the present invention which is depicted by calculating the rates of temperature and voltage increases based on the data of Table 2, and FIG. 21 is a graph according to the present invention depicted by calculating the rates of temperature and voltage increases based on the data of Table 3, from which it will be understood that the rate of temperature increase increases remarkably within 20 minutes, and the rate of voltage increase changes dramatically as the charging rate approaches 100%, and the rate of voltage increase declines and the voltage suddenly drops when the charging rate approaches 100%.

Figures 22, 22A:
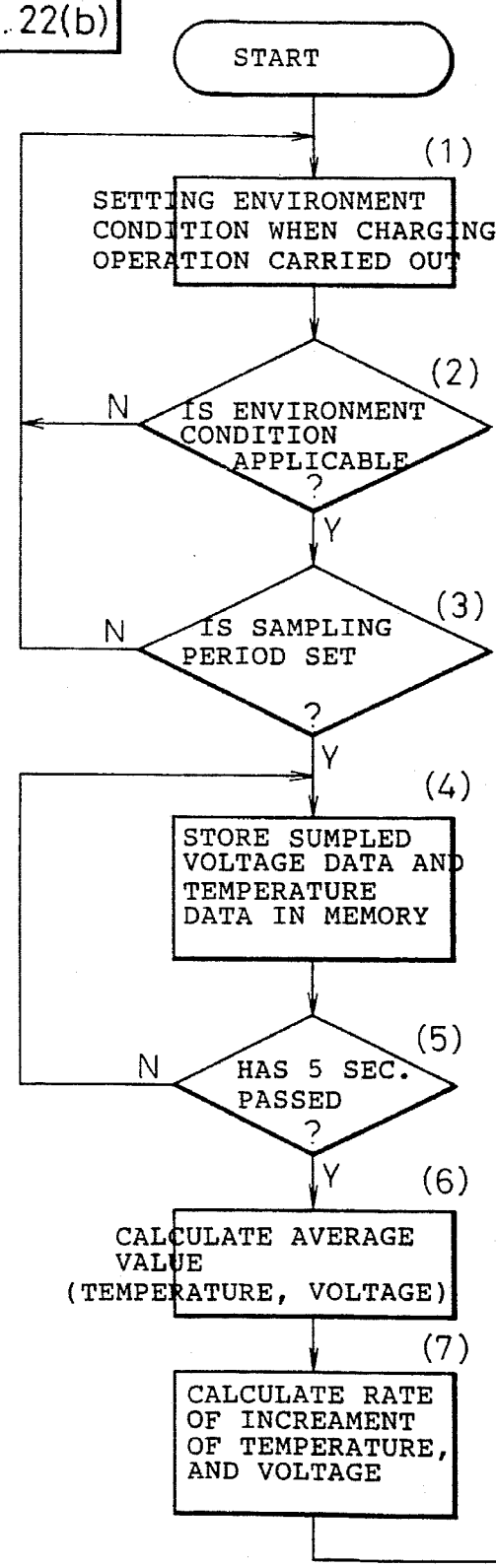
FIGS. 22a and 22b are flowcharts illustrating the sequence of the charging method according to the invention.
Figure 22B:
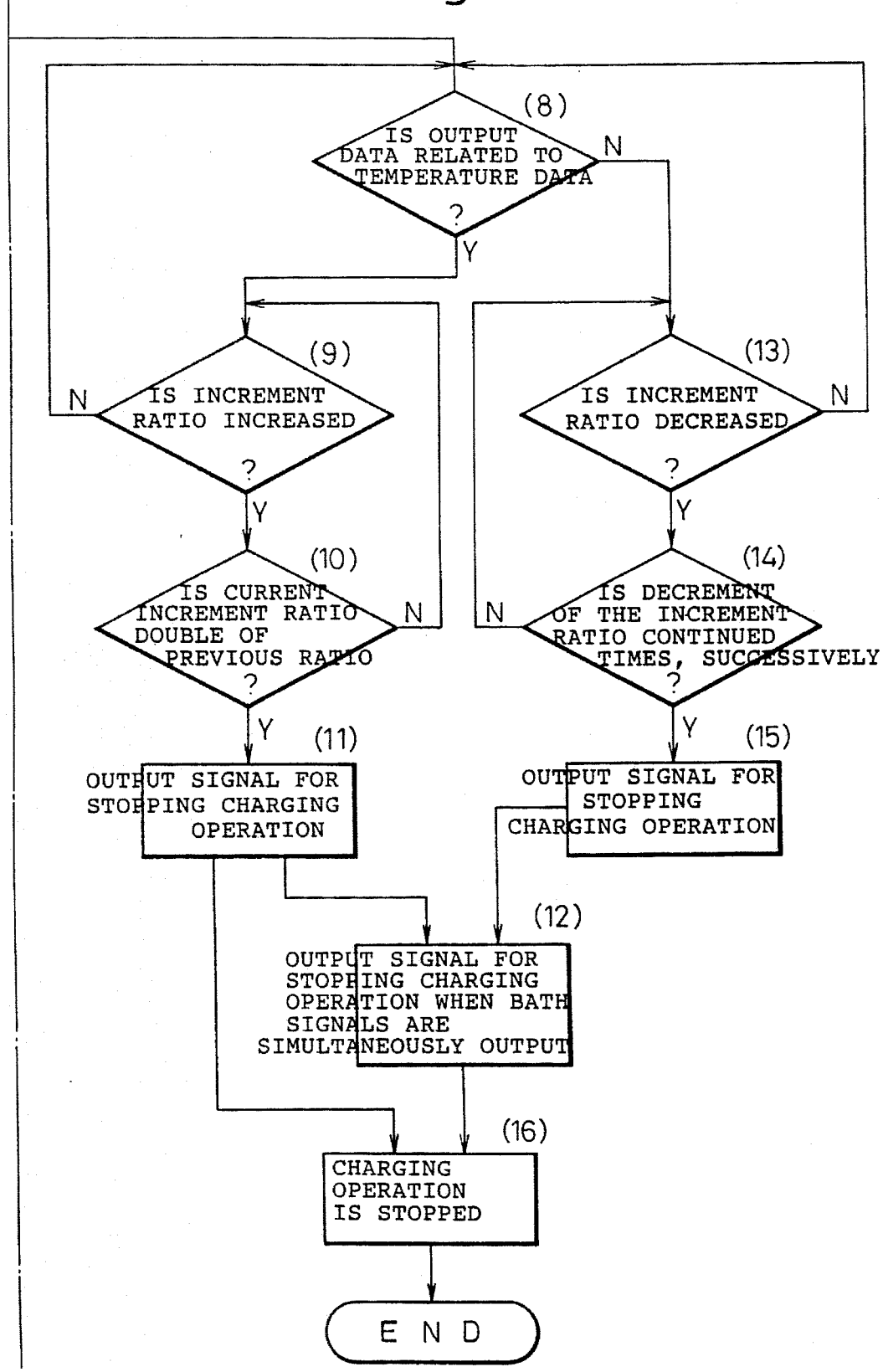

Next, the procedure of arithmetic processing method in the charging operation according to the present invention will be described by using a flowchart of FIG. 22.

After the start, first, a step (1) checks the characteristics of the nickel-cadmium battery and sets an environment for charging the nickel-cadmium battery.

That is, in the present invention, it is desired that the nickel-cadmium battery is charged within a temperature range of from −10 degrees to +45 degrees. Therefore, the temperature is first measured to determine whether such a temperature environment is established or not, and then the environment is set so that the charging operation can be normally executed.

Then, a step (2) judges whether an environment suitable for the charging operation is established or not. When the answer is no, the procedure returns to the step (1) and when the answer is yes, the procedure proceeds to a step (3) where it is judged whether the sampling period is set for measuring both the temperature and the voltage (i.e., not measuring only the temperature of the nickel-cadmium battery). When the answer is no, the procedure returns back to the step (1) to repeat the above operation. When the answer is yes, the procedure proceeds to a step (4) where the temperature and/or the voltage of the nickel-cadmium battery are measured in synchronism with clock signals that are output in synchronism with the sampling period.

The measured data related to the temperatures and voltages are once stored in a memory means provided in, for example, the sampling means or in a memory means provided in the arithmetic means 6.

Then, a step (5) judges whether a predetermined charging operation time has passed, for example, whether five seconds have passed. When the answer is no, the procedure returns back to the step (4) and when the answer is yes, the procedure proceeds to a step (6) which calculates average values of the temperature and voltage data measured during five seconds.

That is, average values ($T_{AV1}, T_{AV2}, \ldots, T_{Vn}$) of cell temperatures and average values ($V_{AV1}, V_{AV2}, \ldots, V_{Vn}$) of cell voltages during five seconds are calculated and are stored in the second memory means 63.

The procedure then proceeds to a step (7) which calculates a change in the average values of the temperatures and voltages in the neighboring period relying upon the average values calculated in the step (6).

That is, for the temperature, the amounts of change ($V_{T1}, V_{T2}$) in the average values of temperatures are calculated as follows for the average value $T_{AV1}$ in the first period, i.e., in the first five seconds, for the average value $T_{AV2}$ in the second period which lasts five seconds following the first period, and for the average value $T_{AV3}$ in the third period which lasts five seconds following the second period; i.e., $$T_{AV2}-T_{AV1}=V_{T1}$$

$$T_{AV3}-T_{AV2}=V_{T2}$$

and the results are stored in the third memory means 65.

For the voltage, the amounts of change ($V_{V1}, V_{V2}$) in the average values of temperatures are calculated as follows for the average value $V_{AV1}$ in the first period, for the average value $V_{AV2}$ in the second period and for the average value $V_{AV3}$ in the third period; i.e., $$V_{AV2}-V_{AV1}=V_{V1}$$

$$V_{AV3}-V_{AV2}=V_{V2}$$

and the results are similarly stored in the third memory means 65.

Then, in the present invention, the procedure proceeds to a step (8) where it is judged whether the data being calculated are related to the temperature or not. When the answer is yes, the procedure proceeds to a step (9) where it is judged whether the rate of temperature increase is rising or not. When the answer is no, the procedure returns back to the step (8) and when the answer is yes, the procedure proceeds to a step (10) where it is judged whether the rate of temperature increase of the cell is more than twice as great as the rate of temperature increase of the cell that was measured in the previous time. When the answer is yes, the procedure proceeds to a step (11) which generates a control signal to instruct the discontinuation of the charging operation, and a step (16) actually discontinues the charging operation. When the answer is no, however, the procedure returns back to the step (9) to repeat the aforementioned operations.

When the answer is no in the step (8), on the other hand, the procedure proceeds to a step (13) where it is judged whether the rate of voltage increase has declined immediately following a period during which the rate of voltage increase has continually risen. When the answer is no, the procedure returns back to the step (8) and when the answer is yes, the procedure proceeds to a step (14) where it is judged whether the decline in the rate of voltage increase is continually detected three times. When the answer is no, the procedure returns back to the step (13) to repeat the above-mentioned steps and when the answer is yes, the procedure proceeds to a step (15) which generates a control signal to instruct the discontinuation of the charging operation, and the procedure proceeds to a step (12).

The step (12) is so constituted as to optionally receive an output signal from the step (11) that judges the change in the rate of temperature increase, and outputs a control signal for discontinuing the charging operation based also upon the signal from the step (15) that judges a change in the voltage by adopting an AND logic.

Next, described below is a concrete circuit constitution of the charging apparatus used in the present invention.

Figure 23:
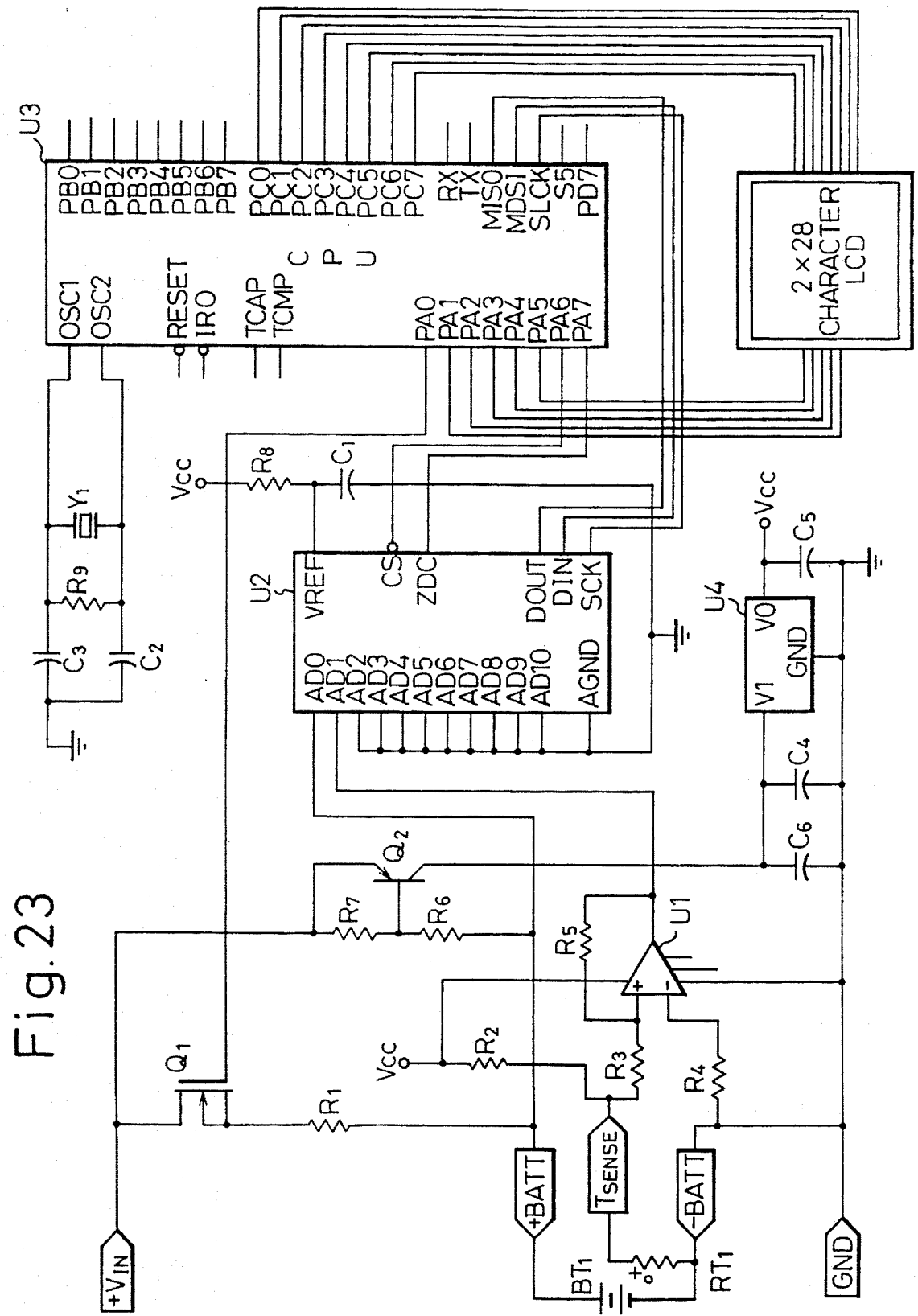
FIG. 23 is a block diagram showing the circuit constitution of the charging apparatus of the invention.

FIG. 23 is a diagram explaining a concrete circuit constitution of the charging apparatus according to the present invention and is an electronic circuit schematic diagram of a battery charger capable of rapidly recharging a secondary cell at greater than a 2 C rate, in accordance with the invention. The circuit senses battery voltage and/or temperature and controls the application of charging current to the battery in accordance with certain predetermined parameters, while providing a real time display of the battery's voltage and temperature.

The circuit functions as follows. $BT_1$ designates the battery (2 in FIG. 9) which is to be recharged via charging current supplied by power MOSFET $Q_1$ (MOS field-effect transistor) through resistor $R_1$. The temperature measuring means 4 which is a temperature sensing thermistor $RT_1$ coupled to the battery's casing produces a temperature output signal $T_{sense}$ representative of the temperature of the battery 2. $T_{sense}$ is amplified by analog amplifier U1. $RT_1$, in combination with resistor $R_2$, forms a voltage divider network in which the resistive value of RT1 changes in proportion to changes in the battery's temperature. The first channel (AD0) of 10-channel analog to digital converter U2 receives an electrical input signal +BATT representative of the voltage of the battery 2. The second channel (AD1) receives the amplified temperature-representative signal output by the analog amplifier U1. The other channels of analog to digital converter U2 are not used.

Analog to digital converter U2 converts its input signals from analog form into a digital form suitable for input to integrated circuit microcontroller U3 which corresponds to the arithmetic means 6 and the central control means 8 of the invention, which has on-board RAM, ROM and I/O ports. Microcontroller U3 is preprogrammed to read the digital data signals from the analog to digital converter U2, process the data, and control MOSFET $Q_1$ as hereinafter described.

In this embodiment, the memory means which are explained with reference to FIG. 6 or 12 are all provided in the integrated circuit microcontroller U3 which is the arithmetic means.

Microcontroller U3 also outputs suitable signals for displaying real time digital representations of the battery voltage and temperature on a 2×28 character liquid crystal display 100.

Fixed voltage regulator U4 supplies a regulated voltage signal $V_{CC}$ to power the circuit. PNP transistor $Q_2$ acts as a switch to couple the input power supplied across terminals $+V_{in}$ and GND to voltage regulator U4 when battery $BT_1$ is present, and decouples the input power from U4 when no battery is present.

The following table provides electronic part specifications for the circuit components depicted in FIG. 23 and described herein:

| Reference | Description |
| --- | --- |
| $Q_1$ | Intl. Rectifier IRF350 power mosfet (MOS field-effect transistor) |
| $Q_2$ | Motorola 2N3906 PNP transistor |

-continued

| Reference | Description |
|---|---|
| $RT_1$ | Fenwal 192-303KET-A01 thermistor |
| $R_1$ | 5 ohms, 25 watt, 10% |
| $R_2$ | 30K ohms, ¼ watt |
| $R_3$ | 10K ohms, ¼ watt |
| $R_4$ | 10K ohms, ¼ watt |
| $R_5$ | 10K ohms, ¼ watt |
| $R_6$ | 510 ohms, ¼ watt |
| $R_7$ | 100 ohms, ¼ watt |
| $R_8$ | 10K ohms, ¼ watt |
| $R_9$ | 1M ohms, ¼ watt |
| $C_1$ | 1 µF capacitor, 35 volt electrolytic |
| $C_2$ | 22 pF capacitor, 35 volt electrolytic |
| $C_3$ | 22 pF capacitor, 35 volt electrolytic |
| $C_4$ | 10 µF capacitor, 35 volt electrolytic |
| $C_5$ | 1 µF capacitor, 35 volt electrolytic |
| $C_6$ | 0.1 µF capacitor, 35 volt electrolytic |
| $U_1$ | Motorola uA741 operational amplifier |
| $U_2$ | Motorola 145051 A/D converter |
| $U_3$ | Motorola 68HC705C8 microprocessor |
| $U_4$ | Motorola LM7805 voltage regulator |
| Display | Optrex DMC16230 liquid crystal display |

Figure 24:
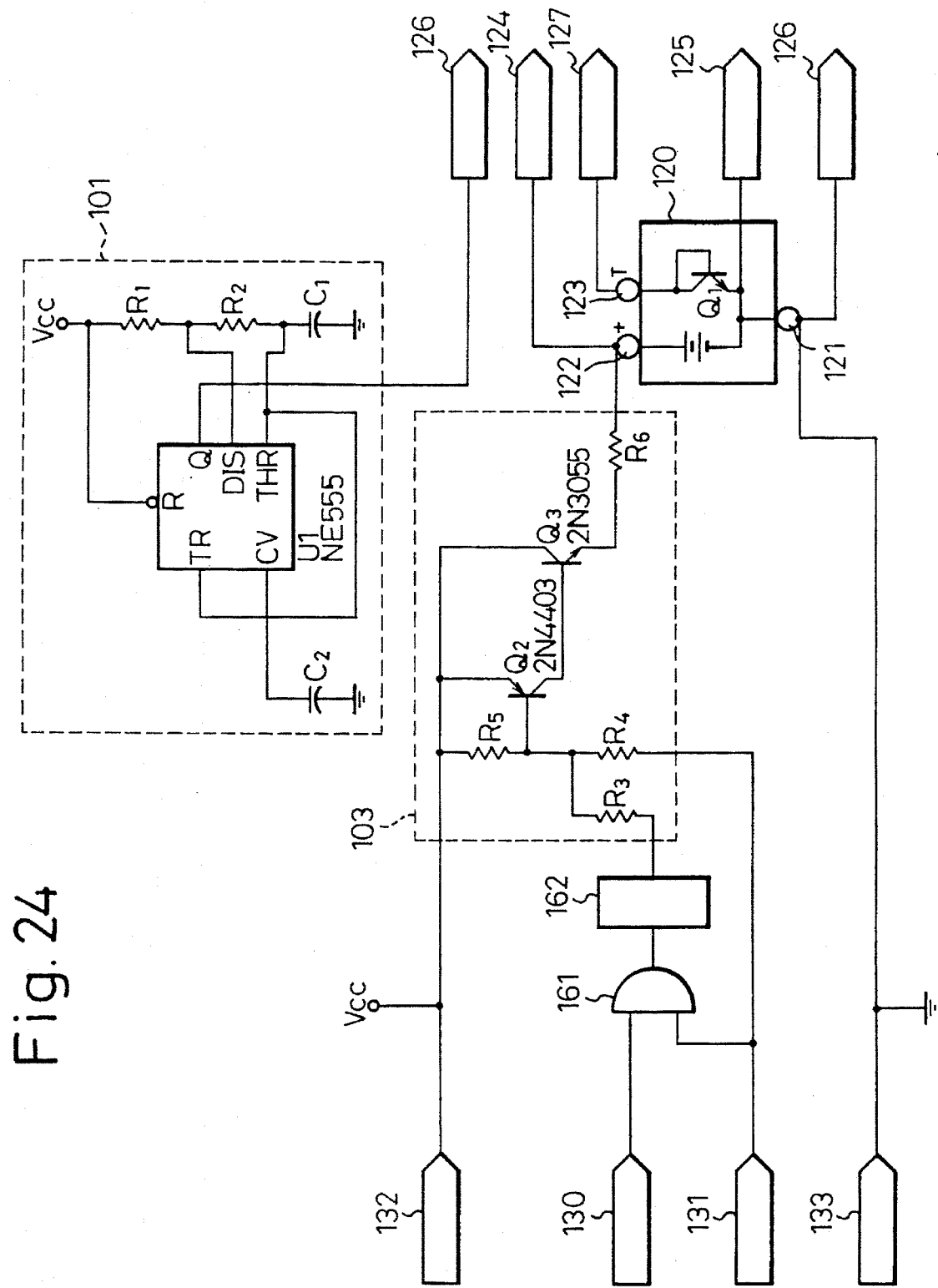
FIG. 24 is a block diagram showing the circuit constitution of a power supply portion in the charging apparatus of the invention.
Figure 25:
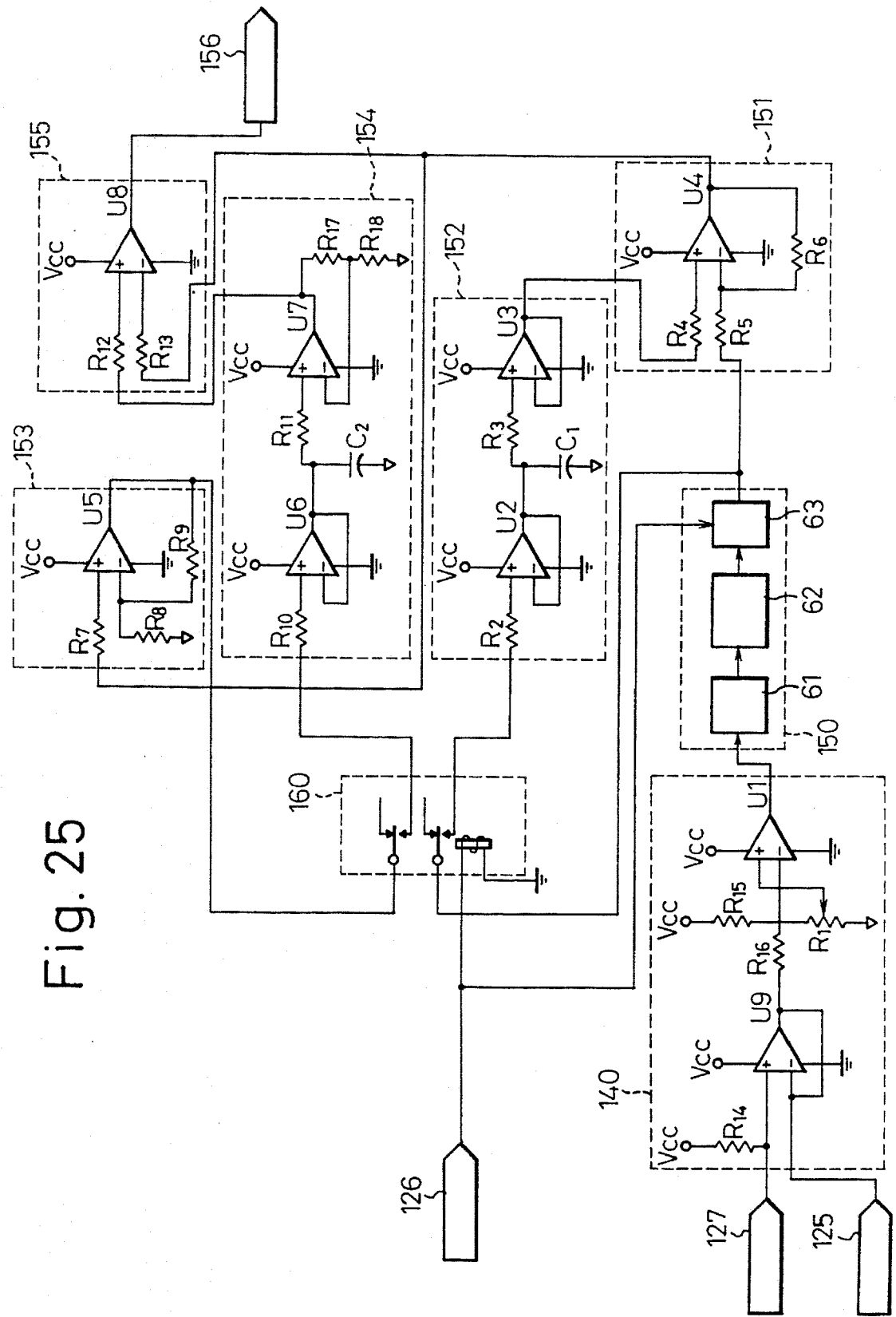
FIG. 25 is a block diagram showing the circuit constitution of a temperature measuring circuit and an arithmetic processing circuit thereof in the charging apparatus of the invention.
Figure 26:
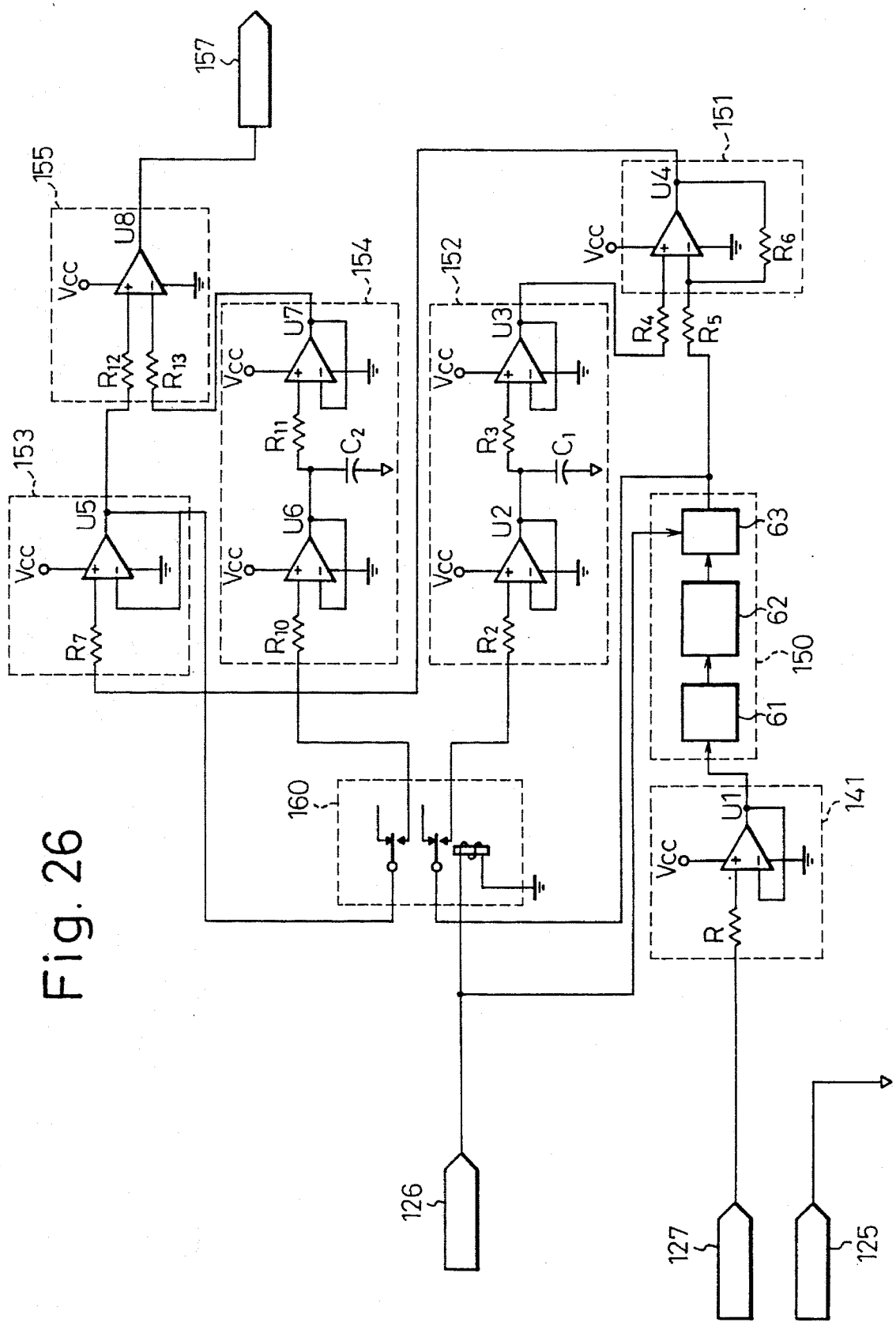
FIG. 26 is a block diagram showing the circuit constitution of a voltage measuring circuit and an arithmetic processing circuit thereof in the charging apparatus of the invention.

Described below with reference to FIGS. 24 to 26 is another embodiment of the circuit constitution of the apparatus for rapidly charging nickel-cadmium batteries according to the present invention.

FIG. 24 is a block diagram illustrating the circuit constitution of a battery connection portion of the charging apparatus of the invention, a power supply portion and a clock generating portion.

In FIG. 24, reference numeral 122 denotes a voltage input terminal of a nickel-cadmium battery (secondary battery) 120 that is to be charged, and 121 denotes a ground terminal.

Reference numeral 123 denotes a terminal to which is connected a positive potential terminal 127 of the cell temperature measuring means 4, and reference numeral 125 denotes a negative potential terminal of the temperature measuring means which is connected to the ground terminal 121 of the battery that is connected to a low potential power source terminal 133 that is grounded.

Moreover, to the positive and negative voltage input terminals 122 and 121 of the battery are respectively connected positive and negative terminals 124 and 126 of the voltage measuring means 41 that measures the output voltage of the battery.

Furthermore, to the positive voltage (high potential power source) input terminal 122 of the battery is connected the output of a power source control circuit 103 that is connected to a predetermined high potential power source 132.

The power source control circuit 103 is constituted by two transistors Q2, Q3 and resistors R3, R6. The transistors Q2 and Q3 exhibit a switching function for discontinuing the supply of charging current to the battery in response to temperature measurement data and voltage measurement data of the battery that will be described later.

Reference numeral 101 denotes a clock generating circuit which is made up of, for example, an NE555 integrated circuit chip and generates clocks having a predetermined duty ratio from the output terminal 126 thereof.

As a clock signal output from the clock generating circuit 101, there may be generated, for example, a pulse having an ON width of 0.5 seconds once in every five seconds or a pulse maintaining a frequency of, for example, 0.2 Hz and having an on duty ratio of 5% (5%/95%).

Next, FIG. 25 is a block diagram which concretely illustrates the arithmetic processing circuit that executes the temperature measurement and the aforementioned arithmetic processing.

In FIG. 25, the voltage data from the terminals 127 and 125 of the temperature measuring means 4 connected to the battery 120 is regulated into a predetermined voltage through a voltage buffer means 140 constituted by differential amplifiers U9 and U1, and is then input to a data processing circuit 150 which is constituted by the first memory means 61 that stores the sampled temperature or voltage data used in the invention, the arithmetic processing means 62 which calculates an average value of the data from the temperature or voltage data stored in the first memory means 61 within a predetermined period of time, e.g., five seconds, and the second memory means 62 which stores an average value for every predetermined period of time calculated by the arithmetic processing means 62.

On the other hand, the aforementioned clock signal output from the clock signal generating means 101 of FIG. 24 is input to the terminal 126, input to a change-over circuit 160 constituted by a relay K1, and is further input to the aforementioned second memory means 63.

The change-over circuit 160 constituted by the relay K1 is normally off and is maintained in the off condition when no pulse is input.

As the clock signal is input to generate the pulse once in five seconds, the first average data $T_{AV1}$ of average values of temperatures or voltages in every five seconds which have been arithmetically processed and stored in the second memory means 63 is output in synchronism with the clock signal and is input to an arithmetic circuit 151 that constitutes what is called the second arithmetic means 64 of the invention that is made up of a differential amplifier U4. At this moment, since the change-over circuit 160 has been turned on, the average data $T_{AV1}$ passes through the change-over circuit 160 and is stored in a temporary memory circuit 152 constituted by differential amplifiers U2, U3 and a capacitor C1.

The output of the temporary memory circuit 152 is input to a non-inverting input terminal of the differential amplifier U4 that constitutes the arithmetic circuit, and a difference from the output of the second memory means 63 input to the inverting terminal is calculated.

As the pulse of the clock signal is turned off, the change-over circuit 160 is turned off, and the temperature data $T_{AV1}$ that is output first is stored in the temporary memory circuit 152.

Next, as the second clock pulse is input, the second average value $T_{AV2}$ in the second memory means 63 is input to the second arithmetic circuit 151, and a difference $T_{AV2}-T_{AV1}$ is calculated relative to the temperature data $T_{AV1}$ stored in the temporary memory circuit 152, and a rate of the temperature change in the first period is determined.

At the same time, the temperature data of the previous time stored in the temporary memory circuit 152 is substituted by the average value $T_{AV2}$ of this time.

Then, as the next clock pulse is input, the third average value $T_{AV3}$ is similarly input from the second memory means 63 to the second arithmetic circuit 151, and a difference $T_{AV3}-T_{AV2}$ is calculated relative to the temperature data $T_{AV2}$ stored in the temporary memory circuit 152 to thereby determine a rate of temperature change in the second period.

That is, in this embodiment, the second arithmetic means 64 and the third arithmetic means 65 perform the arithmetic processing in the common circuit 151.

The output $(T_{AV2}-T_{AV1})$ of the second arithmetic circuit 151 is input to the buffer 153 constituted by a differential amplifier U5 and to an arithmetic circuit 155 that constitutes the fourth arithmetic means 66 of the invention made up of a differential amplifier U8.

The output ($T_{AV2}-T_{AV1}$) of the second arithmetic circuit 151 input to the buffer 153 is stored in a separate temporary memory circuit 154 constituted by the differential amplifiers U6, U7 and a capacitor C2 passing through the change-over circuit 160 which is turned on.

By setting the gain of the buffer 153 to be 2, the temperature data output from the buffer 153 becomes $2(T_{AV2}-T_{AV1})$. Therefore, the data related to the rate of temperature change in the first period stored in the separate temporary memory circuit 154 becomes $2(T_{AV2}-T_{AV1})$.

Further, the output is input to the inverting input terminal of the arithmetic circuit 155 to calculate a difference from the rate of temperature change in the next period, i.e., in the second period output from the second arithmetic circuit 151.

That is, the arithmetic circuit 155 executes the arithmetic processing, i.e., $$(T_{AV3}-T_{AV2})-2(T_{AV2}-Y_{AV1})>0$$

That is, the fourth arithmetic processing means 66 outputs a positive voltage when the rate of temperature change in the second period greatly rises in excess of two fold of the rate of temperature change in the first period obtained by the sampling five seconds before, and whereby it is judged that the charging rate of the nickel-cadmium battery has reached nearly 100%, and the charging operation is discontinued.

That is, under the above-mentioned condition, the output of the fourth arithmetic processing means 66 is input from the output terminal 156 to the input terminal 131 of the power source control circuit 103 of FIG. 24 to turn off the transistor Q2 that constitutes the power source control circuit 103 and to interrupt the current supplied from the power source 132 to the nickel-cadmium battery 120.

FIG. 26 is a block diagram explaining the constitution of the arithmetic processing circuit which measures the output voltage when the nickel-cadmium battery that is being rapidly charged and which is used together with the temperature measuring means.

In FIG. 26, the circuit constitution of the voltage measuring means is basically the same as the aforementioned temperature measuring means.

That is, in FIG. 26, the voltage data from terminals 124 and 126 of the voltage measuring means 41 connected to the battery 120 is regulated to a predetermined voltage through the voltage buffer means 141 constituted by the differential amplifier U1, and is input to a data processing circuit 150 constituted by the first memory means 61 which stores the sampled voltage data used in the invention, the arithmetic processing means 62 which calculates average values of data in a predetermined period of time, for example, in five seconds from the voltage data stored in the first memory means 61, and the second memory means 63 which stores average values of every predetermined period calculated by the arithmetic processing means 62.

On the other hand, the clock signal output from the clock signal generating means 101 of FIG. 24 is input to the terminal 126, to the change-over circuit 160 constituted by the relay K1, and to the second memory means 63.

The change-over circuit 160 constituted by the relay K1 is normally off, and stays in the off condition when there is no input pulse.

As the clock signal is input to generate the pulse once in five seconds, the first average data $V_{AV1}$ of average value of voltages in every five seconds which have been arithmetically processed and stored in the second memory means 63 is output in synchronism with the clock signals and is input to the arithmetic circuit 151 that constitutes what is called the second arithmetic means 64 of the present invention that is made up of the differential amplifier U4. At this moment, since the change-over circuit 160 has been turned on, the average data $V_{AV1}$ passes through the change-over circuit 160 and is stored in the temporary memory circuit 152 constituted by differential amplifiers U2, U3 and the capacitor C1.

The output of the temporary memory circuit 152 is input to a non-inverting input terminal of the differential amplifier U4 that constitutes the aforementioned arithmetic circuit, and a difference from the output of the second memory means 63 input to the inverting terminal is calculated.

As the pulse of the clock signal is turned off, the change-over circuit 160 is turned off, and the voltage data $V_{AV1}$ that is output first is stored in the temporary memory circuit 152.

Next, as the second clock pulse is input, the second average value $V_{AV2}$ in the second memory means 63 is input to the second arithmetic circuit 151, and a difference $V_{AV2}-V_{AV1}$ is calculated relative to the voltage data $V_{AV1}$ stored in the temporary memory circuit 152, and a rate of the voltage change in the first period is determined.

At the same time, the voltage data of the previous time stored in the temporary memory circuit 152 is substituted by the average value $V_{AV2}$ of this time.

Then, as the next clock pulse is input, the third average value $V_{AV3}$ is similarly input from the second memory means 63 to the second arithmetic circuit 151, and a difference $V_{AV3}-V_{AV2}$ is calculated relative to the voltage data $V_{AV2}$ stored in the temporary memory circuit 152 to thereby determine a rate of voltage change in the second period.

The output ($V_{AV2}-V_{AV1}$) of the second arithmetic circuit 151 is input to the buffer 153 constituted by the differential amplifier U5 and to the arithmetic circuit 155 that corresponds to what is called the fourth arithmetic means 66 of the invention made up of the differential amplifier U8.

The output ($V_{AV2}-V_{AV1}$) of the second arithmetic circuit 151 input to the buffer 153 is stored in the separate temporary memory circuit 154 constituted by the differential amplifiers U6, U7 and the capacitor C2 passing through the change-over circuit 160 which is turned on.

Further, the output is input to the inverting input terminal of the arithmetic circuit 155 to calculate a difference from the rate of voltage change in the next period, i.e., in the second period output from the arithmetic circuit 153. That is, the arithmetic circuit 155 executes the arithmetic processing, i.e., $$(V_{AV3}-V_{AV2})-(V_{AV2}-V_{AV1})<0$$

That is, the fourth arithmetic processing means 66 outputs a positive voltage when the rate of voltage change in the second period becomes smaller than the rate of voltage change in the first period obtained by the sampling five seconds before, and indicates a negative state, and whereby it is judged that the charging rate of the nickel-cadmium battery has reached nearly 100%. Then, the charging operation is discontinued when the AND logic indicates that both the above data and the data from the temperature measuring means are on.

That is, under the above-mentioned condition, the output of the fourth arithmetic processing means 66 is input from the output terminal 157 to the input terminal 130 of the power source control circuit 103 of FIG. 24 to turn off the transistor Q2 that constitutes the power source control circuit 103 and to interrupt the current supplied from the power source 132 to the nickel-cadmium battery 120.

For this purpose as shown in FIG. 24, it is desired that the input terminal 131 of the power source control circuit 103 to which the output terminal 156 for temperature measurement is connected, be connected to the transistor Q2 of the power source control circuit 103 via a suitable mode select circuit 162, and that the input terminal 131 of the power source control circuit 103 to which the output terminal for voltage measurement is connected and the input terminal 130 of the power source control circuit 103 to which the output terminal 157 for voltage measurement is connected, are both input to an AND circuit 161 and are further connected to the transistor Q2 of the power source control circuit 103 via the mode select circuit 162.

Parts in the circuits of FIGS. 24 to 26 are concretely described below.

In the circuit constitution of FIG. 24:

| | |
|---|---|
| $C_1$ | 10 µF |
| $C_2$ | 0.1 µF |
| $Q_1$ | NPN transistor |
| $Q_2$ | 2N4403 transistor |
| $Q_3$ | 2N3055 transistor |
| $R_1$ | 576 kiloohms |
| $R_2$ | 72 kiloohms |
| $R_3, R_4$ | 470 ohms |
| $R_5$ | 1 kiloohms |
| $R_6$ | 2RO 25 watts |
| $U_1$ | NE555 |

In the circuit constitution of FIG. 25:

| | |
|---|---|
| $C_1, C_2$ | 1.0 µF |
| $K_1$ | relay DPDT |
| $R_1$ | 50 kiloohms |
| $R_2, R_4, R_5, R_6, R_7, R_8,$ $R_8, R_9, R_{10}, R_{12}, R_{13}$ | 10 kiloohms |
| $R_3, R_{11}, R_{15}, R_{17}, R_{18}$ | 100 Kiloohms |
| $R_{14}$ | 110 kiloohms |
| $R_{16}$ | 2.7 kiloohms |
| $U_1, U_2, U_3, U_4, U_5,$ $U_6, U_7, U_8, U_9$ | 741 |

In the circuit constitution of FIG. 26:

| | |
|---|---|
| $C_1, C_2$ | 1.0 µF |
| $K_1$ | relay DPDT |
| $R_1, R_2, R_4, R_5, R_6, R_7,$ $R_8, R_9, R_{10}, R_{12}, R_{13}$ | 10 kiloohms |
| $R_3, R_{11}$ | 100 kiloohms |
| $U_1, U_2, U_3, U_4,$ $U_5, U_6, U_7, U_8$ | 741 |

Flowcharts of other processing operations for executing the method of rapidly charging nickel-cadmium batteries according to the present invention are briefly described below and are also shown in FIGS. 27 to 50.

That is, in FIG. 23, the microcontroller U3 is preprogrammed, in a manner well known to those skilled in the art, to perform the following functions: (1) read digitally encoded voltage signals representative of battery voltage and battery temperature from U2; (2) continuously monitor consecutive samples of the input signals to detect a two-fold increase in the rate of increase of battery temperature; or, a decline in the battery's rate of voltage increase immediately following a period during which the battery's rate of voltage increase has continually risen; or, both; (3) turn off $Q_1$ in order to discontinue rapid rate charging of the battery upon detection of either or both of the aforementioned conditions; or, if the battery's temperature or voltage specifications are exceeded; and, (4) display digital representations of the battery's real-time voltage and/or temperature.

Figure 27:
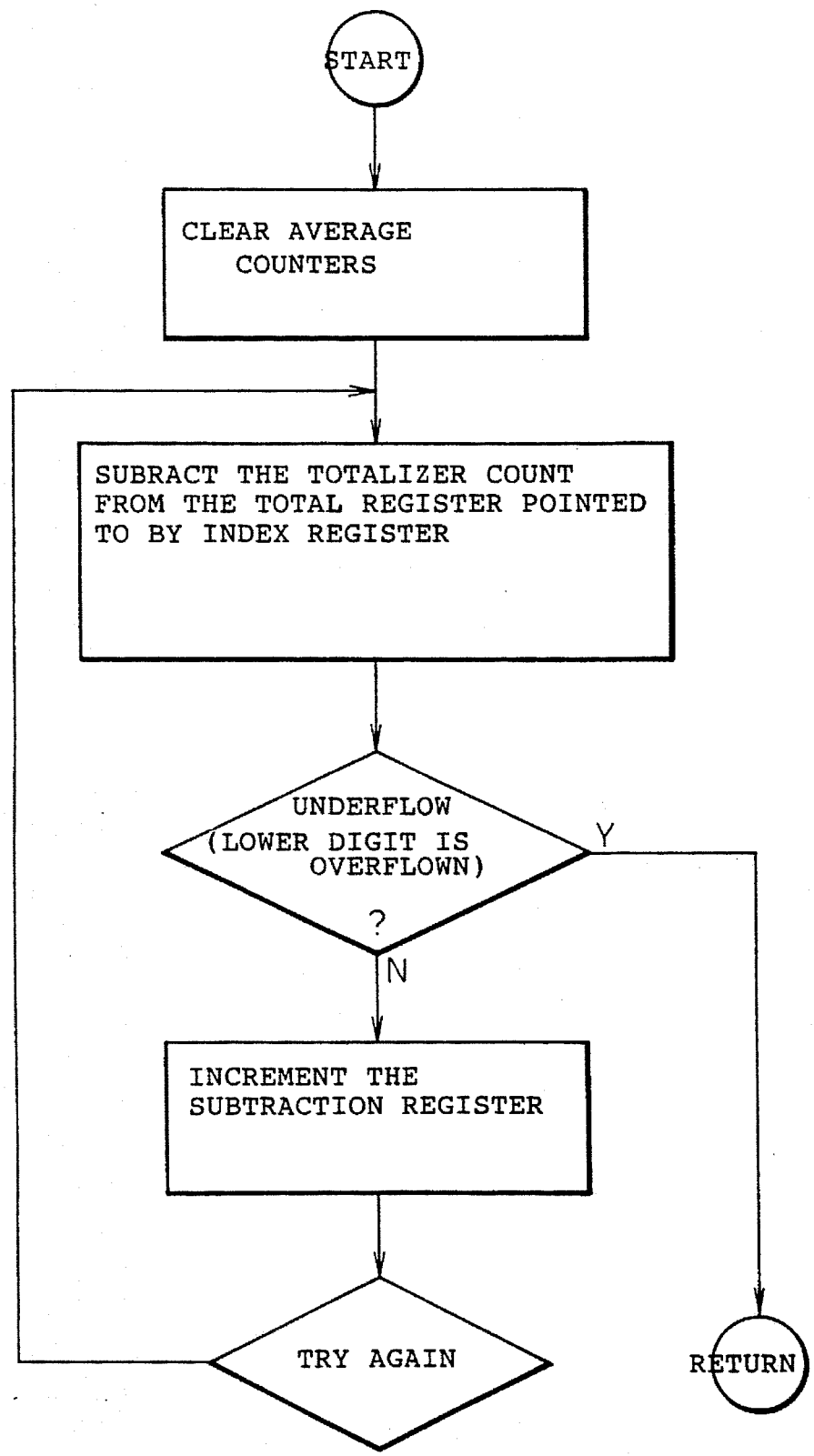
FIGS. 27 to 43 are flowcharts illustrating the sequence of other operations for putting the charging method of the invention into practice.
Figure 28:
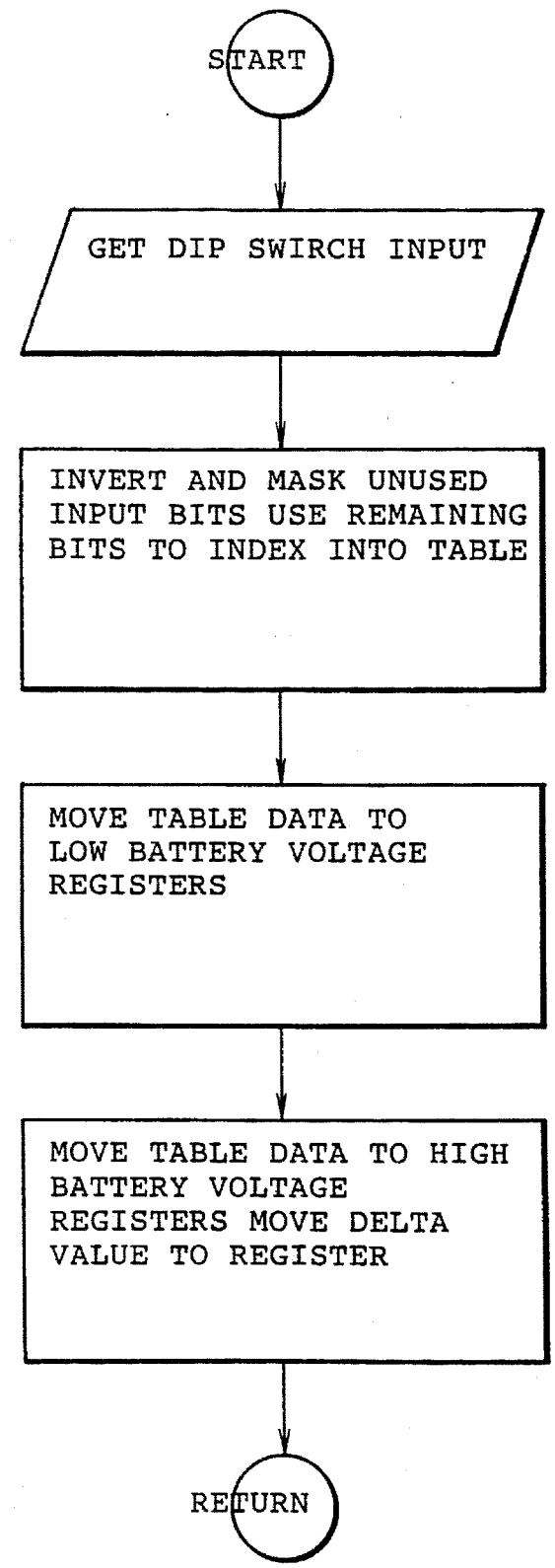

FIGS. 27 through 43 are software flowcharts depicting in more detail the sequence of operations which microcontroller U3 is programmed to perform. FIG. 27 illustrates an initialization sequence in which various working registers are established for later use by the software. FIG. 28 depicts a further initialization sequence in which data tables, pointers, etc. are established.

Figures 29, 29A:
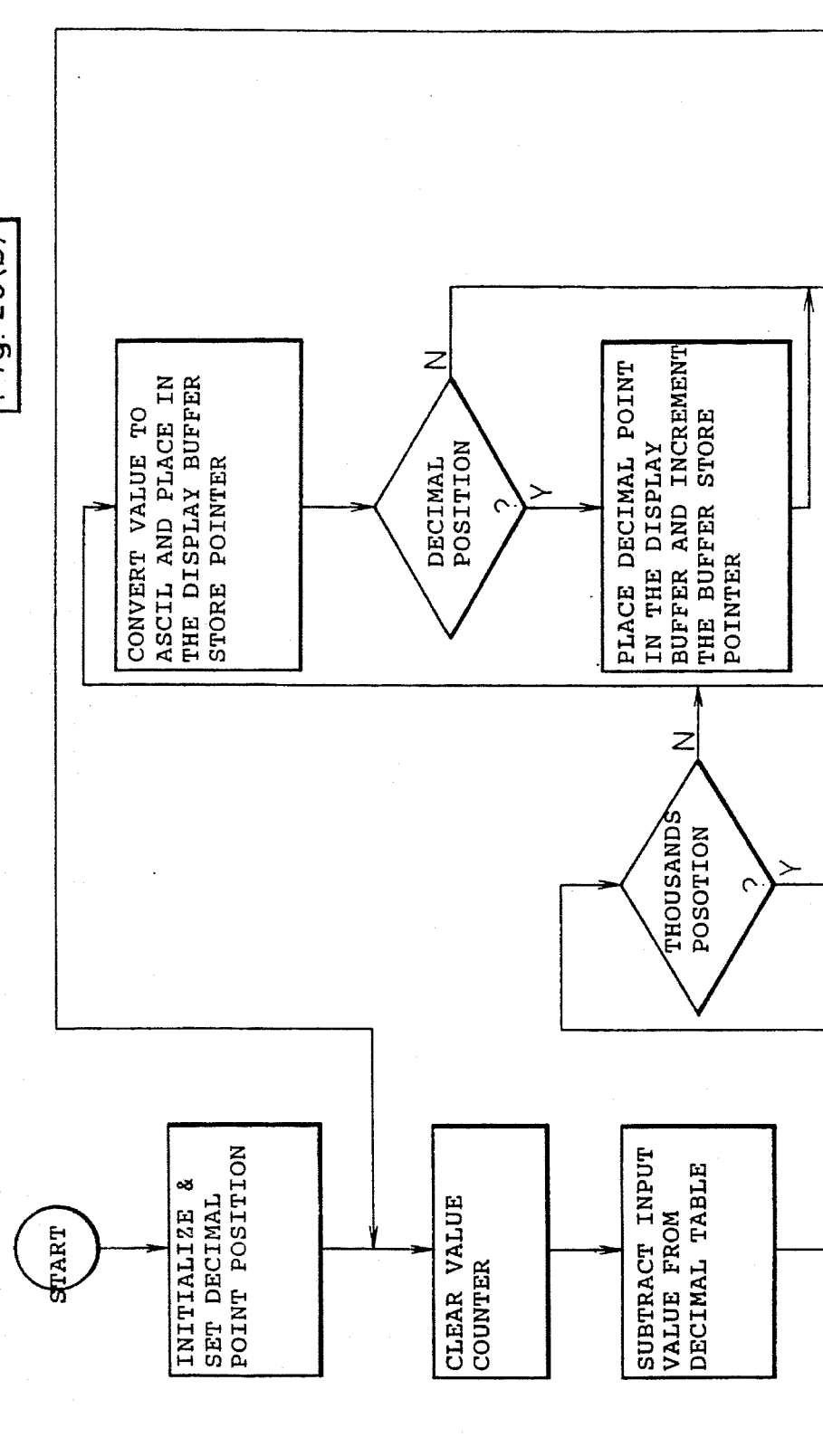
Figure 29B:
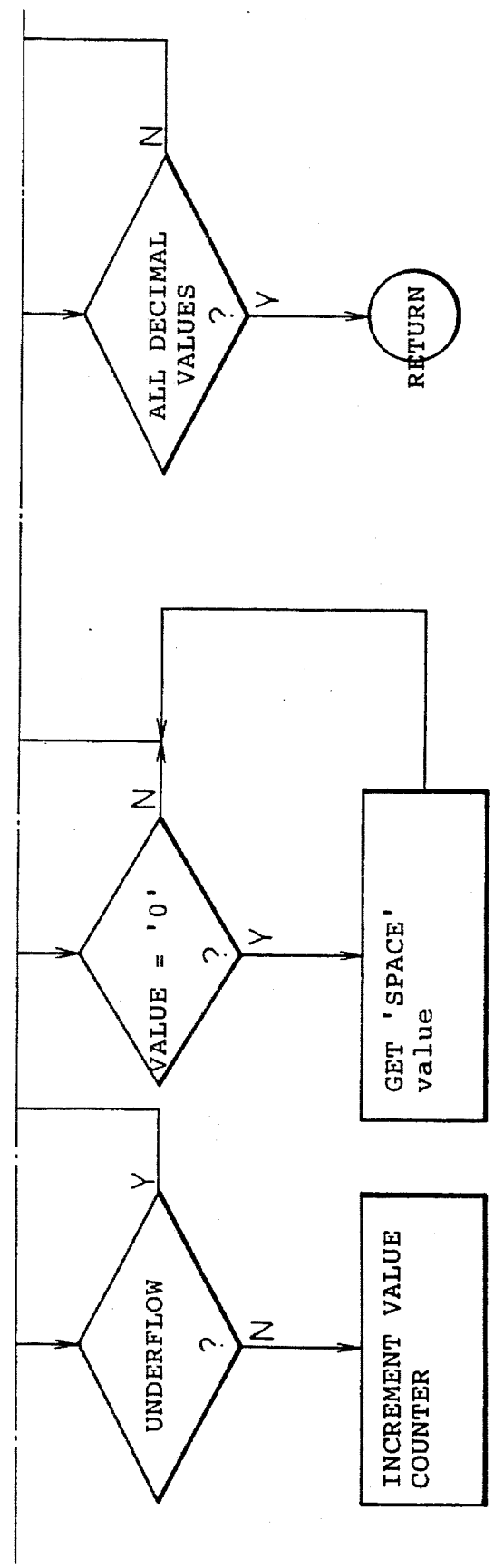
Figure 30:
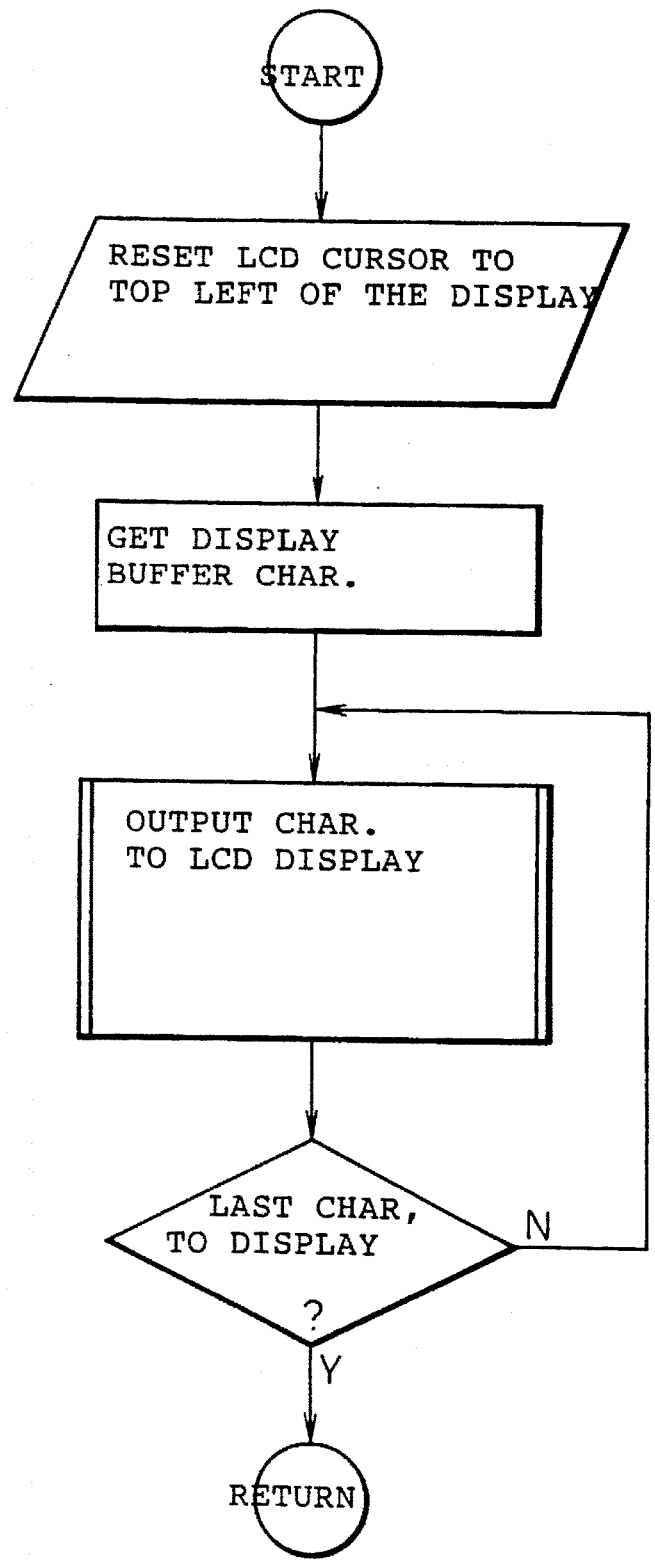

FIGS. 29(a) and (b) comprise a display subroutine in which binary data is converted into Ascii format for loading into a buffer. FIG. 30 is the subroutine which displays the buffer's contents on the liquid crystal display output device.

Figure 31:
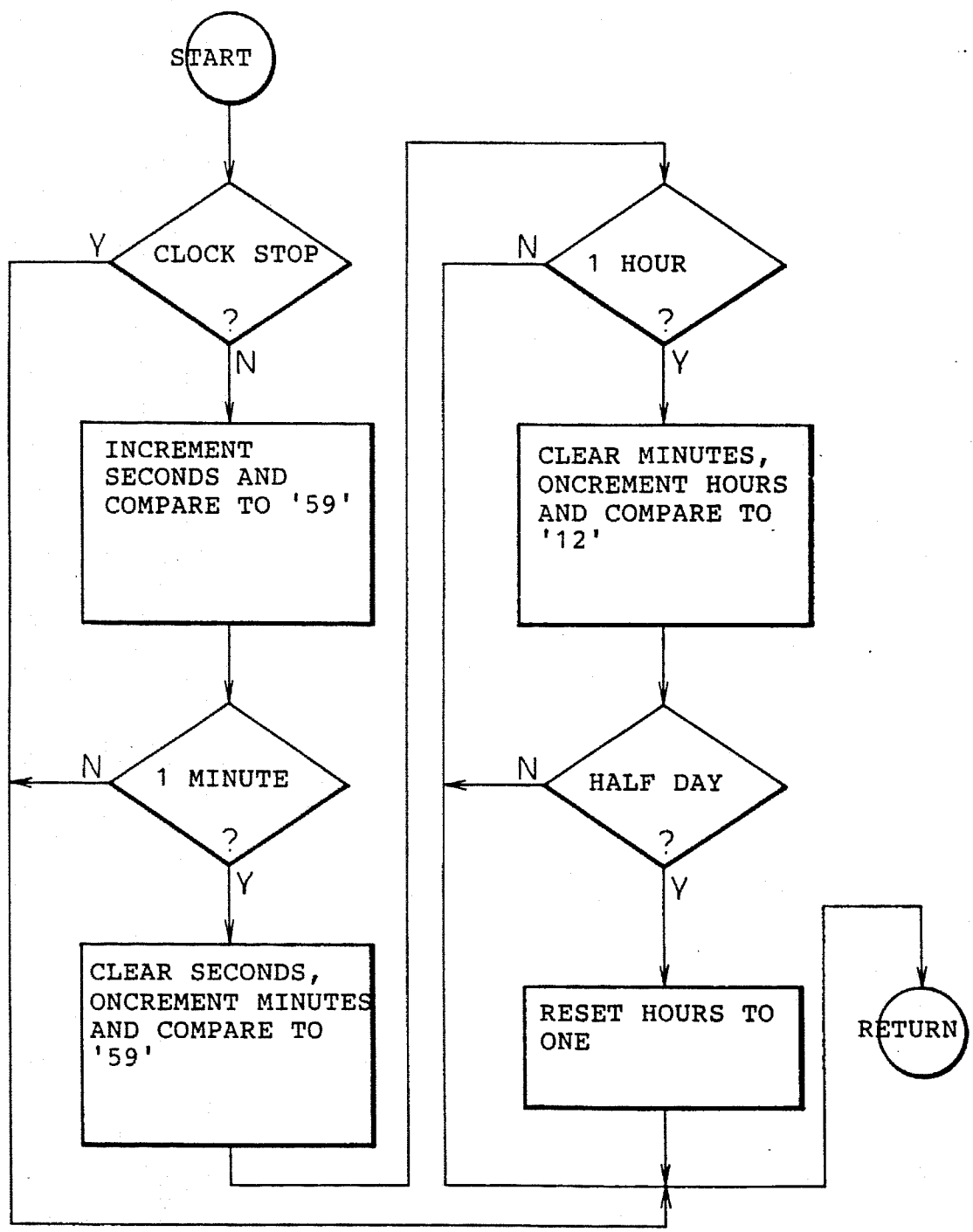
Figure 32:
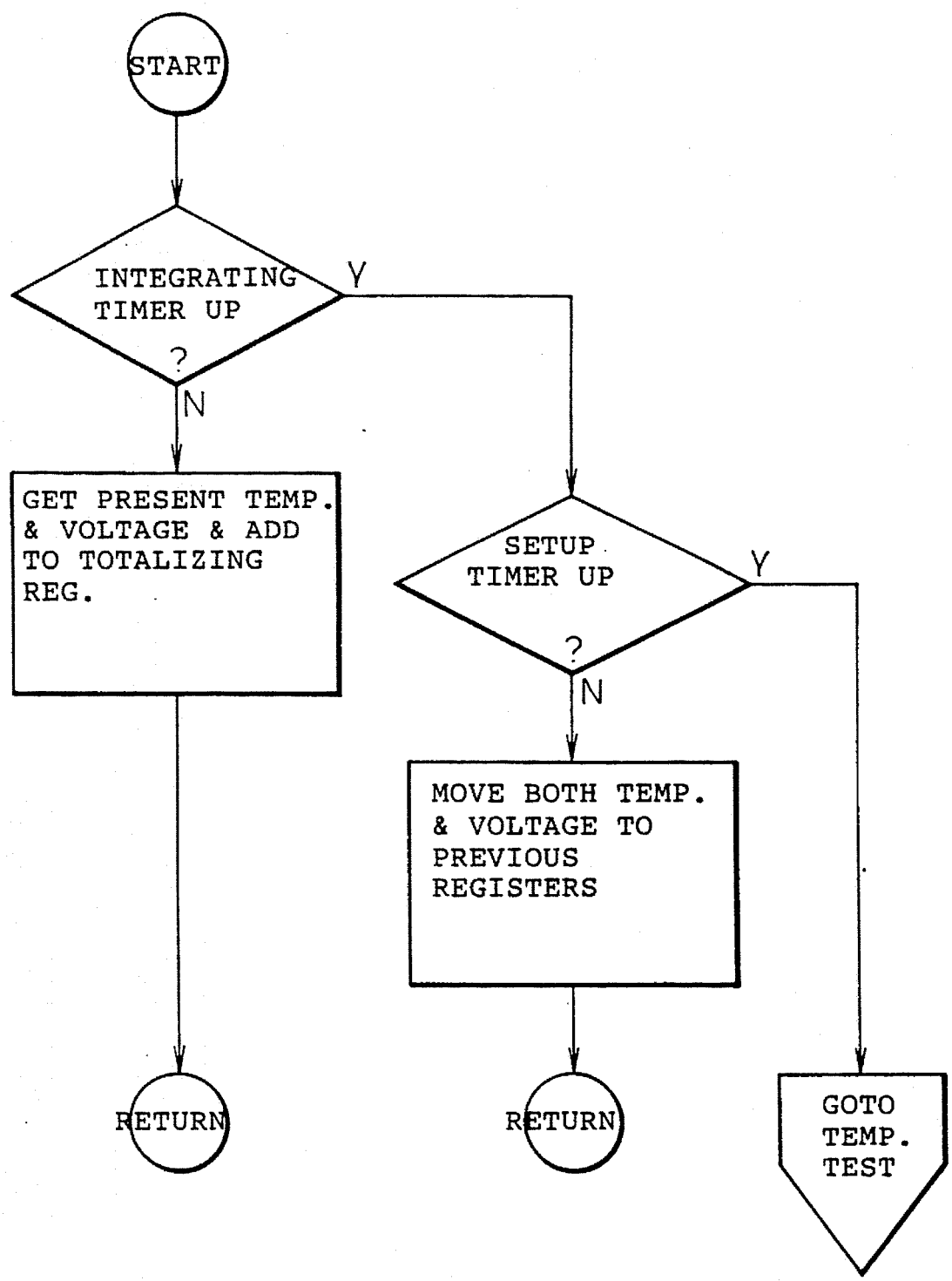
Figure 33:
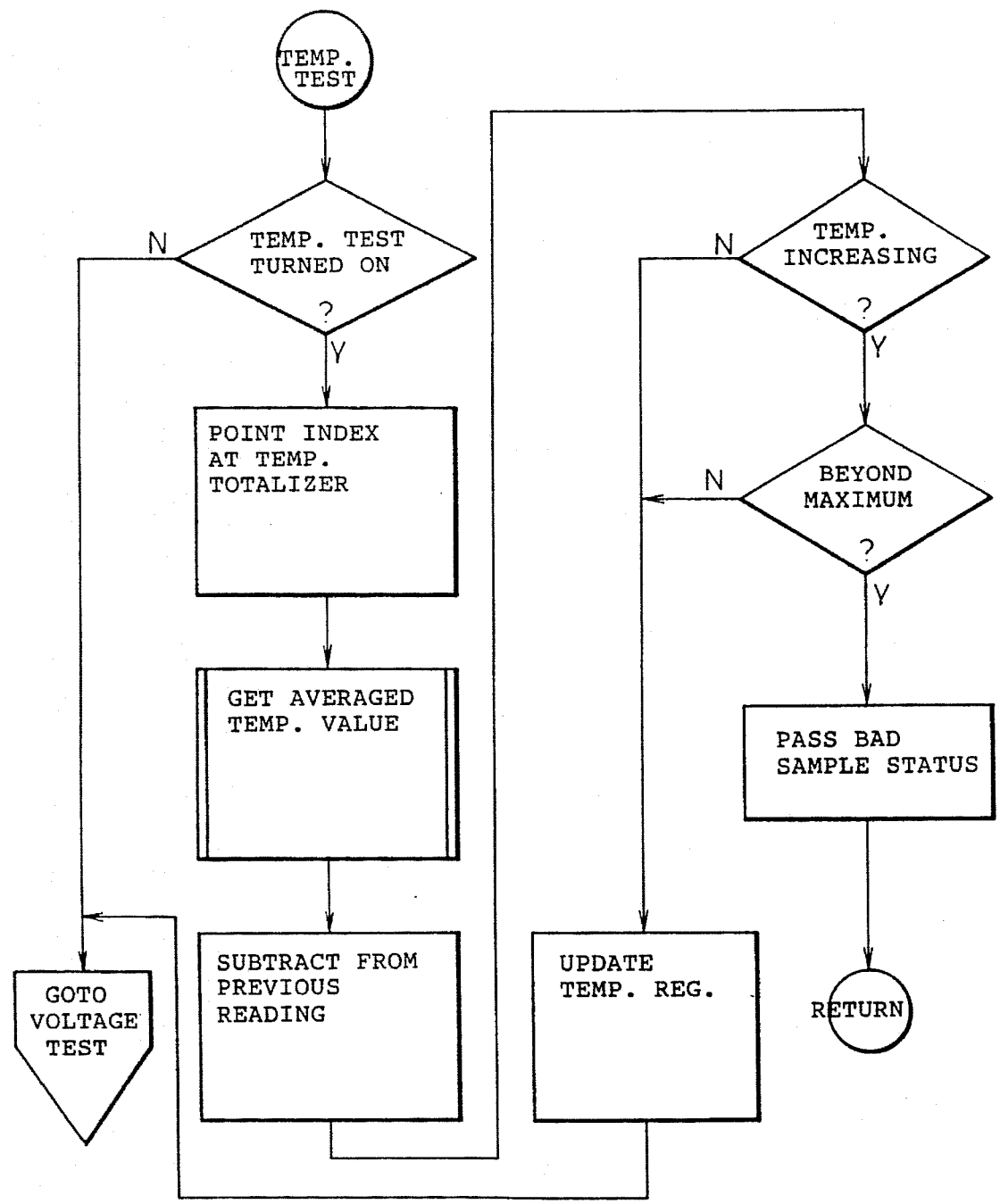
Figure 34:
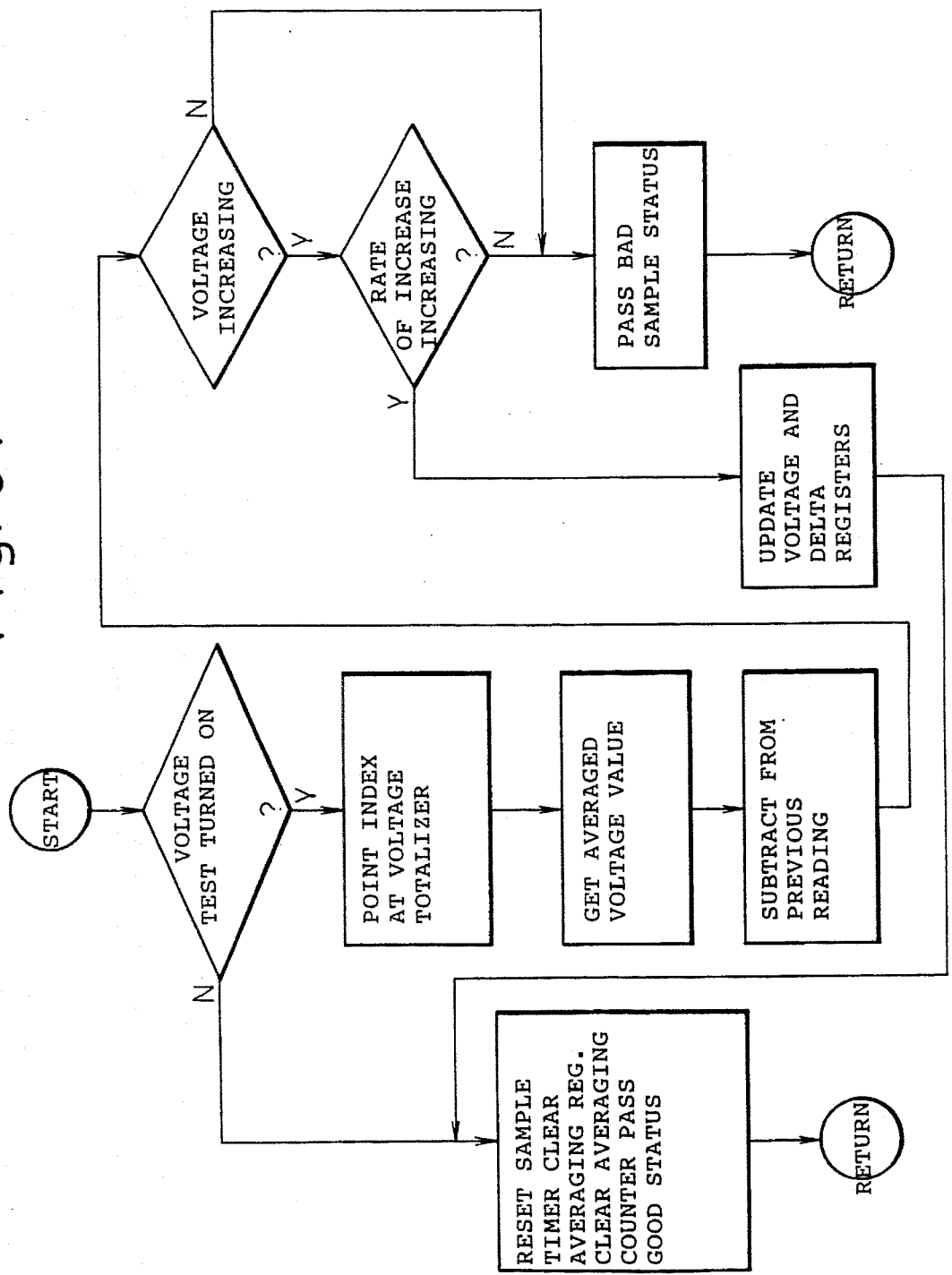

FIG. 31 is a counter subroutine employed to calculate the total time required to charge a battery in accordance with the invention. FIGS. 32, 33 and 34 are subroutines in which averaged values obtained from the analog to digital converter are examined to determine whether the charging criteria of the invention have been met.

Figure 35:
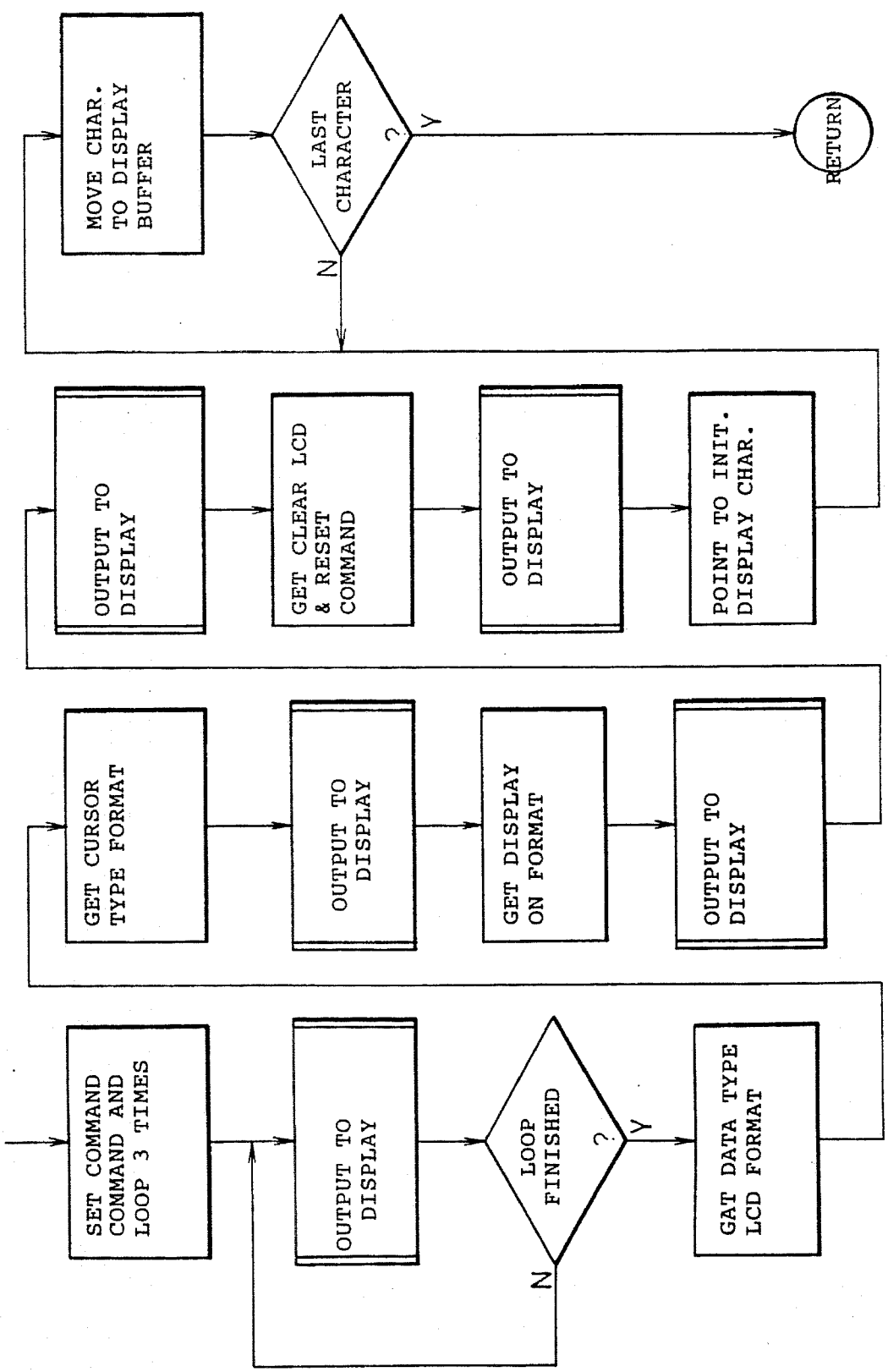
Figure 36:
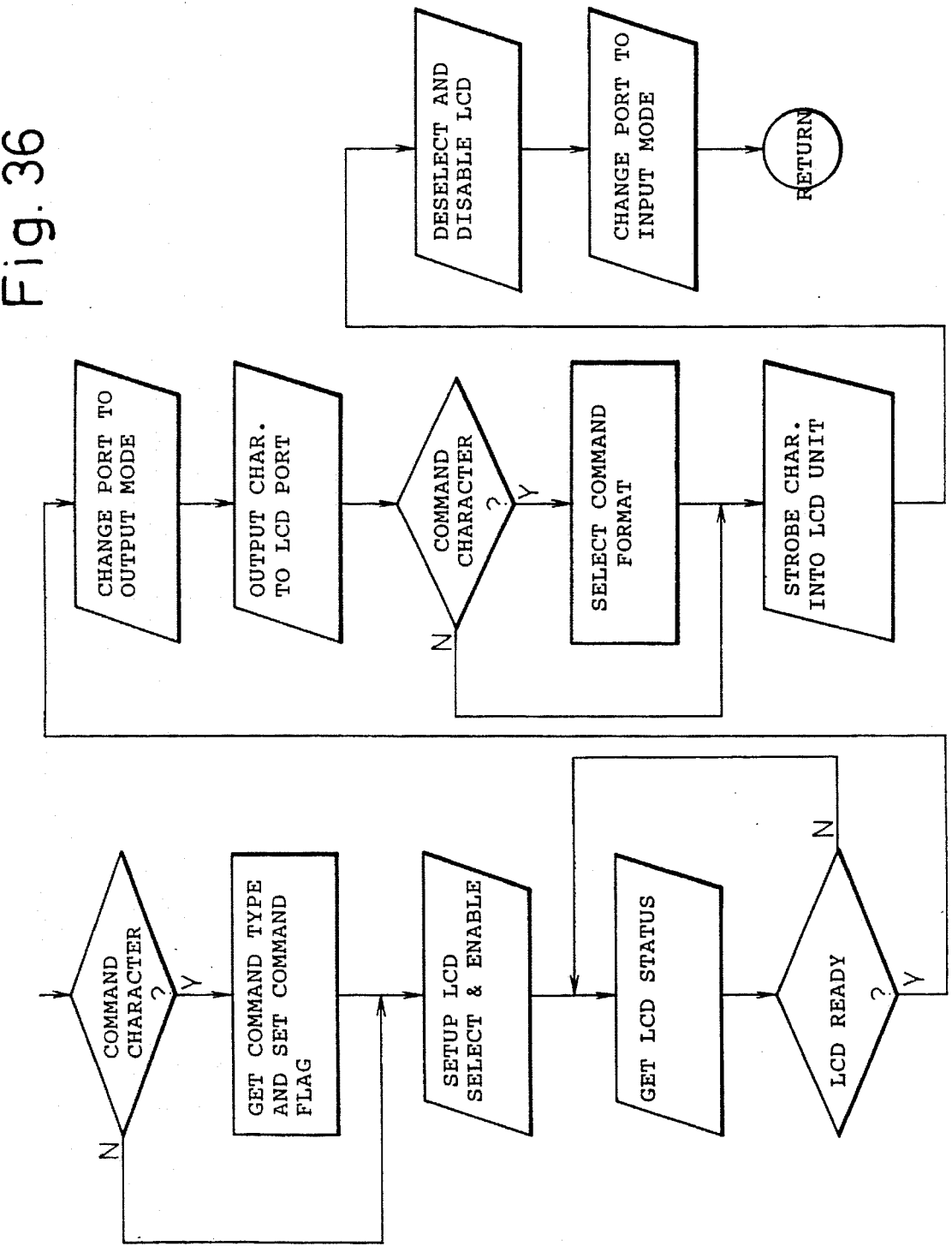

FIGS. 35 is a subroutine which initializes the liquid crystal display by zeroing the values displayed thereon. FIG. 36 is a subroutine which continually updates the display by writing the contents of the aforementioned buffer to the display.

Figure 37:
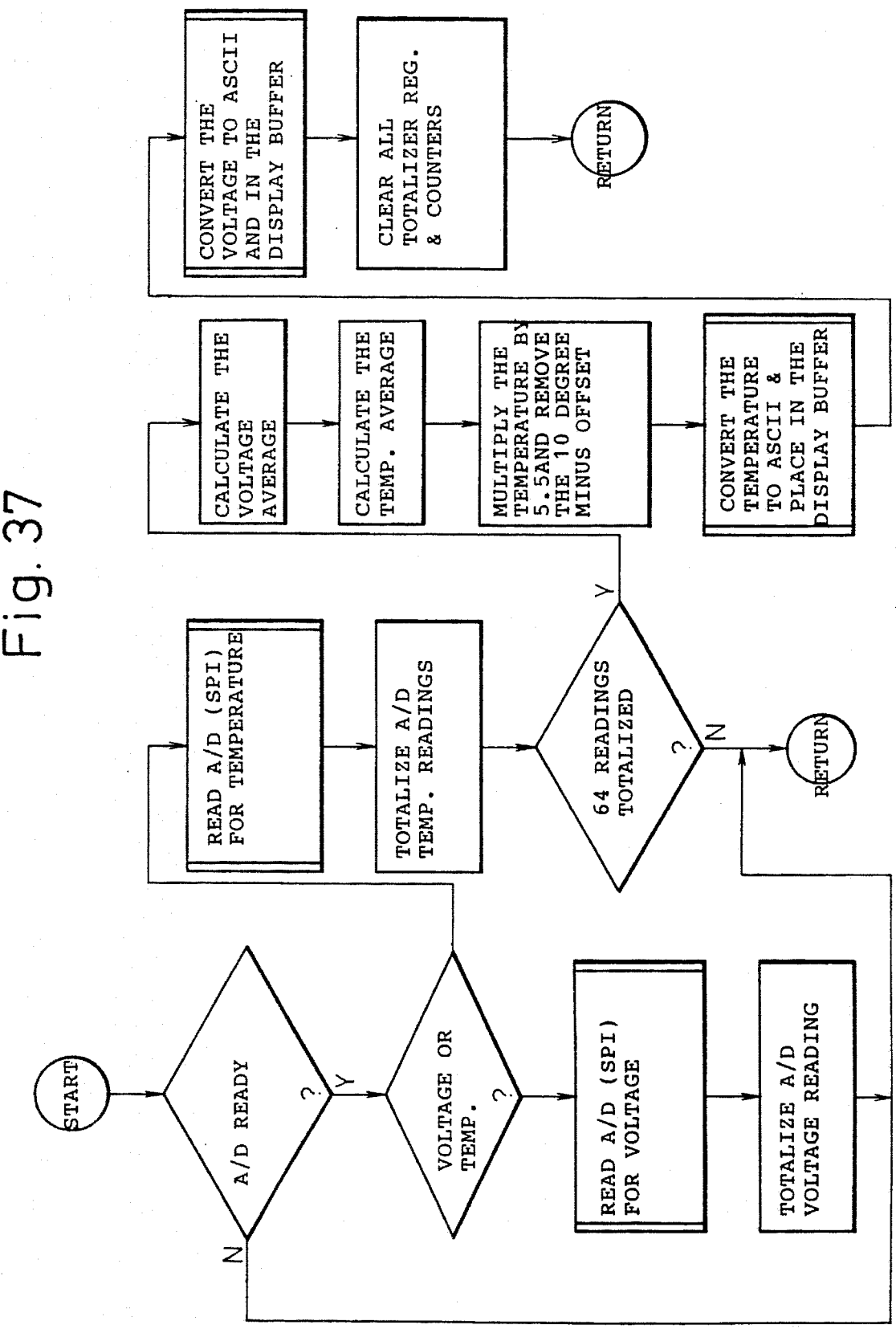

FIG. 37 is a subroutine which performs data averaging, scaling and range adjustment in order to format the data properly for display purposes.

Figure 38:
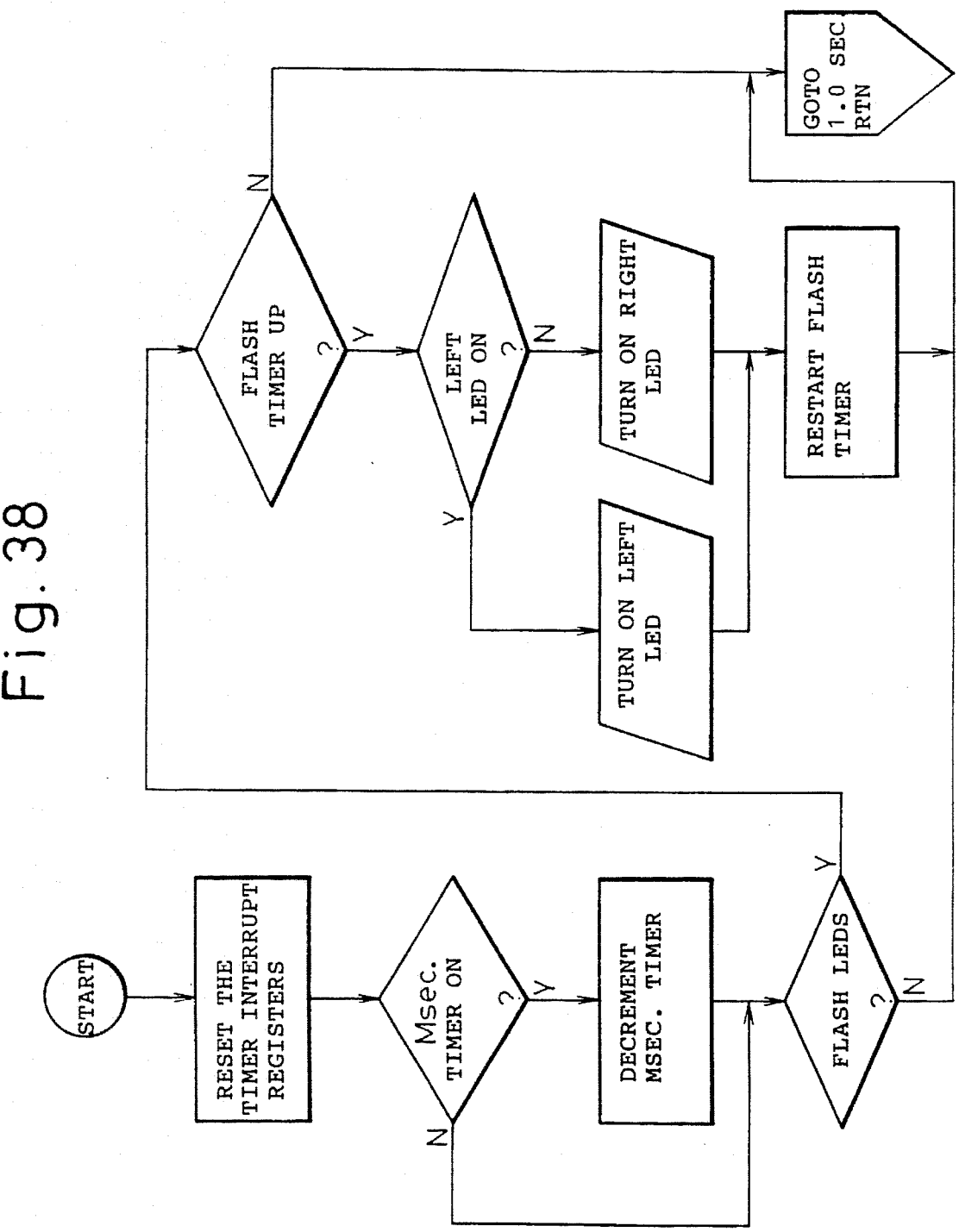

FIG. 38 is a subroutine which initializes the microprocessor's interrupts and timers.

Figure 39:
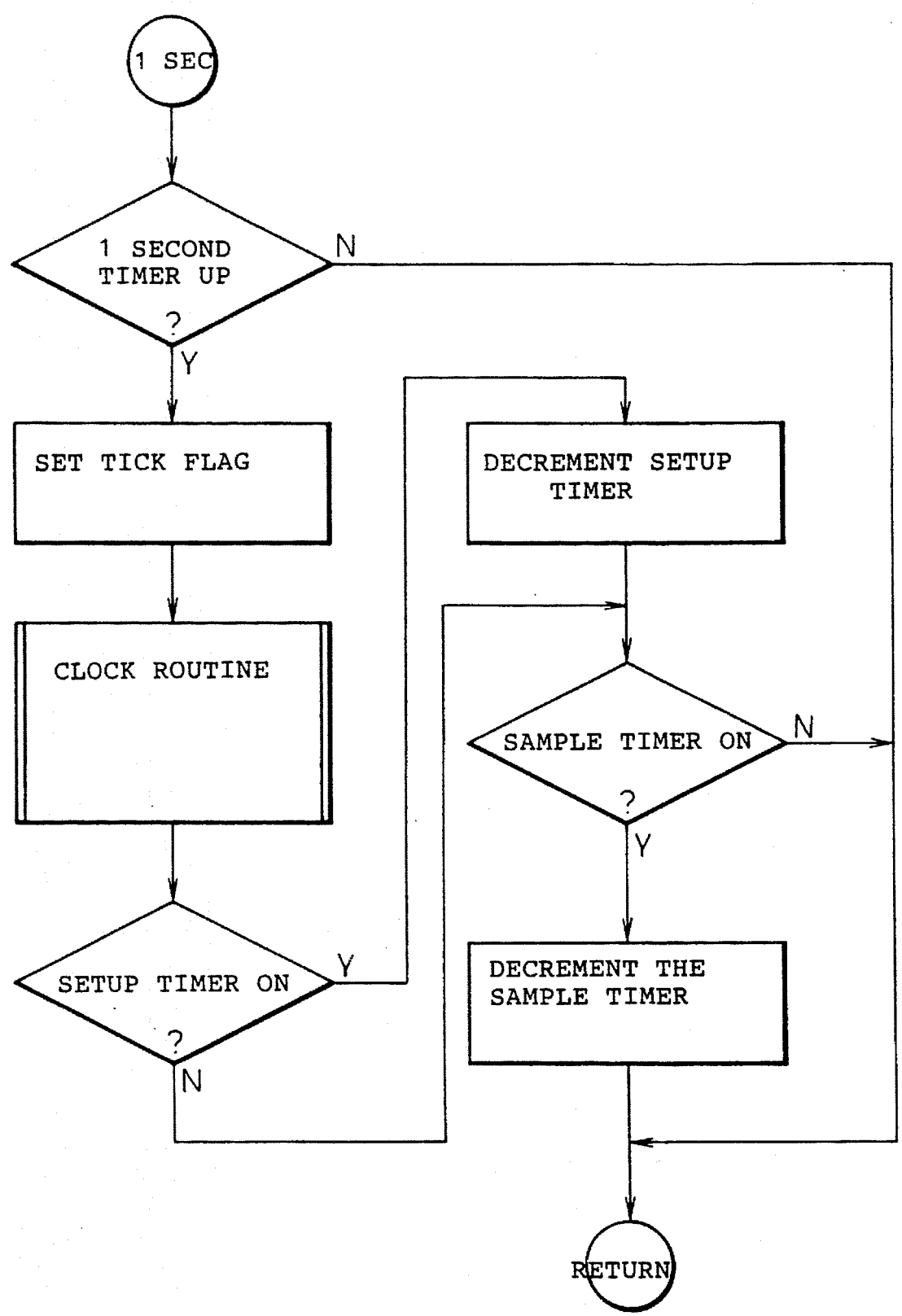

FIG. 39 is a subroutine which establishes the sample time width utilized by the analog to digital converter.

Figure 40:
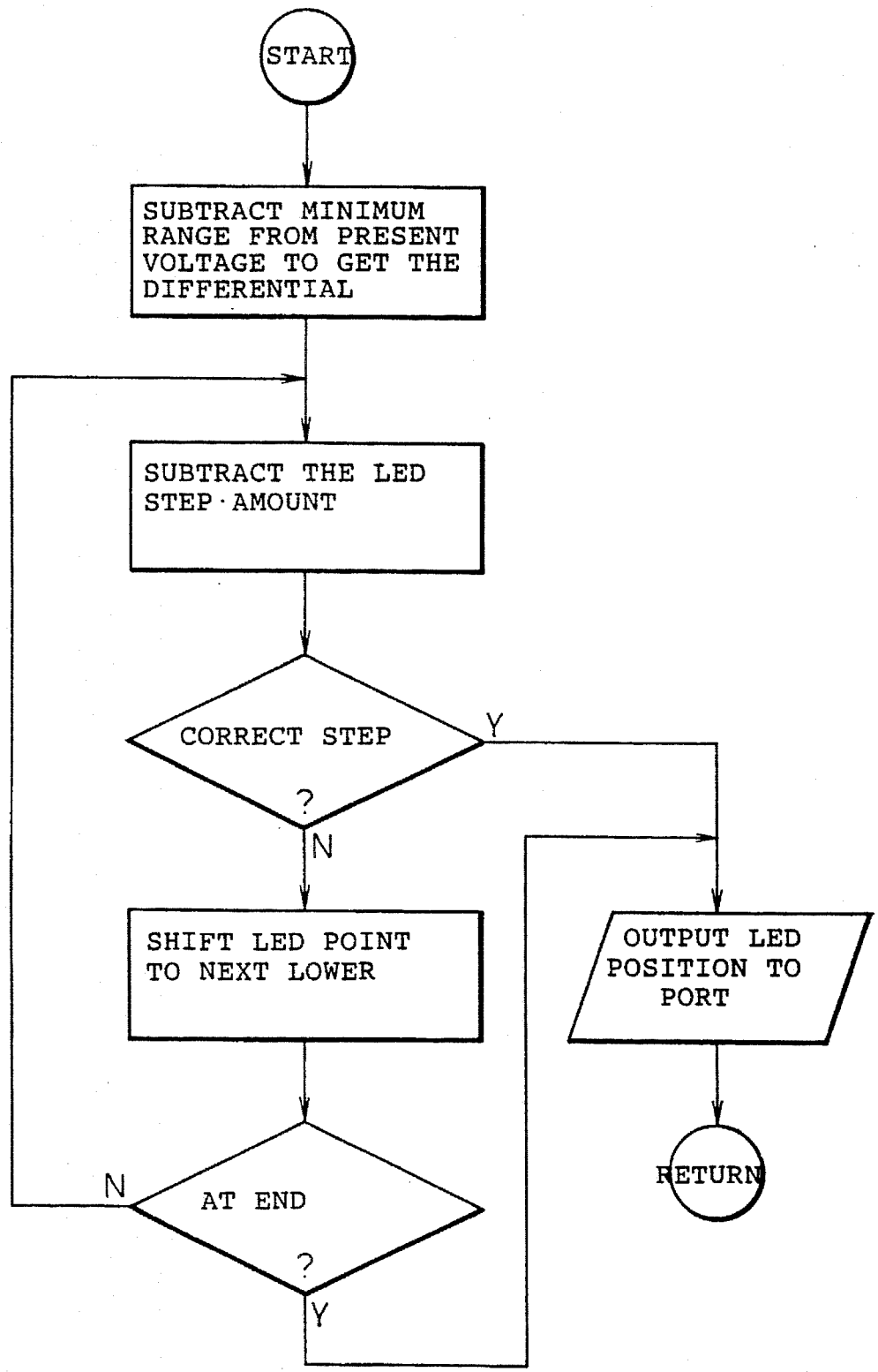

FIG. 40 is a subroutine for use with an optional (not shown) linear array of light emitting diodes which together form a sequential "bar graph" to indicate the level of charge attained during the battery charging process, thereby providing the user with a visual indication of the performance of the invention.

Figure 41:
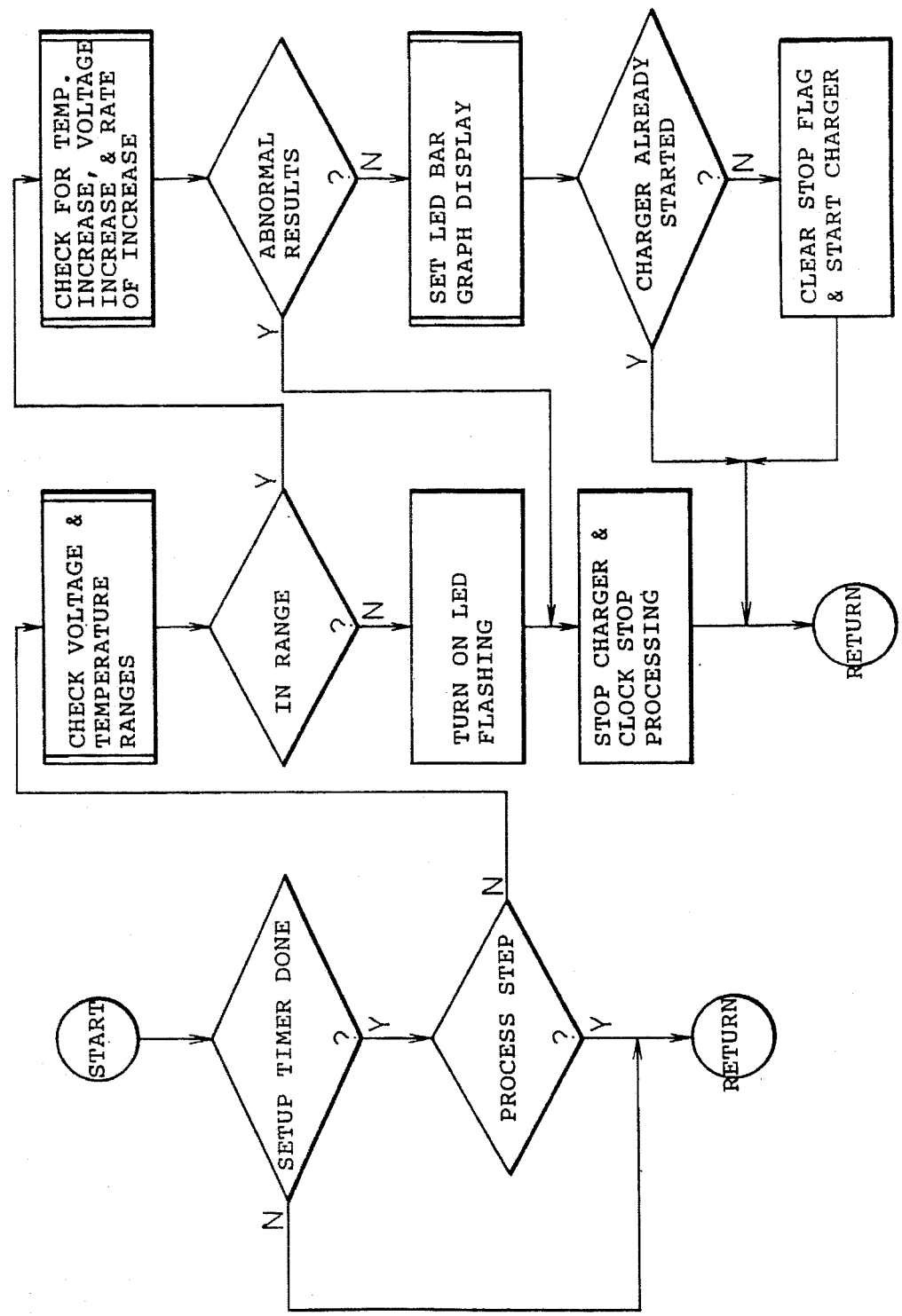

FIG. 41 is a subroutine which performs the main battery charging function in accordance with the invention.

Figure 42:
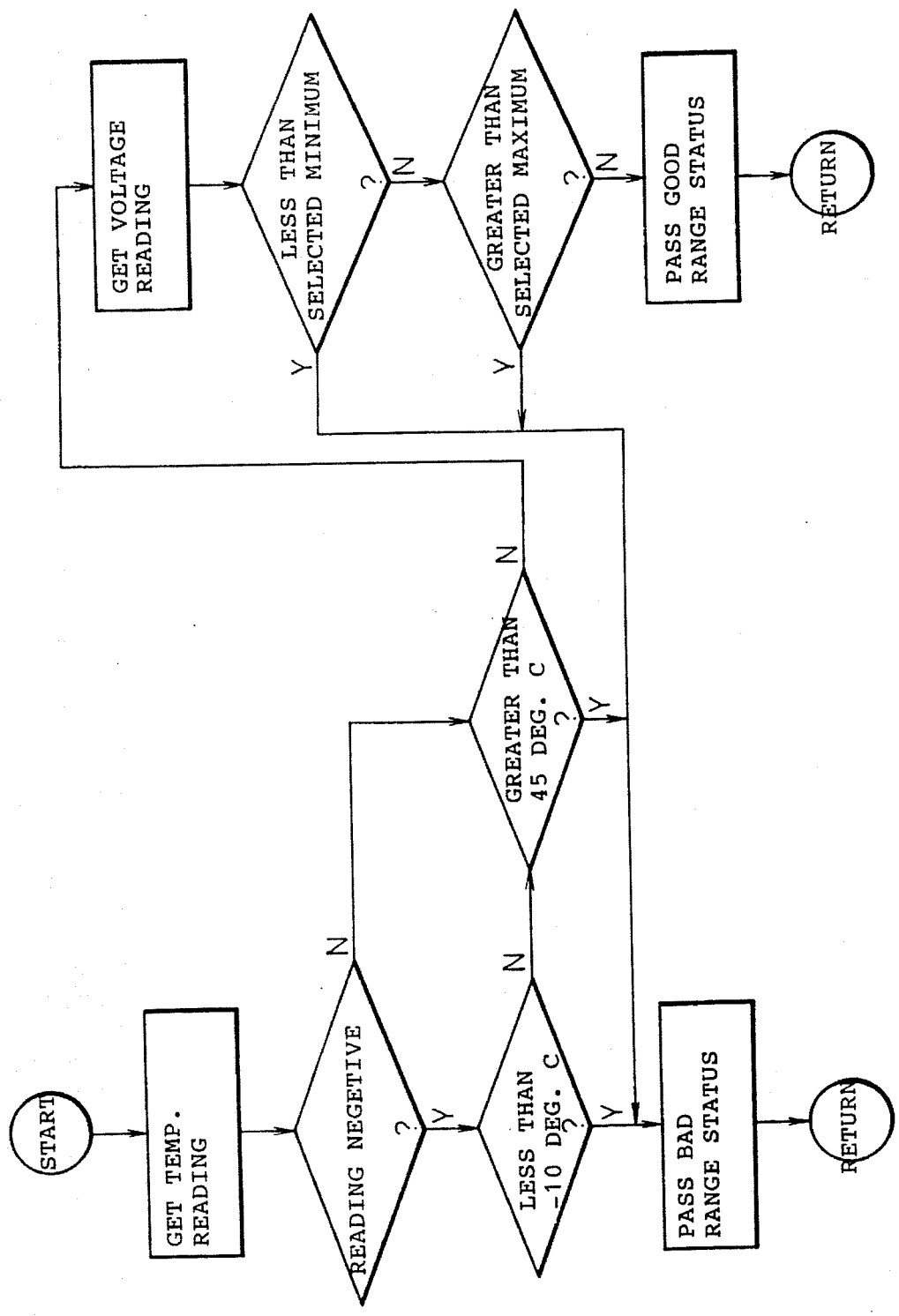
Figure 43A:
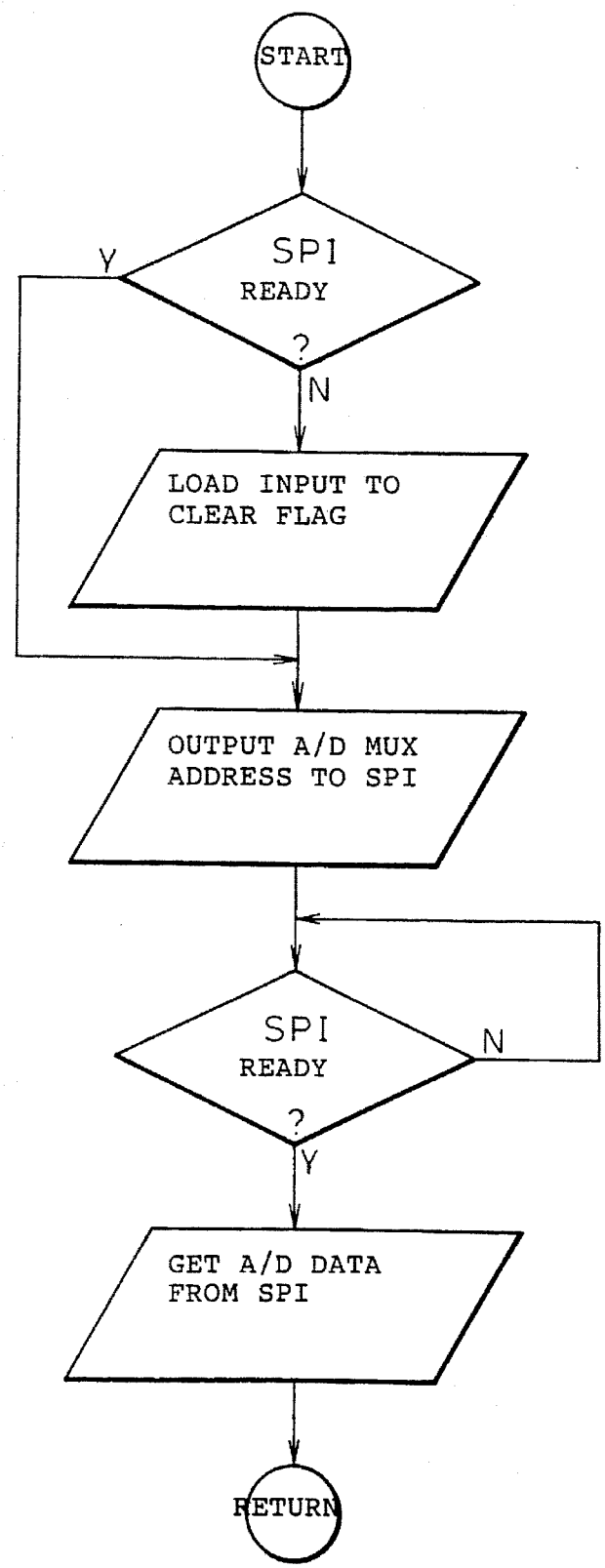
Figure 43B:
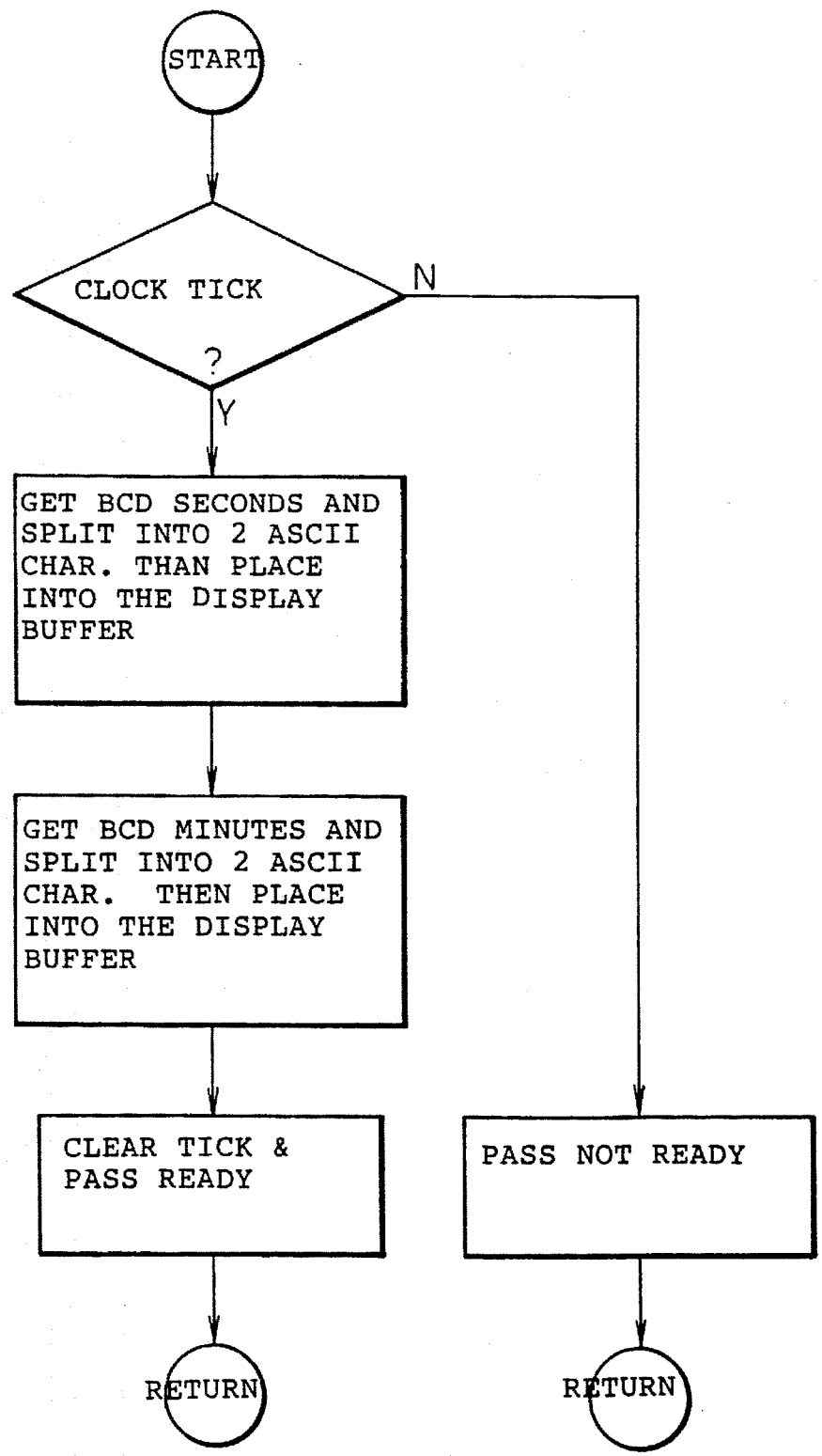

FIG. 42 is a subroutine which establishes maximum and minimum temperature and voltage values. FIG. 43 depicts a pair of subroutines which respectively initialize the analog to digital converter; and, format clock data for display purposes.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

TABLE 1

| Time (sec.) | Measured Voltage (V) | Rate of voltage increase (V) | Voltage (V) converted from measured temperature | Rate of temperature increase (V) |
|---|---|---|---|---|
| 0.0000 | 4.2847 | | 33.3 | |
| 5.0000 | 4.2773 | | 33.3 | |
| 10.0000 | 4.2773 | | 33.4 | |
| 15.0000 | 5.8740 | | 33.4 | |
| 20.0000 | 5.9839 | | 33.6 | |
| 25.0000 | 9.3970 | | 33.7 | |
| 30.0000 | 9.5142 | | 33.7 | |
| 34.9999 | 9.5874 | | 33.6 | |
| 39.9999 | 9.6533 | | 33.9 | |
| 44.9999 | 9.6899 | | 33.9 | |
| 49.9999 | 9.7192 | | 33.6 | |
| 54.9999 | 9.7485 | | 33.7 | |
| 59.9999 | 9.7705 | | 33.9 | |
| 64.9999 | 9.7852 | 14.6 mV | 33.6 | −0.001 |
| 69.9999 | 9.7998 | | 33.6 | |
| 74.9999 | 9.8145 | | 33.7 | |

TABLE 1-continued

| Time (sec.) | Measured Voltage (V) | Rate of voltage increase (V) | Voltage (V) converted from measured temperature | Rate of temperature increase (V) |
|---|---|---|---|---|
| 79.9999 | 9.8291 | | 33.9 | |
| 84.9999 | 9.8364 | | 33.6 | |
| 89.9999 | 9.8511 | | 33.6 | |
| 94.9999 | 9.8584 | | 33.6 | |
| 99.9999 | 9.8730 | | 33.6 | |
| 104.9998 | 9.8804 | | 33.3 | |
| 109.9998 | 9.8950 | | 33.4 | |
| 114.9998 | 9.8950 | | 33.6 | |
| 119.9998 | 9.9023 | 7.3 mV | 33.6 | 0 |
| 124.9998 | 9.9097 | | 33.6 | |
| 129.9998 | 9.9170 | | 33.6 | |
| 134.9998 | 9.9243 | | 33.4 | |
| 139.9998 | 9.9243 | | 33.1 | |
| 144.9998 | 9.9316 | | 33.4 | |
| 149.9998 | 9.9390 | | 33.4 | |
| 154.9998 | 9.9463 | | 33.3 | |
| 159.9998 | 9.9536 | | 33.3 | |
| 164.9998 | 9.9536 | | 33.4 | |
| 169.9998 | 9.9609 | | 33.3 | |
| 174.9997 | 9.9609 | | 33.1 | |
| 179.9997 | 9.9683 | 7.4 mV | 33.3 | −0.0025 |
| 184.9997 | 9.9683 | | 33.4 | |
| 189.9997 | 9.9756 | | 33.4 | |
| 194.9997 | 9.9829 | | 33.1 | |
| 199.9997 | 9.9829 | | 33.6 | |
| 204.9997 | 9.9902 | | 33.6 | |
| 209.9997 | 9.9976 | | 33.6 | |
| 214.9997 | 9.9976 | | 33.4 | |
| 219.9997 | 10.0049 | | 33.3 | |
| 224.9997 | 10.0049 | | 33.3 | |
| 229.9997 | 10.0049 | | 33.1 | |
| 234.9997 | 10.0122 | | 33.4 | |
| 239.9997 | 10.0195 | 7.3 mV | 33.6 | +0.0025 |
| 244.9996 | 10.0195 | | 33.7 | |
| 524.9992 | 10.1587 | | 32.5 | |
| 529.9992 | 10.1514 | | 32.5 | |
| 534.9992 | 10.1587 | | 32.5 | |
| 539.9992 | 10.1587 | | 32.3 | |
| 544.9992 | 10.1587 | | 32.2 | |
| 549.9992 | 10.1587 | | 32.3 | |
| 554.9992 | 10.1660 | | 32.3 | |
| 559.9992 | 10.1660 | | 32.3 | |
| 564.9992 | 10.1660 | | 32.3 | |
| 569.9992 | 10.1733 | | 32.5 | |
| 574.9992 | 10.1660 | | 32.7 | |
| 579.9992 | 10.1733 | | 32.3 | |
| 584.9992 | 10.1733 | | 32.5 | |
| 589.9992 | 10.1733 | | 32.3 | |
| 594.9991 | 10.1807 | | 32.0 | |
| 599.9991 | 10.1807 | | 32.3 | |
| 604.9991 | 10.1807 | | 32.2 | |
| 609.9991 | 10.1807 | | 32.2 | |
| 614.9991 | 10.1807 | | 32.2 | |
| 619.9991 | 10.1880 | 7.3 mV | 32.3 | −0.0025 |
| 624.9991 | 10.1880 | | 32.3 | |
| 629.9991 | 10.1880 | | 31.9 | |
| 634.9991 | 10.1880 | | 32.2 | |
| 639.9991 | 10.1880 | | 32.0 | |
| 644.9991 | 10.1953 | | 32.0 | |
| 649.9991 | 10.1953 | | 32.0 | |
| 654.9991 | 10.1953 | | 32.2 | |
| 659.9991 | 10.1953 | | 32.2 | |
| 664.9990 | 10.2026 | | 32.0 | |
| 669.9990 | 10.1953 | | 32.0 | |
| 674.9990 | 10.2026 | | 32.0 | |
| 679.9990 | 10.2026 | | 31.7 | |
| 684.9990 | 10.2026 | | 32.0 | |
| 689.9990 | 10.2026 | | 31.9 | |
| 694.9990 | 10.2100 | | 31.9 | |
| 699.9990 | 10.2100 | | 31.7 | |
| 704.9990 | 10.2100 | | 31.7 | |
| 709.9990 | 10.2100 | | 31.7 | |
| 714.9990 | 10.2100 | | 31.7 | |
| 719.9990 | 10.2173 | | 31.9 | |
| 724.9990 | 10.2173 | | 31.9 | |
| 729.9990 | 10.2173 | | 31.7 | |
| 734.9989 | 10.2173 | | 31.6 | |
| 739.9989 | 10.2173 | | 31.6 | |
| 744.9989 | 10.2173 | | 31.6 | |
| 749.9989 | 10.2246 | 7.3 mV | 31.6 | −0.05 |
| 754.9989 | 10.2246 | | 31.6 | |
| 759.9989 | 10.2246 | | 31.7 | |
| 764.9989 | 10.2246 | | 31.4 | |
| 769.9989 | 10.2319 | | 31.7 | |
| 774.9989 | 10.2246 | | 31.6 | |
| 779.9989 | 10.2319 | | 31.4 | |
| 784.9989 | 10.2319 | | 31.6 | |
| 789.9989 | 10.2319 | | 31.6 | |
| 794.9989 | 10.2393 | | 31.6 | |
| 1074.9985 | 10.3052 | | 31.1 | |
| 1079.9985 | 10.3052 | | 31.1 | |
| 1084.9984 | 10.3052 | | 31.3 | |
| 1089.9984 | 10.3052 | | 31.4 | |
| 1094.9984 | 10.3125 | | 31.0 | |
| 1099.9984 | 10.3125 | | 31.3 | |
| 1104.9984 | 10.3125 | | 31.1 | |
| 1109.9984 | 10.3125 | | 31.3 | |
| 1114.9984 | 10.3125 | | 31.1 | |
| 1119.9984 | 10.3125 | | 31.1 | |
| 1124.9984 | 10.3125 | | 31.1 | |
| 1129.9984 | 10.3198 | 7.3 mV | 31.1 | 0 |
| 1134.9984 | 10.3125 | | 31.0 | |
| 1139.9984 | 10.3125 | | 30.8 | |
| 1144.9984 | 10.3125 | | 30.8 | |
| 1149.9984 | 10.3198 | | 30.8 | |
| 1154.9983 | 10.3198 | | 31.1 | |
| 1159.9983 | 10.3198 | | 31.1 | |
| 1164.9983 | 10.3198 | | 31.4 | |
| 1169.9983 | 10.3271 | | 31.3 | |
| 1174.9983 | 10.3271 | | 31.3 | |
| 1179.9983 | 10.3271 | | 31.3 | |
| 1184.9983 | 10.3271 | | 31.3 | |
| 1189.9983 | 10.3271 | | 31.3 | |
| 1194.9983 | 10.3271 | | 31.3 | |
| 1199.9983 | 10.3271 | | 31.4 | |
| 1204.9983 | 10.3271 | | 31.3 | |
| 1209.9983 | 10.3345 | | 31.3 | |
| 1214.9983 | 10.3271 | | 31.3 | |
| 1219.9983 | 10.3345 | | 31.3 | |
| 1224.9982 | 10.3271 | | 31.1 | |
| 1229.9982 | 10.3345 | | 31.1 | |
| 1234.9982 | 10.3345 | | 31.1 | |
| 1239.9982 | 10.3345 | | 30.8 | |
| 1244.9982 | 10.3345 | | 31.1 | |
| 1249.9982 | 10.3345 | | 31.3 | |
| 1254.9982 | 10.3418 | | 31.3 | |
| 1259.9982 | 10.3418 | | 31.3 | |
| 1264.9982 | 10.3418 | | 31.3 | |
| 1269.9982 | 10.3418 | | 31.1 | |
| 1274.9982 | 10.3418 | | 31.0 | |
| 1279.9982 | 10.3418 | | 31.0 | |
| 1284.9982 | 10.3491 | | 31.1 | |
| 1289.9982 | 10.3418 | | 31.0 | |
| 1294.9981 | 10.3491 | 7.3 mV | 31.0 | −0.0083 |
| 1299.9981 | 10.3491 | | 31.0 | |
| 1304.9981 | 10.3491 | | 31.0 | |
| 1309.9981 | 10.3491 | | 31.0 | |
| 1314.9981 | 10.3491 | | 31.0 | |
| 1319.9981 | 10.3491 | | 30.8 | |
| 1324.9981 | 10.3491 | | 31.0 | |
| 1329.9981 | 10.3564 | | 31.0 | |
| 1334.9981 | 10.3564 | | 30.8 | |
| 1339.9981 | 10.3564 | | 31.0 | |
| 1344.9981 | 10.3564 | | 31.0 | |
| 2174.9969 | 10.6494 | | 31.1 | |
| 2179.9969 | 10.6421 | | 31.1 | |

TABLE 1-continued

| Time (sec.) | Measured Voltage (V) | Rate of voltage increase (V) | Voltage (V) converted from measured temperature | Rate of temperature increase (V) |
|---|---|---|---|---|
| 2184.9969 | 10.6494 | | 31.3 | |
| 2189.9969 | 10.6494 | | 31.3 | |
| 2194.9969 | 10.6494 | | 31.3 | |
| 2199.9969 | 10.6567 | | 31.3 | |
| 2204.9968 | 10.6494 | | 31.3 | |
| 2209.9968 | 10.6567 | | 31.3 | |
| 2214.9968 | 10.6567 | | 31.3 | |
| 2219.9968 | 10.6567 | | 31.1 | |
| 2224.9968 | 10.6567 | | 31.0 | |
| 2229.9968 | 10.6567 | | 31.1 | |
| 2234.9968 | 10.6641 | 7.3 mV | 31.3 | +0.016 |
| 2239.9968 | 10.6567 | | 31.0 | |
| 2244.9968 | 10.6641 | | 31.4 | |
| 2249.9968 | 10.6641 | | 31.4 | |
| 2254.9968 | 10.6641 | | 31.3 | |
| 2259.9968 | 10.6714 | | 31.3 | |
| 2264.9968 | 10.6714 | | 31.1 | |
| 2269.9968 | 10.6714 | | 31.1 | |
| 2274.9967 | 10.6714 | | 31.0 | |
| 2279.9967 | 10.6714 | | 31.3 | |
| 2284.9967 | 10.6714 | | 31.3 | |
| 2289.9967 | 10.6714 | | 31.4 | |
| 2294.9967 | 10.6787 | | 31.6 | |
| 2299.9967 | 10.6714 | | 31.7 | |
| 2304.9967 | 10.6787 | | 31.6 | |
| 2309.9967 | 10.6787 | | 31.4 | |
| 2314.9967 | 10.6714 | | 31.4 | |
| 2319.9967 | 10.6787 | | 31.6 | |
| 2324.9967 | 10.6787 | | 31.3 | |
| 2329.9967 | 10.6787 | | 31.6 | |
| 2334.9967 | 10.6787 | | 31.6 | |
| 2339.9967 | 10.6787 | | 31.7 | |
| 2344.9966 | 10.6787 | | 31.9 | |
| 2349.9966 | 10.6787 | | 31.9 | |
| 2354.9966 | 10.6787 | | 31.9 | |
| 2359.9966 | 10.6787 | | 31.7 | |
| 2364.9966 | 10.6787 | | 32.0 | |
| 2369.9966 | 10.6860 | | 31.9 | |
| 2374.9966 | 10.6787 | | 31.9 | |
| 2379.9966 | 10.6860 | 7.3 Mv | 32.0 | +0.05 |
| 2384.9966 | 10.6860 | | 32.2 | |
| 2389.9966 | 10.6860 | | 32.2 | |
| 2394.9966 | 10.6860 | | 32.2 | |
| 2399.9966 | 10.6860 | | 32.3 | |
| 2404.9966 | 10.6860 | | 32.2 | |
| 2409.9966 | 10.6860 | | 32.2 | |
| 2414.9965 | 10.6860 | | 32.3 | |
| 2419.9965 | 10.6787 | −7.3 mV | 32.5 | +0.07 |
| 2424.9965 | 10.6787 | | 32.5 | |
| 2429.9965 | 10.6787 | | 32.7 | |
| 2434.9965 | 10.6787 | | 32.7 | |
| 2439.9965 | 10.6860 | | 32.7 | |
| 2444.9965 | 10.6787 | | 32.2 | |
| 2449.9965 | 10.6787 | | 32.5 | |
| 2454.9965 | 10.6860 | | 32.5 | |
| 2459.9965 | 10.6787 | 0 | 32.7 | +0.025 |
| 2464.9965 | 10.6787 | | 32.7 | |
| 2469.9965 | 10.6787 | | 32.8 | |
| 2474.9965 | 10.6787 | 0 | 32.8 | +0.05 |
| 2479.9965 | 10.6787 | | 32.7 | |
| 2484.9964 | 10.6787 | 0 | 33.0 | +0.1 |
| 2489.9964 | 10.6787 | | 33.0 | |
| 2494.9964 | 10.6787 | | 33.0 | |
| 2499.9964 | 10.6787 | | 33.0 | |
| 2504.9964 | 10.6787 | | 33.1 | +0.05 |
| 2509.9964 | 10.6787 | | 33.1 | |
| 2514.9964 | 10.6787 | | 33.1 | |
| 2519.9964 | 10.6787 | 0 | 33.3 | +0.06 |
| 2524.9964 | 10.6787 | | 33.3 | |
| 2529.9964 | 10.6787 | | 33.3 | |
| 2534.9964 | 10.6787 | | 33.3 | |
| 2539.9964 | 10.6787 | | 33.1 | |
| 2544.9964 | 8.9868 | | 33.3 | |
| 2549.9964 | 8.7378 | | 33.1 | |
| 2554.9963 | 8.7085 | | 33.4 | |
| 2559.9963 | 8.6865 | | 33.4 | |
| 2564.9963 | 8.6719 | | 33.4 | |
| 2569.9963 | 8.6572 | | 33.6 | |
| 2574.9963 | 8.6426 | | 33.4 | |
| 2579.9963 | 8.6353 | | 33.4 | |
| 2584.9963 | 8.6279 | | 33.1 | |
| 2589.9963 | 8.6206 | | 33.6 | |
| 2594.9963 | 8.6133 | | 33.6 | |
| 2599.9963 | 8.5986 | | 33.4 | |

TABLE 2

| Time (sec.) | Measured Voltage (V) | Rate of voltage increase (V) | Voltage (V) converted from measured temperature | Rate of temperature increase (V) |
|---|---|---|---|---|
| 0.0000 | 5.0610 | | 35.9 | |
| 5.0000 | 5.4858 | | 35.7 | |
| 10.0000 | 7.1411 | | 36.0 | |
| 15.0000 | 7.2437 | | 36.0 | |
| 20.0000 | 8.3276 | | 36.0 | |
| 25.0000 | 8.4009 | | 35.9 | 0 |
| 30.0000 | 8.4082 | 7.3 mV | 35.9 | |
| 34.9999 | 8.4155 | | 35.9 | |
| 39.9999 | 8.4229 | | 35.9 | |
| 44.9999 | 8.4302 | | 35.6 | |
| 49.9999 | 8.4375 | | 35.0 | |
| 54.9999 | 8.4448 | | 36.0 | |
| 59.9999 | 8.4521 | 7.3 mV | 36.0 | 0 |
| 64.9999 | 8.4595 | | 35.9 | |
| 69.9999 | 8.4668 | | 35.9 | |
| 74.9999 | 8.4741 | | 35.9 | |
| 79.9999 | 8.4814 | 7.3 mV | 35.9 | |
| 84.9999 | 8.4814 | | 35.7 | |
| 89.9999 | 8.4888 | | 35.9 | |
| 94.9999 | 8.4961 | | 36.0 | |
| 99.9999 | 8.5107 | | 36.2 | |
| 104.9998 | 8.5107 | | 36.3 | |
| 109.9998 | 8.5181 | | 36.3 | |
| 114.9998 | 8.5254 | | 36.2 | |
| 119.9998 | 8.5327 | 7.3 mV | 36.0 | 0 |
| 124.9998 | 8.5327 | | 36.0 | |
| 129.9998 | 8.5400 | 7.3 mV | 36.0 | |
| 134.9998 | 8.5474 | | 35.9 | |
| 139.9998 | 8.5474 | | 36.0 | |
| 144.9998 | 8.5547 | | 36.2 | |
| 149.9998 | 8.5620 | | 36.3 | |
| 154.9998 | 8.5547 | | 36.3 | |
| 159.9998 | 8.5547 | | 36.2 | |
| 164.9998 | 8.5620 | | 36.0 | |
| 169.9998 | 8.5693 | | 36.0 | |
| 174.9997 | 8.5767 | 7.4 mV | 36.0 | 0 |
| 179.9997 | 8.5767 | | 36.0 | |
| 184.9997 | 8.5767 | | 36.0 | |
| 189.9997 | 8.5840 | | 35.7 | |
| 194.9997 | 8.5913 | | 36.2 | |
| 199.9997 | 8.5913 | | 36.0 | |
| 204.9997 | 8.5986 | | 36.3 | |
| 209.9997 | 8.6060 | | 36.2 | |
| 214.9997 | 8.6060 | | 36.0 | |
| 219.9997 | 8.6133 | | 35.6 | |
| 224.9997 | 8.6133 | | 35.9 | |
| 229.9997 | 8.6206 | | 35.9 | |
| 234.9997 | 8.6206 | | 35.2 | |
| 239.9997 | 8.6279 | 7.3 mV | 36.2 | +0.01 |

TABLE 2-continued

| Time (sec.) | Measured Voltage (V) | Rate of voltage increase (V) | Voltage (V) converted from measured temperature | Rate of temperature increase (V) |
|---|---|---|---|---|
| 244.9996 | 8.6279 | | 36.2 | |
| 799.9989 | 9.0454 | | 35.2 | |
| 804.9988 | 9.0527 | | 35.4 | |
| 809.9988 | 9.0454 | | 35.4 | |
| 814.9988 | 9.0527 | | 35.6 | |
| 819.9988 | 9.0601 | | 35.4 | |
| 824.9988 | 9.0601 | | 35.2 | |
| 829.9988 | 9.0674 | | 35.2 | |
| 834.9988 | 9.0747 | 7.3 mV | 35.1 | −0.025 |
| 839.9988 | 9.0894 | | 35.4 | |
| 844.9988 | 9.0967 | | 35.4 | |
| 849.9988 | 9.1040 | | 35.6 | |
| 854.9988 | 9.1040 | | 35.6 | |
| 859.9988 | 9.1040 | | 35.6 | |
| 864.9988 | 9.1113 | | 35.4 | |
| 869.9988 | 9.1113 | | 35.2 | |
| 874.9987 | 9.1187 | | 35.2 | |
| 879.9987 | 9.1260 | | 35.4 | |
| 884.9987 | 9.1333 | | 35.6 | |
| 889.9987 | 9.1333 | | 35.7 | |
| 894.9987 | 9.1406 | | 35.6 | |
| 899.9987 | 9.1406 | | 35.1 | |
| 904.9987 | 9.1479 | | 35.4 | |
| 909.9987 | 9.1479 | | 35.1 | |
| 914.9987 | 9.1479 | | 35.2 | +0.0083 |
| 919.9987 | 9.1553 | 7.4 mV | 34.9 | |
| 924.9987 | 9.1626 | | 35.4 | |
| 929.9987 | 9.1699 | | 35.4 | |
| 934.9987 | 9.1772 | | 35.4 | |
| 939.9987 | 9.1992 | | 35.4 | |
| 944.9986 | 9.2065 | | 35.6 | |
| 949.9986 | 9.2139 | | 35.6 | |
| 954.9986 | 9.2212 | 7.3 mV | 35.6 | |
| 959.9986 | 9.2285 | | 35.4 | |
| 964.9986 | 9.2285 | | 35.4 | |
| 969.9986 | 9.2432 | | 35.2 | |
| 974.9986 | 9.2505 | | 35.1 | |
| 979.9986 | 9.2578 | | 35.4 | |
| 984.9986 | 9.2578 | | 35.2 | |
| 989.9986 | 9.2725 | | 35.6 | |
| 994.9986 | 9.2944 | | 35.6 | |
| 999.9986 | 9.3091 | | 35.7 | |
| 1004.9986 | 9.3164 | | 35.7 | |
| 1009.9986 | 9.3237 | | 35.6 | |
| 1014.9985 | 9.3384 | | 35.4 | |
| 1019.9985 | 9.3384 | | 35.4 | |
| 1024.9985 | 9.3457 | 7.3 mV | 35.4 | +0.016 |
| 1029.9985 | 9.3604 | | 35.4 | |
| 1034.9985 | 9.3677 | | 35.6 | |
| 1039.9985 | 9.3750 | 7.3 mV | 35.6 | |
| 1044.9985 | 9.3896 | 14.7 mV | 35.7 | |
| 1049.9985 | 9.4043 | 14.7 mV | 35.6 | |
| 1054.9985 | 9.4189 | | 35.6 | |
| 1059.9985 | 9.4336 | 14.7 mV | 35.4 | 0 |
| 1064.9985 | 9.4556 | | 35.6 | |
| 1069.9985 | 9.4775 | | 35.6 | |
| 1074.9985 | 9.4922 | 14.7 mV | 35.7 | |
| 1079.9985 | 9.4849 | | 35.7 | |
| 1084.9984 | 9.4995 | 14.6 mV | 35.9 | +0.01 |
| 1089.9984 | 9.5142 | | 36.0 | |
| 1094.9984 | 9.5215 | | 35.7 | |
| 1099.9984 | 9.5215 | | 36.0 | |
| 1104.9984 | 9.5361 | 14.6 mV | 35.7 | |
| 1109.9984 | 9.5508 | | 36.0 | +0.02 |
| 1114.9984 | 9.5654 | 14.6 mV | 35.9 | |
| 1119.9984 | 9.5728 | | 35.9 | |
| 1124.9984 | 9.5801 | 7.3 mV | 35.7 | |
| 1129.9984 | 9.5801 | | 36.0 | |
| 1134.9984 | 9.5874 | 7.3 mV | 36.2 | +0.04 |
| 1139.9984 | 9.5874 | | 36.3 | +0.1 |
| 1144.9984 | 9.5874 | | 36.5 | +0.2 |
| 1149.9984 | 9.5947 | 7.3 mV | 36.6 | 0 |
| 1154.9983 | 9.5947 | | 36.6 | 0 |
| 1159.9983 | 9.5947 | | 36.6 | 0 |
| 1164.9983 | 9.6094 | 14.7 mV | 36.6 | 0 |
| 1169.9983 | 9.6167 | | 36.5 | |
| 1174.9983 | 9.6167 | | 36.6 | 0 |
| 1179.9983 | 9.6167 | 0 | 36.8 | +0.2 |
| 1184.9983 | 9.6167 | | 37.1 | +0.3 |
| 1189.9983 | 9.6094 | −7.3 mV | 37.2 | +0.1 |
| 1194.9983 | 9.6021 | −7.3 mV | 37.5 | +0.3 |
| 1199.9983 | 9.6094 | +7.3 mV | 37.8 | +0.3 |
| 1204.9983 | 9.6021 | −7.3 mV | 37.8 | |
| 1209.9983 | 9.6021 | | 37.8 | |
| 1214.9983 | 9.6094 | | 37.8 | |
| 1219.9983 | 9.0308 | | 38.1 | |
| 1224.9982 | 8.9575 | | 38.5 | |
| 1229.9982 | 8.9209 | | 38.8 | |
| 1234.9982 | 8.8916 | | 38.9 | |
| 1239.9982 | 8.8696 | | 39.1 | |
| 1244.9982 | 8.8477 | | 38.6 | |
| 1249.9982 | 8.8330 | | 39.1 | |
| 1254.9982 | 8.8184 | | 38.9 | |

TABLE 3

| Time (sec.) | Measured Voltage (V) | Rate of voltage increase (V) | Voltage (V) converted from measured temperature | Rate of temperature increase (V) |
|---|---|---|---|---|
| 0.0000 | 6.8188 | | 34.5 | |
| 5.0000 | 7.9102 | | 34.6 | |
| 10.0000 | 8.3496 | | 34.5 | |
| 15.0000 | 8.4009 | | 34.6 | |
| 20.0000 | 8.4375 | | 34.5 | |
| 25.0000 | 8.4668 | | 34.6 | |
| 30.0000 | 8.4961 | | 34.6 | |
| 34.9999 | 8.5107 | | 34.3 | |
| 39.9999 | 8.5400 | | 34.5 | |
| 44.9999 | 8.5547 | | 34.3 | |
| 49.9999 | 8.5767 | | 34.3 | |
| 54.9999 | 8.5840 | | 34.6 | |
| 59.9999 | 8.5986 | 14.6 mV | 34.6 | 0 |
| 64.9999 | 8.6206 | | 34.6 | |
| 69.9999 | 8.6353 | | 34.8 | |
| 74.9999 | 8.6572 | | 34.8 | |
| 79.9999 | 8.6719 | | 34.8 | |
| 84.9999 | 8.6792 | | 34.8 | |
| 89.9999 | 8.6865 | | 34.8 | |
| 94.9999 | 8.6938 | | 34.6 | |
| 99.9999 | 8.7085 | | 34.6 | |
| 104.9998 | 8.7158 | | 34.6 | |
| 109.9998 | 8.7231 | | 34.6 | |
| 114.9998 | 8.7305 | 7.4 mV | 34.3 | −0.025 |
| 119.9998 | 8.7378 | | 34.6 | |
| 124.9998 | 8.7378 | | 34.5 | |
| 129.9998 | 8.7524 | | 34.6 | |
| 134.9998 | 8.7671 | | 34.5 | |
| 139.9998 | 8.7817 | | 34.5 | |
| 144.9998 | 8.7891 | | 34.6 | |
| 149.9998 | 8.7891 | | 34.5 | |
| 154.9998 | 8.7964 | | 34.2 | |
| 159.9998 | 8.8037 | | 34.5 | |
| 164.9998 | 8.8110 | | 34.2 | |
| 169.9998 | 8.8110 | | 34.2 | |
| 174.9997 | 8.8184 | | 34.5 | |
| 179.9997 | 8.8330 | | 34.2 | |
| 184.9997 | 8.8477 | | 34.6 | |
| 189.9997 | 8.8550 | | 34.6 | |
| 194.9997 | 8.8623 | | 34.0 | |

TABLE 3-continued

| Time (sec.) | Measured Voltage (V) | Rate of voltage increase (V) | Voltage (V) converted from measured temperature | Rate of temperature increase (V) |
|---|---|---|---|---|
| 199.9997 | 8.8696 |  | 34.6 |  |
| 204.9997 | 8.8696 |  | 34.5 |  |
| 209.9997 | 8.8770 | 7.4 mV | 34.8 | +0.025 |
| 214.9997 | 8.8770 |  | 34.6 |  |
| 219.9997 | 8.8843 |  | 34.8 |  |
| 224.9997 | 8.8916 |  | 34.8 |  |
| 229.9997 | 8.8989 |  | 34.8 |  |
| 234.9997 | 8.9063 |  | 34.9 |  |
| 239.9997 | 8.9063 |  | 34.8 |  |
| 244.9996 | 8.9063 |  | 34.6 |  |
| 524.9992 | 9.3018 |  | 35.4 |  |
| 529.9992 | 9.3091 |  | 35.6 |  |
| 534.9992 | 9.3164 |  | 35.6 |  |
| 539.9992 | 9.3237 |  | 35.6 |  |
| 544.9992 | 9.3311 |  | 35.4 |  |
| 549.9992 | 9.3384 |  | 35.4 |  |
| 554.9992 | 9.3530 |  | 35.4 |  |
| 559.9992 | 9.3604 | 7.4 mV | 35.4 | +0.05 |
| 564.9992 | 9.3750 |  | 35.4 |  |
| 569.9992 | 9.3896 |  | 35.4 |  |
| 574.9992 | 9.4116 |  | 35.6 |  |
| 579.9992 | 9.4336 |  | 35.6 |  |
| 584.9992 | 9.4482 |  | 35.9 |  |
| 589.9992 | 9.4556 |  | 35.6 |  |
| 594.9991 | 9.4702 |  | 35.7 |  |
| 599.9991 | 9.4849 |  | 35.7 |  |
| 604.9991 | 9.4922 | 7.3 mV | 35.6 | +0.02 |
| 609.9991 | 9.5142 | 22 mV | 35.6 | 0 |
| 614.9991 | 9.5361 |  | 35.7 |  |
| 619.9991 | 9.5654 |  | 35.7 |  |
| 624.9991 | 9.5874 | 22 mV | 36.0 | +0.1 |
| 629.9991 | 9.6094 |  | 36.0 |  |
| 634.9991 | 9.6313 | 21.9 mV | 36.0 | 0 |
| 639.9991 | 9.6460 |  | 35.9 | 0 |
| 644.9991 | 9.6680 | 22 mV | 35.9 | 0 |
| 649.9991 | 9.6826 |  | 35.6 |  |
| 654.9991 | 9.7046 | 22 mV | 35.4 |  |
| 659.9991 | 9.7339 |  | 35.1 |  |
| 664.9990 | 9.7632 | 29.3 mV | 35.6 |  |
| 669.9990 | 9.7998 |  | 35.6 |  |
| 674.9990 | 9.8364 | 36.6 mV | 35.7 | 0 |
| 679.9990 | 9.8730 |  | 36.0 |  |
| 684.9990 | 9.9023 | 29.3 mV | 36.0 | 0 |
| 689.9990 | 9.9463 |  | 36.3 |  |
| 694.9990 | 9.9609 |  | 36.2 |  |
| 699.9990 | 9.9756 |  | 36.3 |  |
| 704.9990 | 9.9976 |  | 36.5 |  |
| 709.9990 | 10.0122 |  | 36.3 |  |
| 714.9990 | 10.0415 | 29.3 mV | 36.3 | +0.05 |
| 719.9990 | 10.0562 |  | 36.6 | + |
| 724.9990 | 10.0708 |  | 36.5 |  |
| 729.9990 | 10.0854 |  | 36.9 |  |
| 734.9989 | 10.1147 | 29.3 mV | 37.2 | +0.225 |
| 739.9989 | 10.1221 |  | 37.4 | +0.2 |
| 744.9989 | 10.1440 | 21.9 mV | 37.7 | +0.3 |
| 749.9989 | 10.1221 | −22 mV | 37.8 |  |
| 754.9989 | 10.1221 |  | 37.7 |  |
| 759.9989 | 10.1221 |  | 38.0 |  |
| 764.9989 | 10.1221 |  | 38.0 |  |
| 769.9989 | 10.1001 |  | 38.1 |  |
| 774.9989 | 9.8071 |  | 38.3 |  |
| 779.9989 | 8.9063 |  | 38.5 |  |
| 784.9989 | 8.8477 |  | 38.6 |  |
| 789.9989 | 8.8037 |  | 38.8 |  |
| 794.9989 | 8.7744 |  | 38.6 |  |

I claim:

1. An apparatus for rapidly charging nickel-cadmium batteries comprising:

a current feeding means which feeds a charging current to a cell that needs be charged;

a temperature measuring means which measures the temperature of said cell;

a sampling means which controls said temperature measuring means to measure the temperature of said cell and stores the data thereof or outputs the data thereof to an arithmetic means;

an arithmetic means which performs calculations on the temperature data of said cell obtained by said sampling means and outputs a control signal that represents a period for discontinuing the charging operation;

a switching means which discontinues the supply of current to the cell from the current feeding means in response to said output from said arithmetic means; and a control means for controlling each of said means;

wherein said current feeding means in said charging apparatus feeds a current of at least 2 C to said cell during said charging operation; and said arithmetic means has a first arithmetic function that calculates the rate of temperature increase of said cell from the temperature data of said cell obtained by said sampling means through the temperature measuring means, a second arithmetic function which calculates a rate of change by comparing the rate of temperature increase of said cell in a first period with the rate of temperature increase of said cell in a second period, and a third function which compares the rate of temperature increase of said cell in said second period with the rate of temperature increase of said cell in said first period in order to judge whether the rate of temperature increase of said cell in said second period is more than two times as great as the rate of temperature increase of said cell in said first period, and outputs a signal for discontinuing the supply of a charging current to said cell based on the result of said judgement.

2. An apparatus for rapidly charging nickel-cadmium batteries according to claim 1, which further comprises:

a voltage measuring means for measuring the output voltage of said cell;

a voltage sampling means which measures the voltage of said cell and stores the data thereof or outputs the data thereof to a voltage arithmetic means; and a voltage arithmetic means which calculates the voltage data of said cell obtained by said voltage sampling means;

wherein said voltage arithmetic means has a fourth arithmetic function that calculates the rate of voltage increase of said cell from the voltage data of said cell obtained by said voltage sampling means through the voltage measuring means, and a fifth function which detects a first decline in said rate of voltage increase following a period during which the rate of voltage increase has continually risen, and said voltage arithmetic means further outputs a signal for discontinuing the supply of charging current to said cell based upon the information of said third function in that the rate of temperature increase of said cell in said second period became more than twice as great as the rate of temperature increase of said cell in said first period and upon the information of said fifth function in that a first decline is detected in the rate of voltage increase.

3. An apparatus for rapidly charging nickel-cadmium batteries according to claim 1 or 2, wherein said current feeding means is further provided with a current rate changing means which changes the rate (C rate) of current.

4. An apparatus for rapidly charging nickel-cadmium batteries according to claim 1 or 2, wherein any one of the surface temperature (skin temperature) of the cell, the internal temperature or the temperature at the cell terminal, is measured using a suitable temperature sensor.

5. An apparatus for rapidly charging nickel-cadmium batteries according to claim 2, wherein the charging current cutoff signal is produced based on the fifth function of the voltage arithmetic means when a decline in the rate of voltage increase of the cell is continually detected at least a plurality of times after the first decline in the rate of voltage increase of the cell is detected.

6. An apparatus for rapidly charging nickel-cadmium batteries according to claim 1, wherein said arithmetic means comprises a first memory means for storing temperature data of the cell, sampled at predetermined time intervals by the temperature measuring means, a first arithmetic means which calculates an average value of the cell temperature in a predetermined period of time from at least two pieces of temperature data maintaining a predetermined time interval stored in said first memory means, a second memory means for storing the average value of the cell temperature calculated by the first arithmetic means, a second arithmetic means which calculates the rate of temperature increase of the cell in a first period during the charging operation from the data stored in said second memory means in order to calculate the rate of change related to the increase or decrease of the cell temperature in a neighboring predetermined period of time based on the data of average value of the cell temperature stored in the second memory means, a third arithmetic means which calculates the rate of temperature increase of the cell in a second period following said first period, and a fourth arithmetic means which judges whether the rate of temperature increase of the cell in the second period obtained by said third arithmetic means is at least twice as great as the rate of temperature increase of the cell in the first period obtained by said second arithmetic means.

7. An apparatus for rapidly charging nickel-cadmium batteries according to claim 2, wherein said voltage arithmetic means comprises a third memory means for storing voltage data of the cell, sampled at predetermined time intervals by the voltage measuring means, a fifth arithmetic means which calculates an average value of the cell voltage in a predetermined period of time from at least two voltage data maintaining a predetermined time interval stored in said third memory means, a fourth memory means for storing the average value of the cell voltage calculated by the fifth arithmetic means, a sixth arithmetic means which calculates the rate of voltage increase of the cell in a first period during the charging operation from the data stored in said third memory means in order to calculate the rate of change related to the increase or decrease of the cell voltage in a neighboring predetermined period of time based on the data of average value of the cell voltage stored in said fourth memory means, a seventh arithmetic means which calculates the rate of voltage increase of the cell in a second period following said first period, and an eighth arithmetic means which detects a first decline in the rate of voltage increase following a period during which the rate of voltage increase of the cell has continually risen.

8. An apparatus according to claim 1, wherein said temperature measuring means comprises a thermistor voltage divider ($RT_1$, $R_2$) connected in parallel across said cell.

9. An apparatus for rapidly charging nickel-cadmium batteries according to claim 1, 2, 5, 6 or 7, wherein provision is made of a suitable display means for informing the external side of the data of at least either the temperature of the cell or the voltage of the cell during the charging operation of the cell.

10. A method of rapidly charging nickel-cadmium batteries comprising:

a current feeding means which feeds a charging current to a cell that needs be charged;

a temperature measuring means for measuring the temperature of the cell;

a sampling means which measures the temperature of the cell and stores the data thereof or outputs the data thereof to an arithmetic means;

an arithmetic means which calculates the temperature data of the cell obtained by said sampling means and outputs a control signal representative of a time for discontinuing the charging operation;

a switching means responsive to the output of said arithmetic means and discontinues the supply of current from said current feeding means to said cell; and a control means for controlling all of the above said means;

wherein said current feeding means in said charging apparatus feeds a current of at least 2C to said cell during the charging operation; and said arithmetic mean has:
    a first step of calculating the rate of temperature increase of the cell from the temperature data of the cell obtained by said sampling means via the temperature measuring means;
    a second step for calculating the rate of change by comparing the rate of temperature increase of the cell in a first period with the rate of temperature increase of the cell in a following second period; and
    a third step which compares the rate of temperature increase of the cell in the second period with the rate of temperature increase of the cell in the first period, judges whether the rate of temperature increase of the cell in the second period is greater than two fold of the rate of temperature increase of the cell in the first period, and outputs a signal for discontinuing the supply of charging current to the cell based on the judged result.

11. An apparatus for rapidly charging nickel-cadmium batteries according to claim 4, wherein said current feeding means is further provided with a current rate changing means which changes the rate (C rate) of current.

12. An apparatus for rapidly charging nickel-cadmium batteries according to claim 9, wherein said current feeding means is further provided with a current rate changing means which changes the rate (C rate) of current.

* * * * *